US012581338B2

(12) United States Patent
Rahman et al.

(10) Patent No.: US 12,581,338 B2
(45) Date of Patent: Mar. 17, 2026

(54) METHOD AND APPARATUS FOR BEAM MEASUREMENT AND REPORTING

(71) Applicant: Samsung Electronics Co., Ltd.,
Suwon-si (KR)

(72) Inventors: Md. Saifur Rahman, Plano, TX (US);
Eko Onggosanusi, Coppell, TX (US);
Emad N. Farag, Flanders, NJ (US)

(73) Assignee: Samsung Electronics Co., Ltd.,
Suwon-si (KR)

( * ) Notice: Subject to any disclaimer, the term of this patent is extended or adjusted under 35 U.S.C. 154(b) by 420 days.

(21) Appl. No.: 17/819,262

(22) Filed: Aug. 11, 2022

(65) Prior Publication Data

US 2023/0111064 A1     Apr. 13, 2023

Related U.S. Application Data

(60) Provisional application No. 63/314,884, filed on Feb. 28, 2022, provisional application No. 63/314,206, filed on Feb. 25, 2022, provisional application No. 63/313,489, filed on Feb. 24, 2022, provisional application No. 63/308,844, filed on Feb. 10, 2022, provisional application No. 63/257,383, filed on Oct. 19, 2021, provisional application No. 63/256,893,
(Continued)

(51) Int. Cl.
*H04W 24/10*          (2009.01)
*H04W 8/24*           (2009.01)

(52) U.S. Cl.
CPC ............. *H04W 24/10* (2013.01); *H04W 8/24* (2013.01)

(58) Field of Classification Search
CPC ....... H04W 24/10; H04W 8/24; H04W 24/08; H04W 72/21; H04B 7/06966; H04B 7/0404; H04B 7/0456; H04B 7/06956; H04B 7/0628; H04B 17/318; H04B 17/336; H04B 7/0626; H04B 7/0639; H04B 17/328; H04L 5/0051
See application file for complete search history.

(56) References Cited

U.S. PATENT DOCUMENTS 12,075,455 B2     8/2024   Go et al.
2018/0227094 A1   8/2018   Liu et al.
(Continued)

FOREIGN PATENT DOCUMENTS

CN       113271178 A       8/2021
EP        4096127 A1      11/2022
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.
(Continued)

*Primary Examiner* — Kan Yuen

(57) ABSTRACT

Methods and apparatuses for beam measurement and reporting. A method for operating a user equipment (UE) includes receiving information about a report, the report including at least one capability value about an uplink (UL) transmission; determining the at least one capability value; determining the report including an indicator indicating the at least one capability value; and transmitting the report.

12 Claims, 18 Drawing Sheets

Related U.S. Application Data filed on Oct. 18, 2021, provisional application No. 63/250,053, filed on Sep. 29, 2021, provisional application No. 63/244,104, filed on Sep. 14, 2021, provisional application No. 63/239,713, filed on Sep. 1, 2021, provisional application No. 63/238,088, filed on Aug. 27, 2021.

(56) References Cited

U.S. PATENT DOCUMENTS

| | | | | |
|---|---|---|---|---|
| 2019/0372734 | A1 | 12/2019 | Choi et al. | |
| 2020/0112349 | A1* | 4/2020 | Yang | H04B 7/0404 |
| 2020/0195330 | A1* | 6/2020 | Huang | H04L 5/0094 |
| 2020/0336998 | A1 | 10/2020 | Rahman et al. | |
| 2020/0396684 | A1 | 12/2020 | Lin et al. | |
| 2020/0413390 | A1* | 12/2020 | Rahman | H04L 5/0051 |
| 2021/0091834 | A1* | 3/2021 | Wu | H04B 7/0628 |
| 2022/0006496 | A1* | 1/2022 | Park | H04W 72/23 |
| 2022/0014957 | A1* | 1/2022 | Guo | H04B 7/0626 |
| 2022/0264343 | A1* | 8/2022 | Guo | H04W 24/08 |
| 2022/0376876 | A1* | 11/2022 | Song | H04L 5/0094 |
| 2022/0408451 | A1* | 12/2022 | Hosseini | H04W 72/56 |
| 2022/0417776 | A1* | 12/2022 | Manolakos | H04L 5/0048 |
| 2023/0045052 | A1* | 2/2023 | Sun | H04L 27/2605 |
| 2023/0057169 | A1* | 2/2023 | Li | H04B 7/0626 |
| 2023/0171627 | A1* | 6/2023 | Zhang | H04L 1/0026 370/252 |
| 2023/0421326 | A1* | 12/2023 | Wang | H04L 5/0051 |
| 2024/0007163 | A1* | 1/2024 | Elshafie | H04B 7/0626 |

FOREIGN PATENT DOCUMENTS

| | | |
|---|---|---|
| KR | 10-2021-0100201 A | 8/2021 |
| WO | 2020197353 A1 | 10/2020 |
| WO | 2020248821 A1 | 12/2020 |

OTHER PUBLICATIONS

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321 V17.0.0, Mar. 2022, 146 pages.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331 V17.0.0, Mar. 2022, 1119 pages.

"3rd Generation Partnership Project; Technical Specification Group Radio Access Network; NR; Physical channels and modulation (Release 17)", 3GPP TS 38.211 V17.0.0, Dec. 2021, 134 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer procedures for control (Release 17)", 3GPP TS 38.213 V17.0.0, Dec. 2021, 225 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

"3rd Generation Partnership Project; Technical Specification Group Radio Access Network; NR; Physical layer measurements (Release 17)", 3GPP TS 38.215 V17.0.0, Dec. 2021, 26 pages.

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

International Search Report and Written Opinion issued Dec. 6, 2022 regarding International Application No. PCT/KR2022/012808, 7 pages.

Extended European Search Report issued Aug. 7, 2024 regarding Application No. 22861751.0, 12 pages.

Nokia et al., "Enhancements on Multi-beam Operation", 3GPP TSG RAN WG1 #106-e, R1-2108052, Aug. 2021, 30 pages.

* cited by examiner

Figure 10:
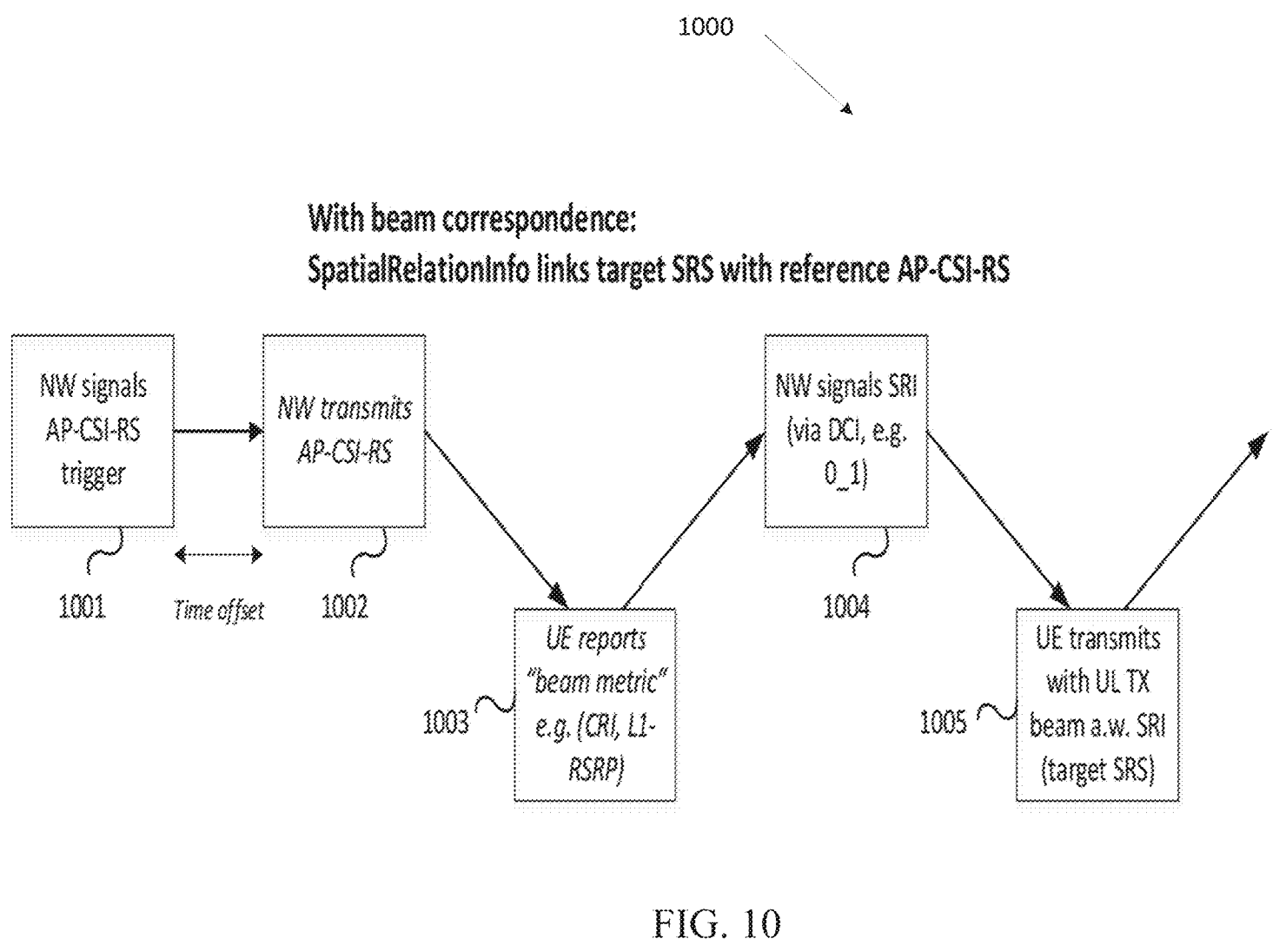

With beam correspondence:
SpatialRelationInfo links target SRS with reference AP-CSI-RS

1000

NW signals
AP-CSI-RS
trigger

1001

Time offset

NW transmits
AP-CSI-RS

1002

UE reports
"beam metric"
e.g. (CRI, L1-
RSRP)

1003

NW signals SRI
(via DCI, e.g.
0_1)

1004

UE transmits
with UL TX
beam a.w. SRI
(target SRS)

Figure 11:
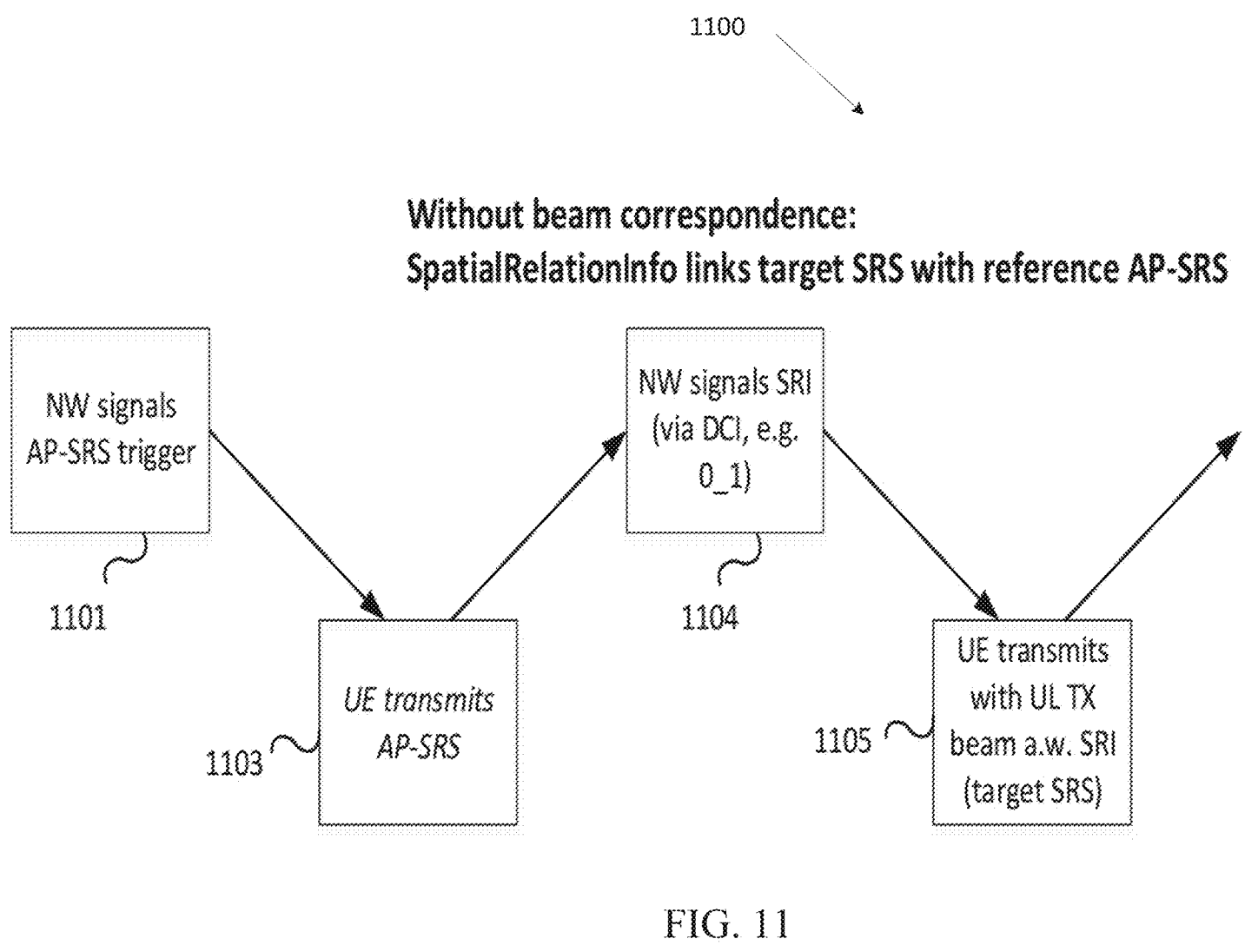

Without beam correspondence:
SpatialRelationInfo links target SRS with reference AP-SRS

1100

NW signals
AP-SRS trigger

1101

UE transmits
AP-SRS

1103

NW signals SRI
(via DCI, e.g.
0_1)

1104

UE transmits
with UL TX
beam a.w. SRI
(target SRS)

START

Receiving information about a report, the report including at least one capability value about an uplink (UL) transmission
2102

Determining the at least one capability value
2104

Determining the report including an indicator indicating the at least one capability value
2106

Transmitting the report
2108

2200

START

Generating information about a report, the report including at least one
capability value about an uplink (UL) transmission
2202

Transmitting the report
2204

Receiving the report, wherein the report includes an indicator indicating the
at least one capability value
2206

METHOD AND APPARATUS FOR BEAM MEASUREMENT AND REPORTING

CROSS-REFERENCE TO RELATED APPLICATIONS AND CLAIM OF PRIORITY

The present application claims priority to U.S. Provisional Patent Application No. 63/238,088, filed on Aug. 27, 2021; U.S. Provisional Patent Application No. 63/239,713, filed on Sep. 1, 2021; U.S. Provisional Patent Application No. 63/244,104, filed on Sep. 14, 2021; U.S. Provisional Patent Application No. 63/250,053, filed on Sep. 29, 2021; U.S. Provisional Patent Application No. 63/256,893, filed on Oct. 18, 2021; U.S. Provisional Patent Application No. 63/257, 383, filed on Oct. 19, 2021; U.S. Provisional Patent Application No. 63/308,844, filed on Feb. 10, 2022; U.S. Provisional Patent Application No. 63/313,489, filed on Feb. 24, 2022; U.S. Provisional Patent Application No. 63/314,206, filed on Feb. 25, 2022; and U.S. Provisional Patent Application No. 63/314,884, filed on Feb. 28, 2022. The content of the above-identified patent documents is incorporated herein by reference.

TECHNICAL FIELD

The present disclosure relates generally to wireless communication systems and more specifically to a method and apparatus for beam measurement and reporting.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE. For a millimeter wave communication systems, the reference signal can correspond to a spatial beam, and the CSI can correspond to a beam report which indicates a preferred spatial beam for communication. In such beamformed systems, a beam measurement and reporting from the UE and a beam indication mechanism from the gNB are needed in order to align the spatial beams at both gNB and UE.

SUMMARY

Embodiments of the present disclosure provide methods and apparatuses for beam measurement and reporting.

In one embodiment, a UE for beam measurement reporting in a wireless communication system is provided. The UE includes a transceiver configured to receive information about a report, the report including at least one capability value about an uplink (UL) transmission. The UE further includes a processor operably connected to the transceiver, the processor configured to: determine the at least one capability value, and determine the report including an indicator indicating the at least one capability value; wherein the transceiver is further configured to transmit the report.

In another embodiment, a BS in a wireless communication system is provided. The BS includes a processor configured to generate information about a report, the report including at least one capability value about an UL transmission. The BS includes a transceiver operably coupled to the processor, the transceiver configured to transmit the information and receive the report, wherein the report includes an indicator indicating the at least one capability value.

In yet another embodiment, a method for operating a UE is provided. The method comprises: receiving information about a report, the report including at least one capability value about an UL transmission; determining the at least one capability value; determining the report including an indicator indicating the at least one capability value; and transmitting the report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 illustrates an uplink multi-beam operation according to embodiments of the present disclosure;

FIG. 11 illustrates an uplink multi-beam operation according to embodiments of the present disclosure;

4

Figure 19:
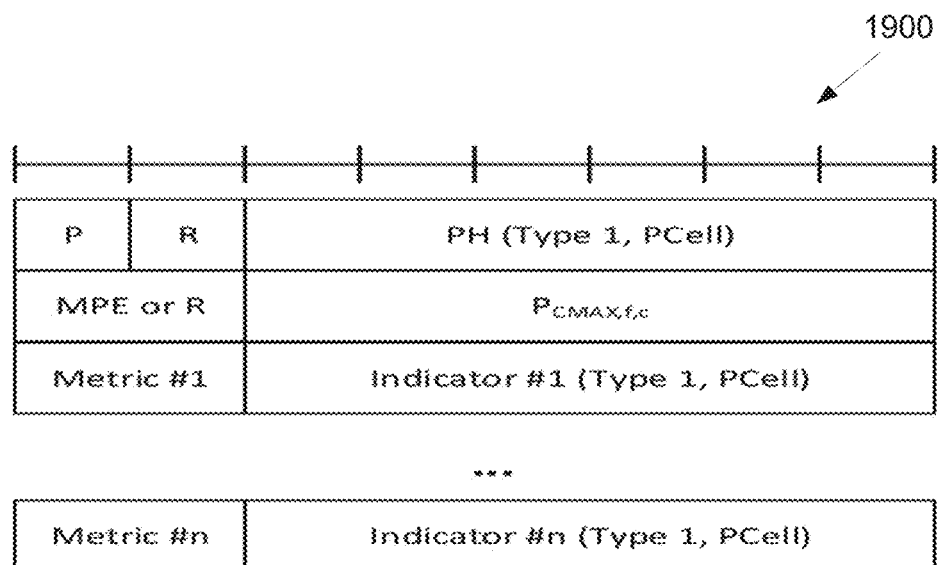
Figure 20:
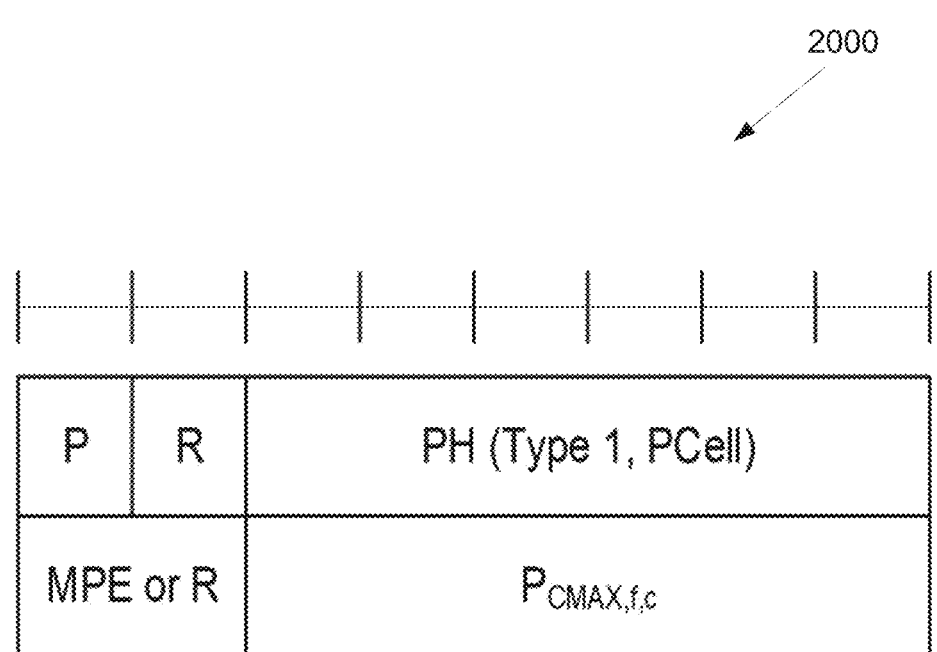
Figure 21:
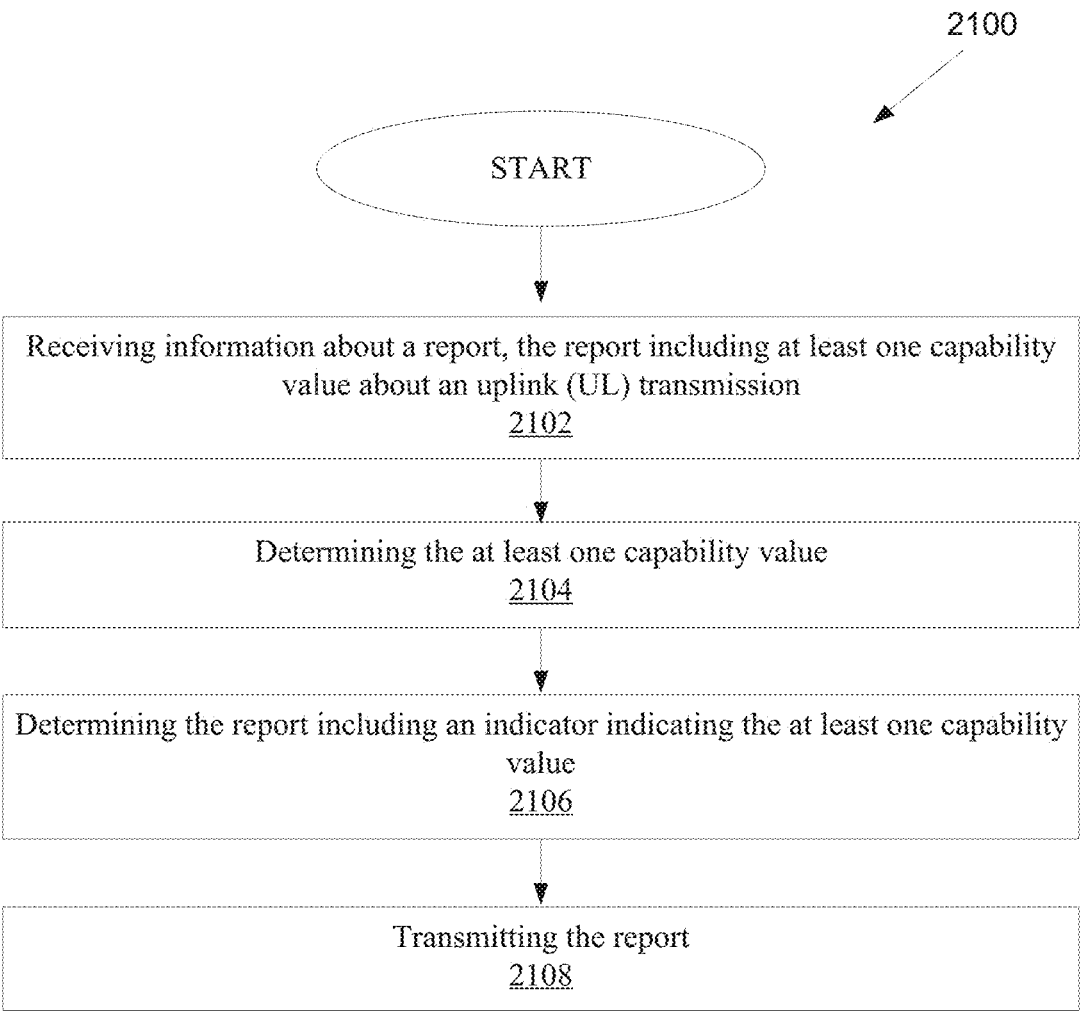
Figure 22:
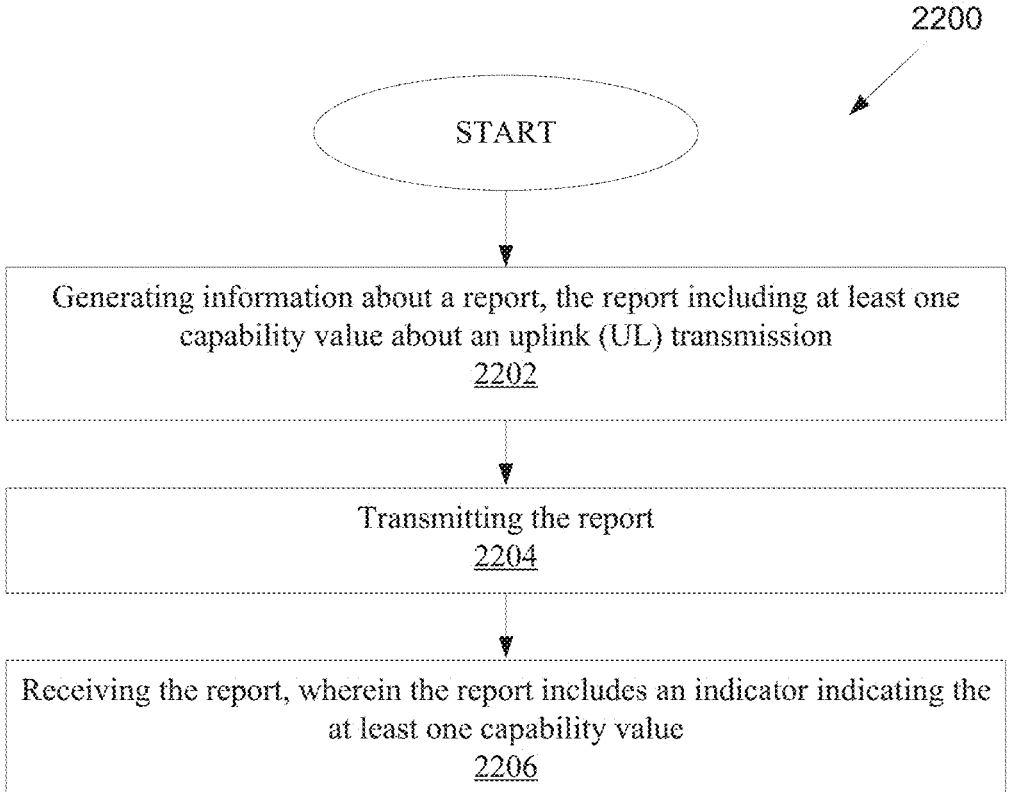

FIG. 19 illustrates another example of single-entry MAC CE for multiple MPE reports according to embodiments of the present disclosure;

FIG. 20 illustrates yet another example of single-entry MAC CE for multiple MPE reports according to embodiments of the present disclosure;

FIG. 21 illustrates a flow chart of a method for operating a UE according to embodiments of the present disclosure; and FIG. 22 illustrates a flow chart of a method for operating a BS according to embodiments of the present disclosure.

DETAILED DESCRIPTION

FIG. 1 through FIG. 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TS 38.211 v17.0.0, "NR, Physical channels and modulation" (herein "REF 6"); 3GPP TS 38.212 v17.0.0, "E-UTRA, NR, Multiplexing and channel coding" (herein "REF 7"); 3GPP TS 38.213 v17.0.0, "NR, Physical Layer Procedures for Control" (herein "REF 8"); 3GPP TS 38.214 v17.0.0; "NR, Physical Layer Procedures for Data" (herein "REF 9"); 3GPP TS 38.215 v17.0.0, "NR, Physical Layer Measurements" (herein "REF 10"); 3GPP TS 38.321 v17.0.0, "NR, Medium Access Control (MAC) protocol specification" (herein "REF 11"); 3GPP TS 38.331 v17.0.0, and "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates or in lower frequency bands, such as below 6 GHz, to enable robust coverage and mobility support. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
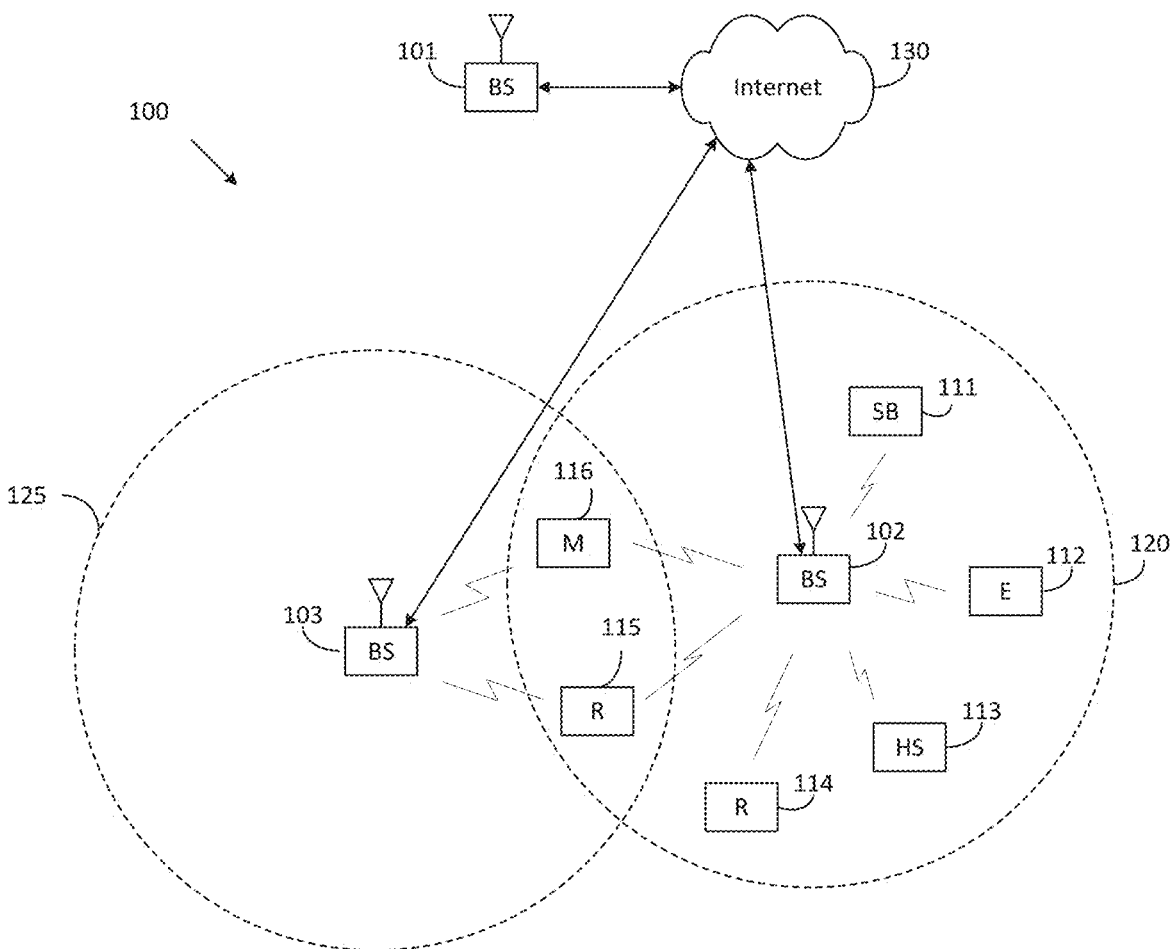
FIG. 1 illustrates an example wireless network according to embodiments of the present disclosure.
Figure 2:
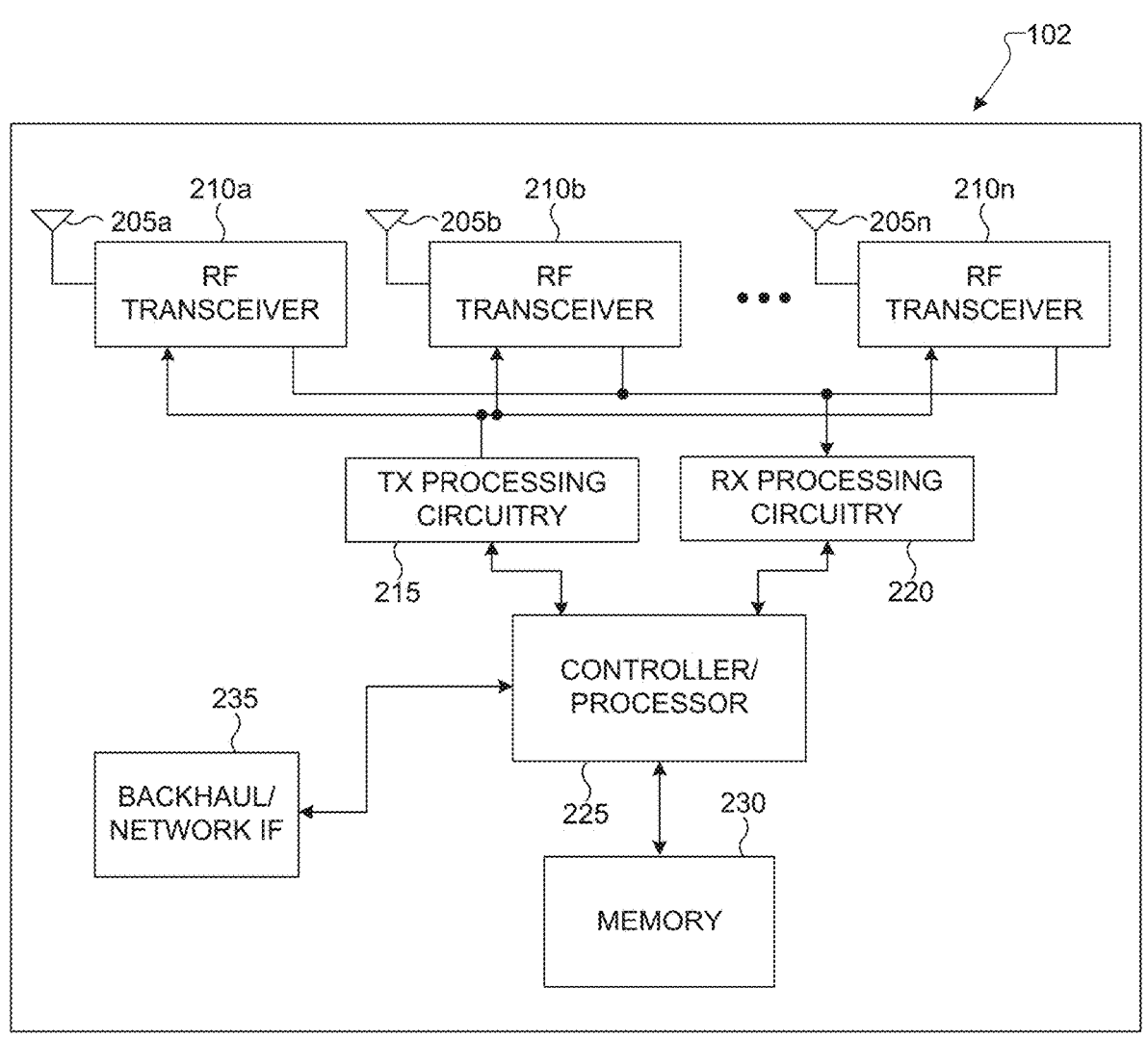
FIG. 2 illustrates an example gNB according to embodiments of the present disclosure.
Figure 3:
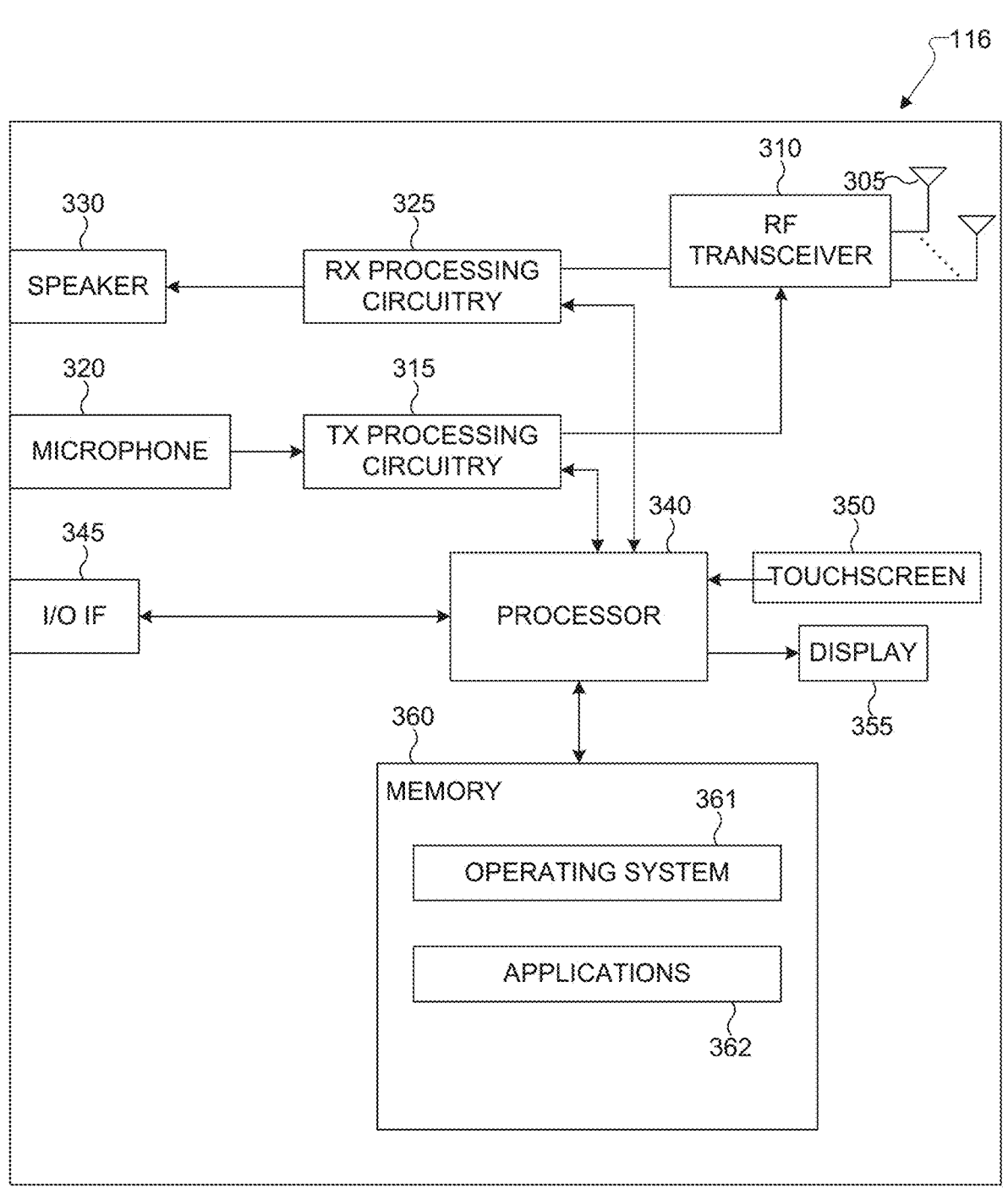
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving information about a report, the report including at least one capability value about an uplink (UL) transmission; determining the at least one capability value; determining the report including an indicator indicating the at least one capability value; and transmitting the report. One or more of the gNBs 101-103 includes circuitry, programing, or a combination thereof, for generating information about a report, the report including at least one capability value about an uplink (UL) transmission; and receiving the report, wherein the report includes an indicator indicating the at least one capability value.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNB s 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one micro-processor or microcontroller.

The processor 340 is also capable of executing other processes and programs resident in the memory 360, such as processes for receiving information about a report, the report including at least one capability value about an uplink (UL) transmission; determining the at least one capability value; determining the report including an indicator indicating the at least one capability value; and transmitting the report. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
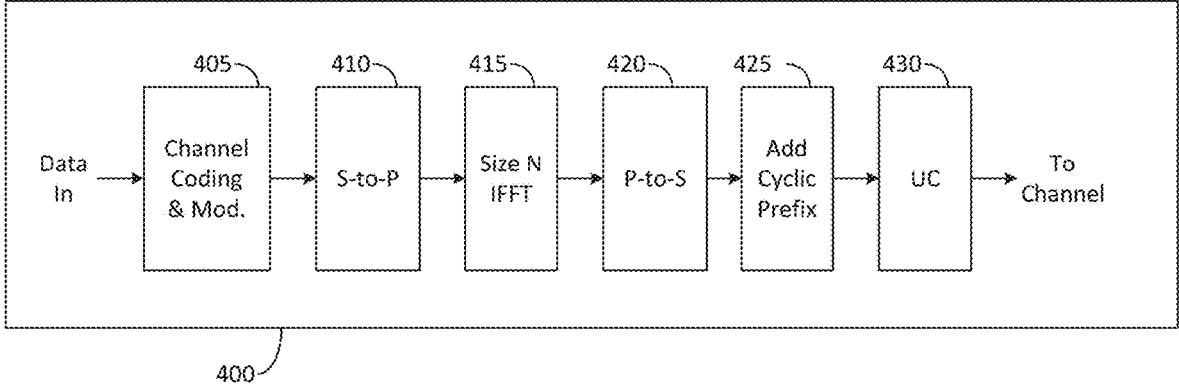
FIG. 4A illustrates a high-level diagram of an orthogonal frequency division multiple access transmit path according to embodiments of the present disclosure.
Figure 4B:
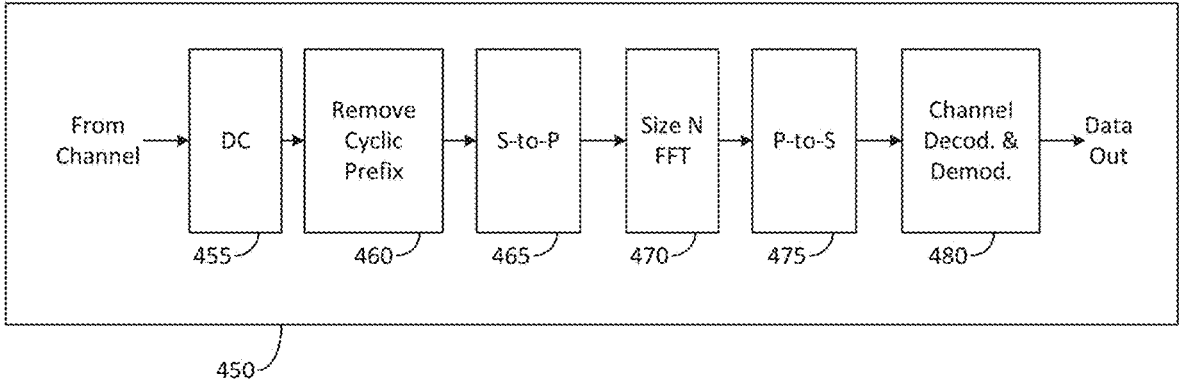
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $NR_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figures 5, 6:
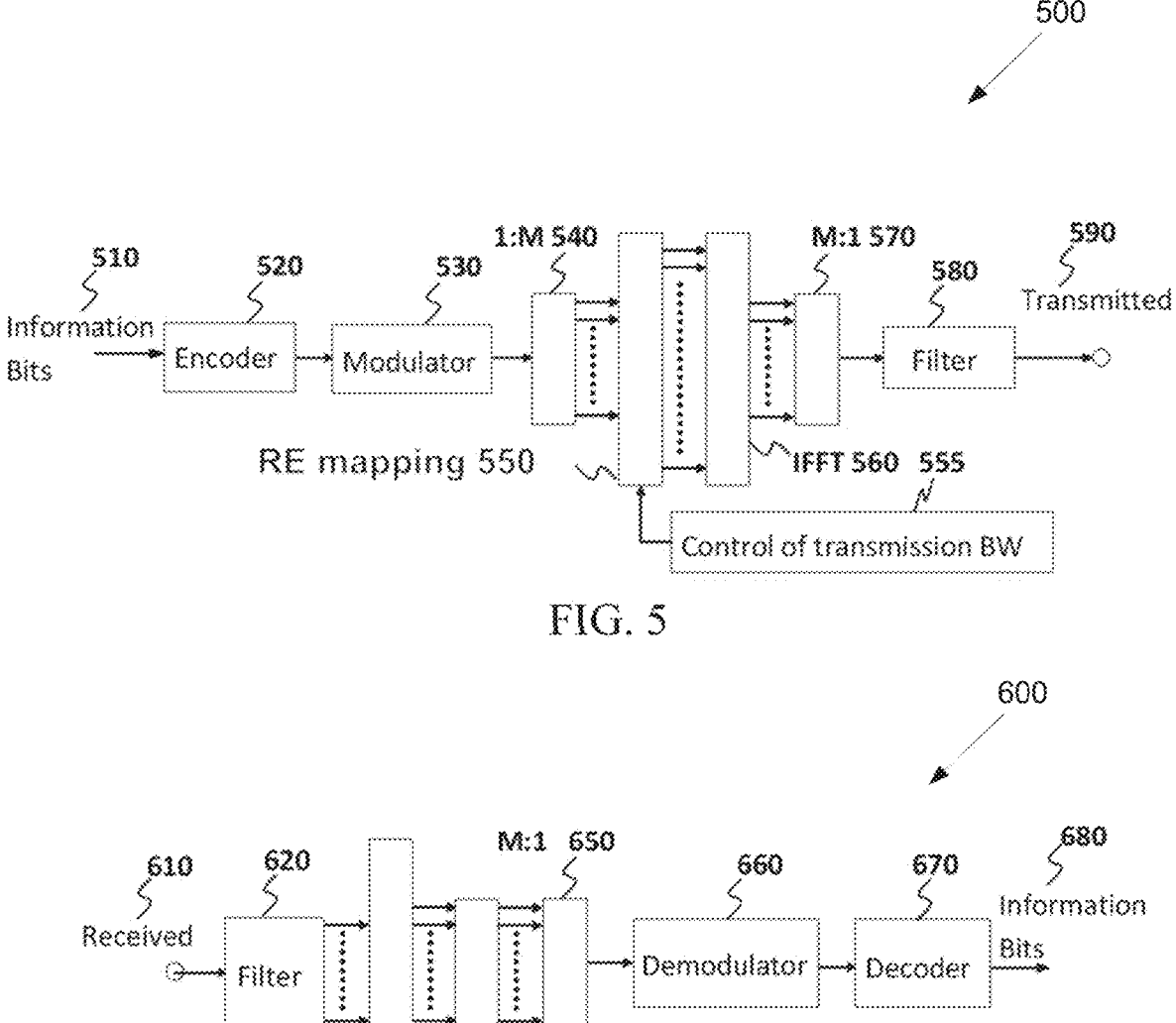
FIG. 5 illustrates a transmitter block diagram for a PDSCH in a subframe according to embodiments of the present disclosure.
FIG. 6 illustrates a receiver block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
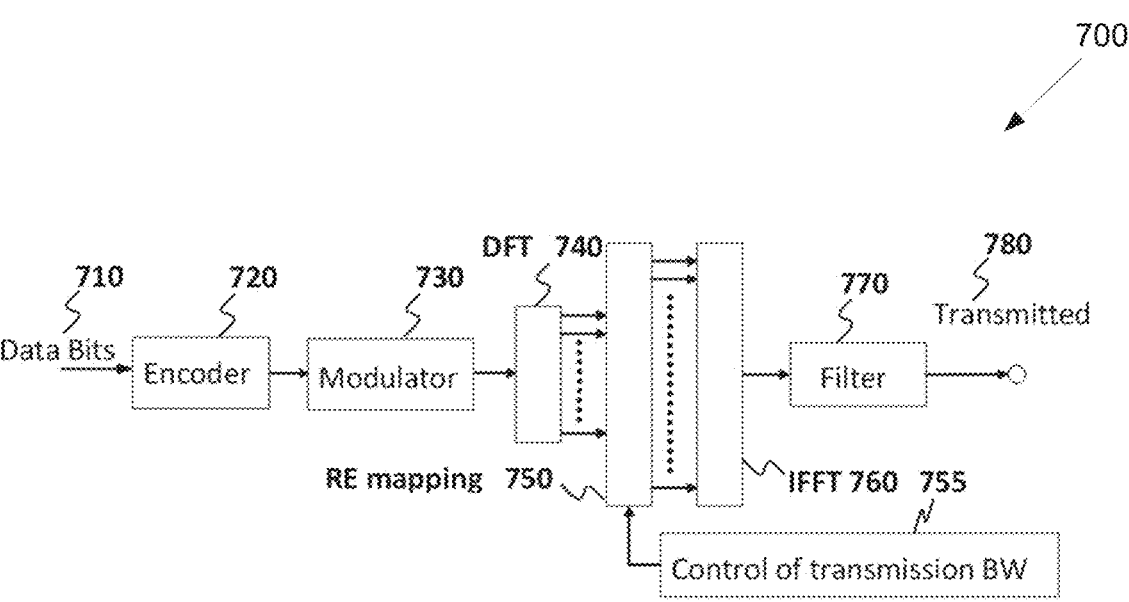
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
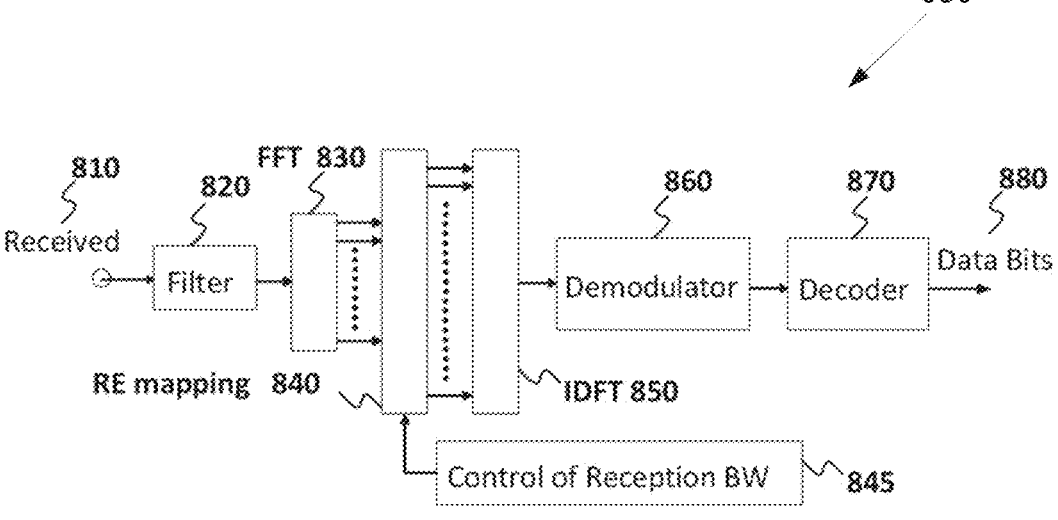
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies an FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth-generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 9:
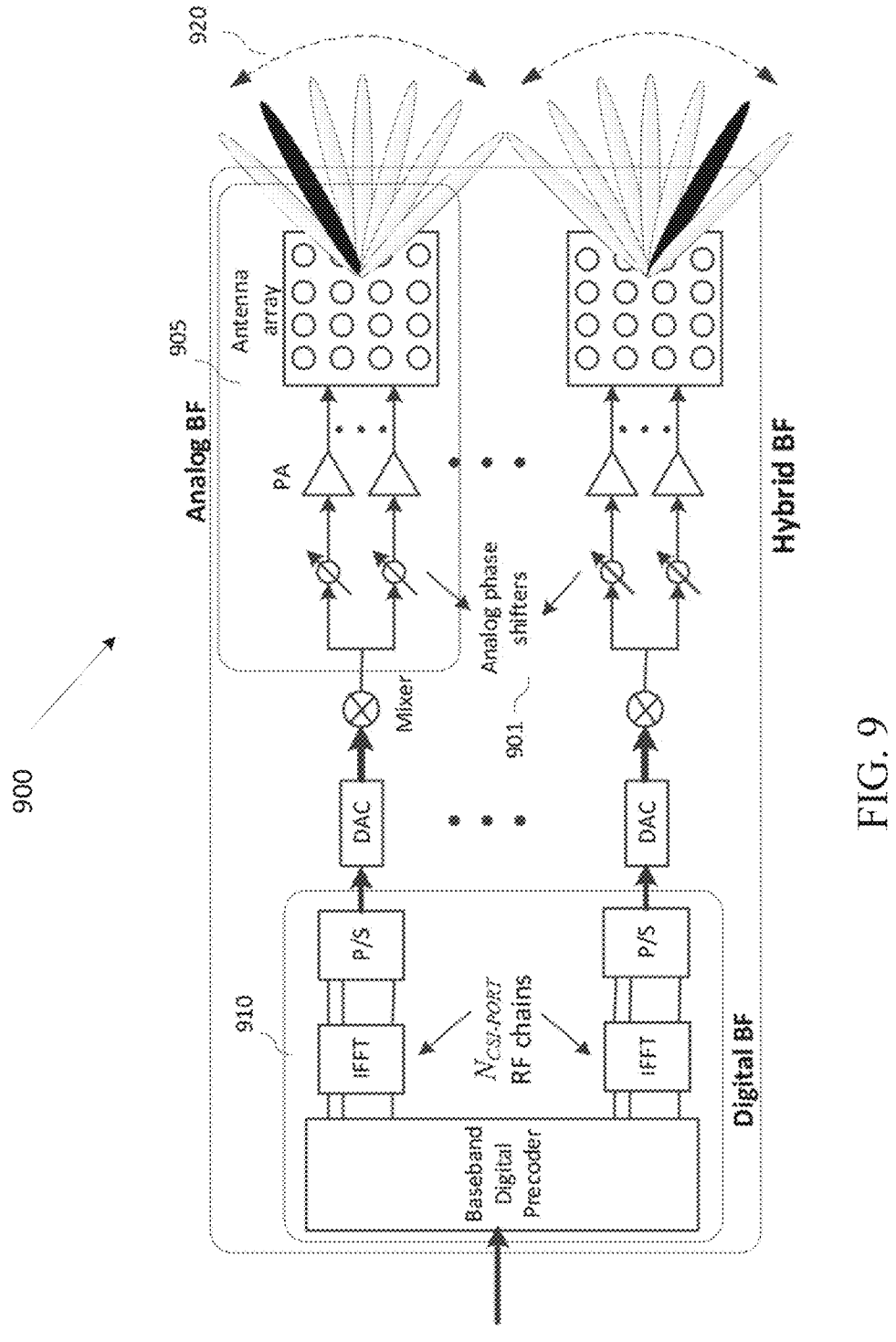
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$ A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @ 100m distance), larger number of and sharper analog beams (hence larger number of radiators in the array) will be needed to compensate for the additional path loss.

In Rel.15 NR, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

In one example pertinent to Rel.15/16 NR, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, Rel.15/16 beam management becomes cumbersome and is unlikely able to keep up with more aggressive use cases which require large number of beams and fast beam switching (e.g., higher frequency bands, high mobility, and/or larger number of narrower analog beams). In addition, Rel.15/16 was designed to accommodate a number of unknown or rudimentary capabilities (e.g., UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

In one example pertinent to Rel.15/16 NR, when beam correspondence is utilized, UL beam selection can be performed via measuring DL RS (CSI-RS and/or SSB) and CRI reporting accompanied with corresponding beam metrics (e.g., RSRP, SINR). That is, based on the CRI/RSRP or CRI/SINR reporting from the UE, the network (NW) can assume that the UE performs UL transmission on PUSCH with the UL TX beam associated with one of the latest CRI reports (especially the one with the highest RSRP or/SINR). Likewise, the UE can assume that the NW knows about this UE selection. Therefore, there is no need for a separate UL beam indication (e.g., via SRI field or UL-TCI field in the respective UL grant).

In Rel.15/16 NR, when beam correspondence is not utilized, UL beam selection can be performed via the NW selecting the UL TX beam and indicating it to the UE via the UL grant (signaled via SRI field or UL-TCI field—essentially indicating the UL TCI state associated with the UL TX beam). This selection is enabled by measuring the SRS transmitted from the UE (configured by the NW).

In either case, when an event that results in the UE having to select an (alternate) UL TX beam different from what the NW expects, some additional mechanisms are needed to ensure that (a) the UE has the alternate UL TX beam available when the UE detects such an event and the next UL TX beam indication can only in a later time slot, and (b) the NW is aware of the UE decision. A few examples of such an event are as follows.

In one example, such as event can happen due to the so-called Maximum Permissible Exposure (MPE) regulation, especially in North America, that restricts the UE transmission power in certain directions. That is, to prevent any excessive electromagnetic wave exposure on delicate soft tissues (e.g., brain tissues), the UE is to avoid transmitting high energy signal along some directions (e.g., toward the head). Unfortunately, such directions may correspond to the "best" UL TX beams (e.g., associated with the CRI of the highest reported RSRP/SINR, or associated with the SRS resource yielding the best measured SINR at the NW). When the "best" UL TX beams are not used for UL transmission, some loss of UL throughput (especially coverage) will occur.

In another example, such as event can happen due to hardware (HW) limitation at a UE equipped with multiple antenna panels, and in response to the event, the UE needs to select/switch antenna panel for UL transmission.

In yet another example, such an event can happen due to potential beam failure, and to avoid beam failure, the UE needs to select/switch antenna panel for UL transmission.

In yet another example, such an event can happen due to sudden change in channel conditions (e.g., due to high speed, antenna/panel blockage etc.) which may result in beam failure, and the UE needs to switch/change TX beam in order to continue UL transmission without interruptions/failures or having to wait for the next UL TX beam update/indication.

Therefore, there is a need for efficient designs for enabling UL TX beam selection in order to avoid outage (or beam failure), loss in UL throughput, loss in UL coverage, and issues related to HW, that may happen due to the events mentioned above. In this disclosure, several example embodiments are proposed for such designs.

This disclosure covers several components which can be used in conjunction or in combination with one another or can operate as standalone schemes.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of DL or UL TX beam, such as direction, precoding/beamforming, number of ports, etc. For instance, as the UE receives a reference RS index/ID in a DL assigned represented by a TCI state, the UE applies the known characteristics of the reference RS to the assigned DL transmission. The reference RS can be received and measured by the UE (in this case, the reference RS is a downlink signal such as NZP CSI-RS and/or SSB) with the result of the measurement used for calculating a beam report (in Rel.15 NR, at least one L1-RSRP accompanied by at least one CRI). As the NW/gNB receives the beam report, the NW can be better equipped with information to assign a particular DL TX beam to the UE. Optionally, the reference RS can be transmitted by the UE (in this case, the reference RS is an uplink signal such as SRS). As the NW/gNB receives the reference RS, the NW/gNB can measure and calculate the needed information to assign a particular DL TX beam to the UE. This option is applicable when DL-UL beam pair correspondence holds.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

There are two types of frequency range (FR) defined in 3GPP NR specifications. The sub-6 GHz range is called frequency range 1 (FR1) and millimeter wave range is called frequency range 2 (FR2). An example of the frequency range for FR1 and FR2 is shown below.

| Frequency range designation | Corresponding frequency range |
| --- | --- |
| FR1 | 450 MHz-6000 MHz |
| FR2 | 24250 MHz-52600 MHz |

The following embodiment is an example of DL multi-beam operation that utilizes DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or higher frequency bands (such as >52.6 GHz or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RS s (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "Resource Indicator", also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

FIG. 10 illustrates an uplink multi-beam operation 1000 according to embodiments of the present disclosure. The embodiment of the uplink multi-beam operation 1000 illustrated in FIG. 10 is for illustration only. FIG. 10 does not limit the scope of this disclosure to any particular implementation of the uplink multi-beam operation 1000.

As illustrated in FIG. 10, an UL multi-beam operation 1000 starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero-time offset) or later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) coupled with its associated L1-RSRP/L1-RSRQ/L1-SINR/CQI. Upon receiving the beam report from the UE, the NW can use the beam report to select an UL TX beam for the UE and indicate the UL TX beam selection (step 1004) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (step 1005).

FIG. 11 illustrates an uplink multi-beam operation 1100 according to embodiments of the present disclosure. The embodiment of the uplink multi-beam operation 1100 illustrated in FIG. 11 is for illustration only. FIG. 11 does not limit the scope of this disclosure to any particular implementation of the uplink multi-beam operation 1100.

As illustrated in FIG. 11, an UL multi-beam operation 1100 starts with the gNB/NW signaling to a UE an aperiodic SRS (AP-SRS) trigger or request (step 1101). This trigger can be included in a DCI (either UL-related or DL-related). Upon receiving and decoding the AP-SRS trigger (step 1102), the UE transmits AP-SRS to the gNB/NW (step 1103) so that the NW (or gNB) can measure the UL propagation channel and select an UL TX beam for the UE. The gNB/NW can then indicate the UL TX beam selection (step 1104) using the SRI field in the UL-related DCI (that carries the UL grant, such as DCI format 0_1 in NR). The SRI corresponds to a "target" SRS resource that is linked to a reference RS (in this case, an AP-SRS) via SpatialRelation-Info configuration. Upon successfully decoding the UL-related DCI with the SRI, the UE performs UL transmission (such as data transmission on PUSCH) with the UL TX beam associated with the SRI (step 1105).

Figure 12:
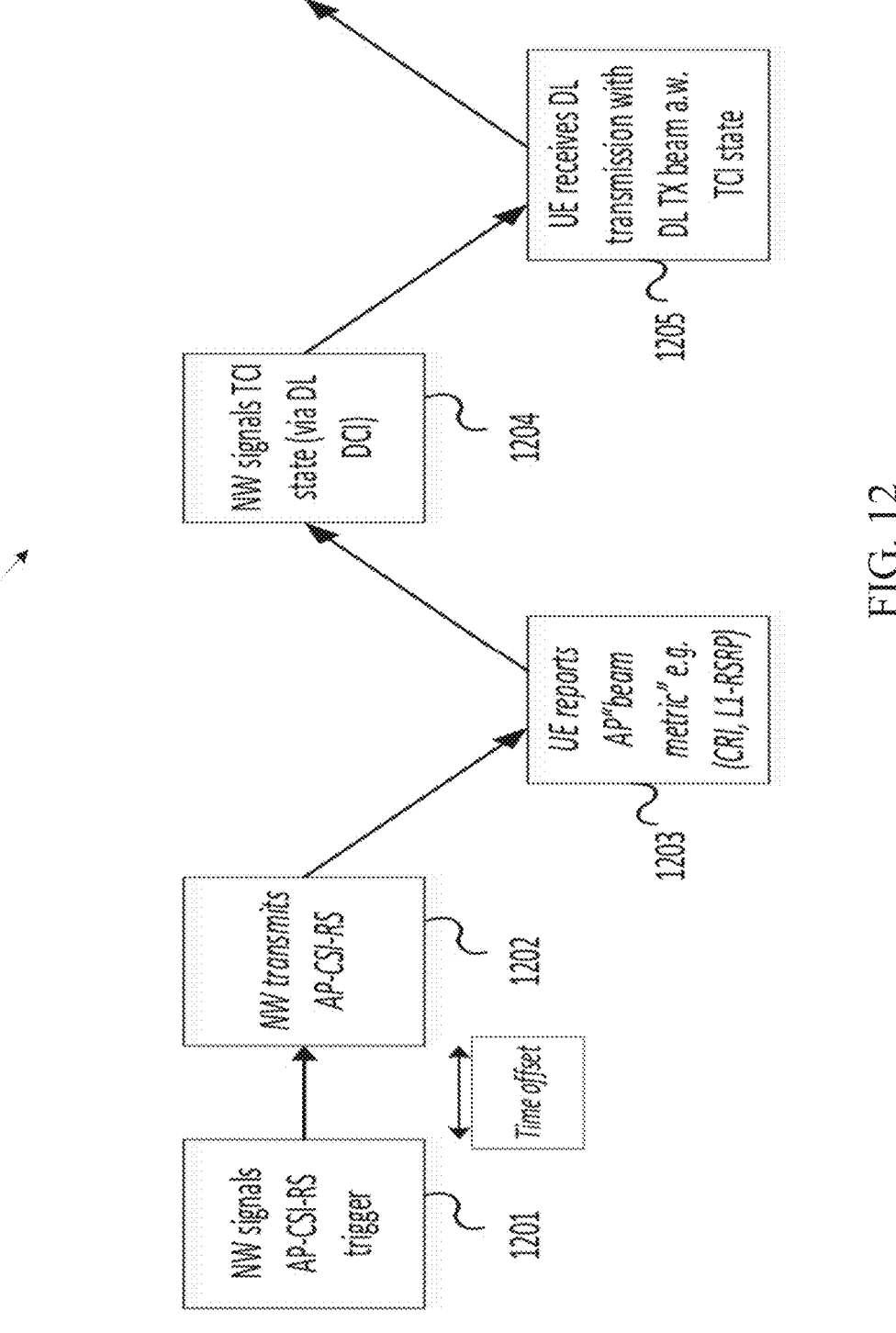
FIG. 12 illustrates a downlink multi-beam operation according to embodiments of the present disclosure.

FIG. 12 illustrates a downlink multi-beam operation 1200 according to embodiments of the present disclosure. The embodiment of the downlink multi-beam operation 1200 illustrated in FIG. 12 is for illustration only. FIG. 12 does not limit the scope of this disclosure to any particular implementation of the downlink multi-beam operation 1200.

As illustrated in FIG. 12, wherein a UE is configured for measuring/receiving aperiodic CSI-RS (AP-CSI-RS) and reporting aperiodic CSI (AP CSI), a DL multi-beam operation 1200 starts with the gNB/NW signaling to a UE an aperiodic CSI-RS (AP-CSI-RS) trigger or indication (step 1201). This trigger or indication can be included in a DCI (either UL-related or DL-related, either separately or jointly signaled with an aperiodic CSI request/trigger) and indicate transmission of AP-CSI-RS in a same (zero-time offset) or later slot/sub-frame (>0 time offset). Upon receiving the AP-CSI-RS transmitted by the gNB/NW (step 1202), the UE measures the AP-CSI-RS and, in turn, calculates and reports a "beam metric" (included in the CSI, indicating quality of a particular TX beam hypothesis) (step 1203). Examples of such beam reporting (supported in Rel.15/16 NR) are CSI-RS resource indicator (CRI) or SSB resource indicator (SSB-RI) coupled with its associated L1-RSRP and/or L1-SINR. Upon receiving the beam report from the UE, the NW/gNB can use the beam report to select a DL TX beam for the UE and indicate the DL TX beam selection (step 1204) using the TCI field in the DL-related DCI (that carries the DL assignment, such as DCI format 1_1 in NR). The TCI state corresponds to a reference RS (in this case, an AP-CSI-RS) defined/configured via the TCI state definition (higher-layer/RRC configured, from which a subset is activated via MAC CE for the DCI-based selection). Upon successfully decoding the DL-related DCI with the TCI field, the UE performs DL reception (such as data transmission on PDSCH) with the DL TX beam associated with the TCI field (step 1205). In this example embodiment, only one DL TX beam is indicated to the UE.

The SRI used in the embodiments illustrated in FIGS. 10 and 11 can also be replaced with UL-TCI wherein an UL-TCI field can be introduced in the pertinent UL-related DCI(s), either in place of or in addition to the SRI field in Rel.15/16.

The aperiodic CSI-RS (along with the associated aperiodic reporting) in the embodiment illustrated in FIG. 1000 and the aperiodic SRS illustrated in the embodiment illustrated in FIG. 11 can be substituted with that of another time-domain behavior such as semi-persistent (SP) or periodic (P).

In any of the embodiments or sub-embodiments or examples below, a flowchart is used for illustrative purposes. The present disclosure covers any possible variation of the flowchart as long as at least some of the components are included. Such components include the UL TX beam indication indicating multiple UL TX beams and the event-dependent UL TX beam switch from the indicated multiple UL TX beams.

In the rest of the disclosure, the term "beam", can be associated with a spatial transmission/reception of a resource signal (RS) from a "port", "antenna port", or "virtual antenna/port". Likewise, the term "transmit (TX) beam", can be associated with a spatial transmission of a resource signal (RS) or a channel from a "port", "antenna port", or "virtual antenna/port"; and the term "receive (RX) beam", can be associated with a spatial reception of a resource signal (RS) or a channel from a "port", "antenna port", or "virtual antenna/port". The spatial transmission/reception of a beam can be in a three-dimension (3D) space. In a beam-formed wireless system, the transmission and reception of wireless signal can be via multiple TX and multiple RX beams.

In NR, the UL transmission is configured to be either codebook-based or non-codebook-based via higher layer parameter txConfig in PUSCH-Config set to either 'codebook' or 'nonCodebook.'

According to Section 6.1.1.1 of REFS, the following is supported for codebook based UL transmission.

For codebook based transmission, the UE determines its codebook subsets based on TPMI and upon the reception of higher layer parameter ULCodebookSubset or codebookSubset in PUSCH-Config which may be configured with 'fullAndPartialAndNonCoherent', or 'partialAndNonCoherent', or 'nonCoherent' depending on the UE capability. The maximum transmission rank may be configured by the higher parameter ULmaxRank or maxRank in PUSCH-Config.

A UE reporting its UE capability of 'partialAndNonCoherent' transmission shall not expect to be configured by ULCodebookSubset with 'fullAndPartialAndNonCoherent'.

A UE reporting its UE capability of 'Non-Coherent' transmission shall not expect to be configured by ULCodebookSubset with 'fullAndPartialAndNonCoherent' or with 'partialAndNonCoherent'.

A UE shall not expect to be configured with the higher layer parameter ULCodebookSubset set to 'partialAndNonCoherent' when two antenna ports are configured.

In this disclosure, 'fullAndPartialAndNonCoherent', 'partialAndNonCoherent', and 'Non-Coherent' are referred to as the three examples of coherence type/capability, where the term 'coherence' implies a subset of antenna ports at the UE that can be used to transmit a layer coherently, or that comprises an antenna panel.

Figure 13:
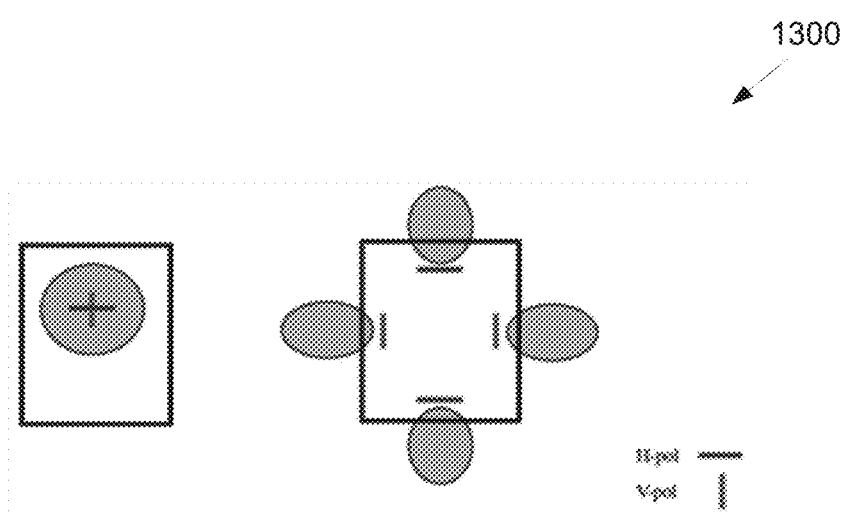
FIG. 13 illustrates example antenna panels according to embodiments of the present disclosure.

FIG. 13 illustrates example antenna panels 1300 according to embodiments of the present disclosure. The embodiment of the antenna panels 1300 illustrated in FIG. 13 is for illustration only. FIG. 13 does not limit the scope of this disclosure to any particular implementation of the antenna panels 1300.

Figure 14:
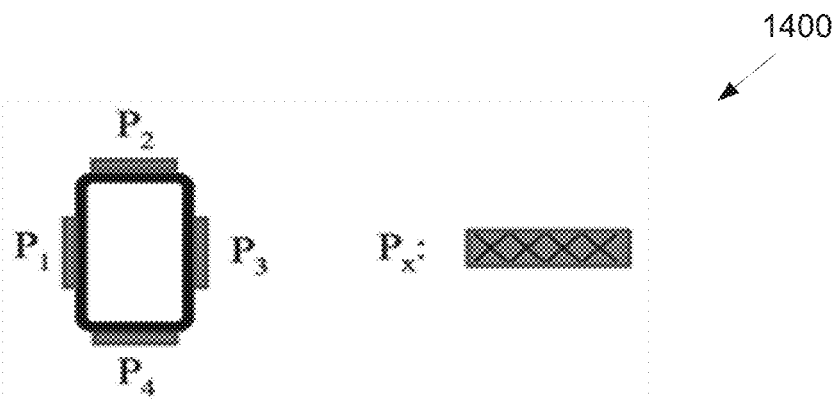
FIG. 14 illustrates other example antenna panels according to embodiments of the present disclosure.
Figure 15:
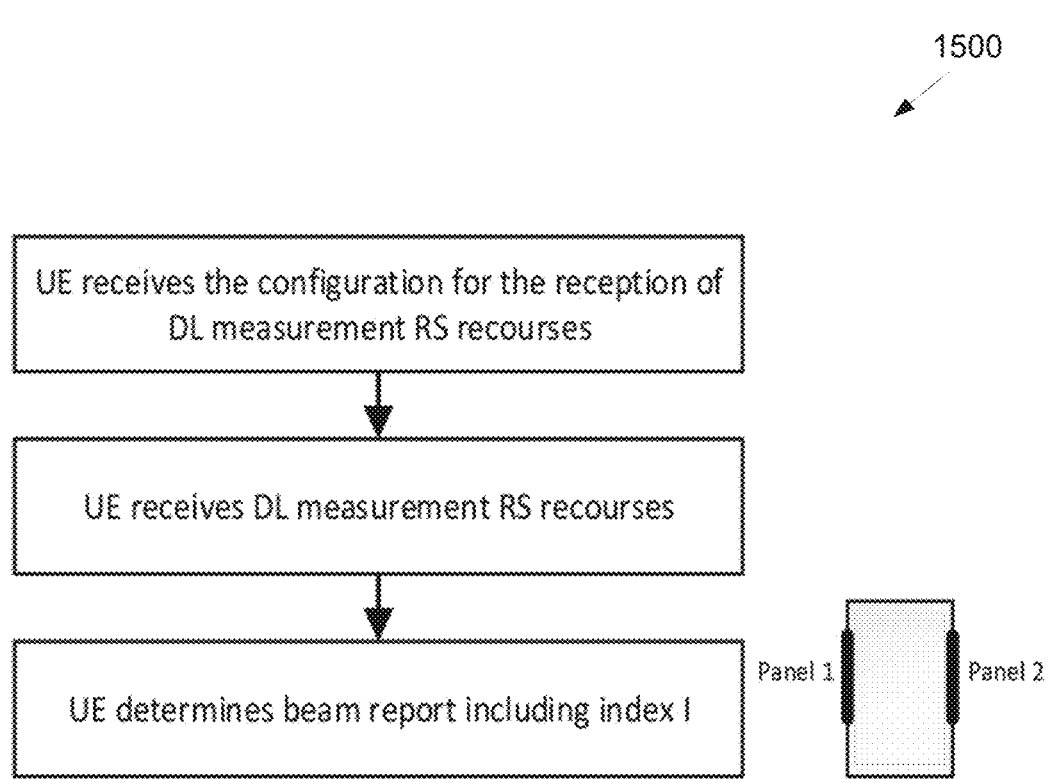
FIG. 15 illustrates a UE is configured to measure DL measurement RS resources and determine a report including a capability index according to embodiments of the present disclosure.

FIG. 14 illustrates other example antenna panels 1400 according to embodiments of the present disclosure. The embodiment of the antenna panels 1400 illustrated in FIG. 14 is for illustration only. FIG. 14 does not limit the scope of this disclosure to any particular implementation of the antenna panels 1400.

The term 'antenna panel' refers to a group of antenna ports or a group of antenna elements or a subset of antenna ports associated with a resource (e.g., SRS resource, CSI-RS resource, SSB block). Two examples are shown in FIG. 13, the first example (left) has a single panel comprising a dual-polarized (i.e., two) antennae/ports, and the second example has four panels each comprising a single antenna/ports (pointing in four different directions). Another example is shown in FIG. 14 wherein there are four antenna panels (on opposite sides), each comprising four dual-polarized antennae/ports.

In one embodiment, a UE reports via its capability reporting a list of UE capability values (or value set/sets), the UE capability value (or value set/sets) including an information based on the coherence type of its antenna ports (e.g., SRS antenna ports, or PUSCH antenna ports). In one example, the coherence type is one of 'fullAndPartialAndNonCoherent' (FC), 'partialAndNonCoherent' (PC), and 'nonCoherent' (NC) (cf. 6.1.1.1 of TS 38.214).

As shown in FIG. 14, a UE is configured to measure (receive) $P_1$ DL measurement RS resources (such as CSI-RS or SSB), where $P_1 \geq 1$. This configuration can be transmitted by the NW/gNB (received by the UE) via higher-layer (RRC) signaling. Optionally, the NW/gNB can signal/update the (sub)set of DL measurement RS resources dynamically via L1 or L2 DL control (PDCCH or MAC CE). These resources are used by the UE and/or the NW/gNB to perform beam measurement along different beams or spatial directions (represented by the beamforming/precoding operation), and potentially using different antenna panels at the UE. The time-domain behavior of the DL measurement RS resources can be configured as aperiodic (AP), semi-persistent (SP), or periodic (P). In one example, each of the $P_1$ DL measurement RS resources is a one port resource. In one example, each of the $P_1$ DL measurement RS resources is a one or two port resource. In one example, the DL measurement RS resources include the path-loss (PL) RS resources. In one example, the DL measurement RS resources include (NZP) CSI-RS resources. In one example, the DL measurement RS resources include both PL RS resources and (NZP) CSI-RS resources. In one example, the DL measurement RS resources include the SSB resources.

The UE is further configured to use the measurement (based on the received DL measurement RS resources) to determine a beam report and report it via an UL channel (e.g., PUCCH or PUSCH), as configured by the higher layer parameter CSI-ReportConfig. Wherein the PUSCH can be one of dynamic grant PUSCH, Type 1 configured grant PUSCH, Type 2 configured grant PUSCH, MsgA PUSCH associated with Type 2 random access procedure or Msg3 PUSCH associated with Type 1 random access procedure.

The beam report includes $N \geq 1$ pairs of (R, I) where R is a resource indicator, and I is an index corresponding to the reported R. In one example, R is SSBRI indicating SSB index, or CRI indicating CSI-RS resource index. In one example, the beam report also include a beam metric corresponding to (or associated with) each reported resource indicator R. In one example, each beam metric is L1-RSRP (as in Rel. 15). In one example, each beam metric is L1-SINR (as in Rel. 16). In one example, each beam metric is L1-RSRP or L1-SINR based on configuration, which could be subject to UE capability reported by the UE. When N>1, the beam metrics are reported in a differential manner (as in Rel.15/16) with 7 bits for the first (absolute) beam metric and 4 bits for each of the remaining N−1 (differential) beam metrics with respect to the first beam metric, the details of this differential reporting is as described in Rel. 15/16 NR specification.

In one example, the index I indicates a correspondence between a CSI-RS and/or SSB resource index (indicated via R) and a UE capability value from a list of UE capability values (or value set/sets) reported by the UE (via UE capability signaling). In one example, the index I is an index of a UE capability value from a list of UE capability values (or value set/sets). The details of the list of UE capability values (or value set/sets) are described later in this disclosure. The UE shall not update or is expected to maintain the correspondence between (two consecutive) beam reporting instances (in time).

In one example, the beam report is configured via reportQuantity in CSI-ReportConfig that is set to an existing (Rel. 15/16) value, i.e., to 'cri-RSRP' or 'ssb-Index-RSRP' or 'cri-SINR', or 'ssb-Index-SINR'.

In one example, the beam report is configured via reportQuantity in CSI-ReportConfig that is set to a new value, i.e., 'cri-RSRP-r17' or 'ssb-Index-RSRP-r17' or 'cri-SINR-r17', or 'ssb-Index-SINR-r17', where the term 'cri' or 'ssb-Index' corresponds to the resource indicator, the term 'RSRP' or 'SINR' corresponds to the beam metric, and the term 'r17' corresponds to the index I. In one example, In one example, the term "r17" is replaced with 'CapabilityIndex', i.e., the new value is 'cri-RSRP-CapabilityIndex', 'ssb-Index-RSRP-CapabilityIndex', 'cri-SINR-CapabilityIndex', or 'ssb-Index-SINR-CapabilityIndex'.

In one example, the term "r17" is replaced with 'SetIndex', i.e., the new value is 'cri-RSRP-SetIndex', 'ssb-Index-RSRP-SetIndex', 'cri-SINR-SetIndex', or 'ssb-Index-SINR-SetIndex'.

In one example, the term "r17" is replaced with 'ValueIndex', i.e., the new value is 'cri-RSRP-ValueIndex', 'ssb-Index-RSRP-ValueIndex', 'cri-SINR-ValueIndex', 'ssb-Index-SINR-ValueIndex'

In one example, the term "r17" is replaced with 'ValueSetIndex', i.e., the new value is 'cri-RSRP-ValueSetIndex', 'ssb-Index-RSRP-ValueSetIndex', 'cri-SINR-ValueSetIndex', 'ssb-Index-SINR-ValueSetIndex'

In one example, the term "r17" is replaced with 'CapabilityValueSetIndex', i.e., the new value is 'cri-RSRP-CapabilityValueSetIndex', 'ssb-Index-RSRP-CapabilityValueSetIndex', 'cri-SINR-CapabilityValueSetIndex', 'ssb-Index-SINR-CapabilityValueSetIndex'.

In one example, the term "r17" is replaced with 'CapabilityValueIndex', i.e., the new value is 'cri-RSRP-CapabilityValueIndex', 'ssb-Index-RSRP-CapabilityValueIndex', 'cri-SINR-CapabilityValueIndex', 'ssb-Index-SINR-CapabilityValueIndex'.

In one example, the term "r17" is replaced with 'CapabilitySetIndex', i.e., the new value is 'cri-RSRP-CapabilitySetIndex', 'ssb-Index-RSRP-CapabilitySetIndex', 'cri-SINR-CapabilitySetIndex', 'ssb-Index-SINR-CapabilitySetIndex'.

The index I (or the correspondence) is determined/configured according to at least one of the following examples.

In one example, the index I indicates an information about the coherence type. For example, the index I indicates one of the following:

Full-coherent (FC) indicating all SRS ports. In one example, this corresponds to the case of 1 antenna panel comprising all SRS ports. In one example, this corresponds to the case of all SRS ports being selected (or turned ON).

Partial-coherent (PC) indicating a pair or subset of 2 SRS ports. In one example, this corresponds to the case of selecting 1 antenna panel (out of multiple panels each comprising a subset of SRS ports). In one example, this corresponds to the case of a subset of (e.g., or 2 SRS) ports being selected (or turned ON) out of >2 (e.g., 4) SRS antenna ports.

Non-coherent (NC) indicating 1 SRS port. In one example, this corresponds to the case of selecting 1 antenna panel (out of multiple panels each comprising 1 SRS port). In one example, this corresponds to the case of 1 SRS port being selected (or turned ON) out of >1 (e.g., 2 or 4) SRS antenna ports.

In one example, for a SRS resource with 4 SRS ports, the index I indicates one of the following.

X1: FC (for 1 panel with 4 ports, or selecting 4 SRS ports)

X2: PC (for 2 panels each with 2 ports, or selecting 2 SRS ports)

X3: NC (for 4 panels each with 1 port or selecting 1 SRS port)

In one example, the index I depends on the coherence type reported by the UE.

For a UE capable of NC and 4 ports, I is fixed to X3, hence may not be reported.

For a UE capable of PC and 4 ports, I can be X2 or X3, hence may be reported (e.g., via a 1 bit reporting).

For a UE capable of FC and 4 ports, I can be X1 or X2 or X3, hence may be reported (e.g., via a 2 bit reporting).

In one example, the index I does not depends on the coherence type reported by the UE.

For a UE capable of 4 ports, I can be X1 or X2 or X3, hence may be reported (e.g., via a 2 bit reporting).

In one example, for a SRS resource with 4 SRS ports, the index I indicates one of the following.

X1: FC (for 1 panel with 4 ports, or selecting 4 SRS ports)

X2: PC (for 2 panels each with 2 ports, or selecting 2 SRS ports)

X3: NC (for 4 panels each with 1 port or selecting 1 SRS port)

X4: PC+NC (for 3 panels, 1 panel with 2 ports, or selecting 2 SRS ports and 2 panels each with 1 port or selecting 1 SRS port)

In one example, the index I depends on the coherence type reported by the UE.

For a UE capable of NC and 4 ports, I is fixed to X3, hence may not be reported.

For a UE capable of PC and 4 ports, I can be X2 or X3 hence may be reported (e.g., via a 1 bit reporting). Or for a UE capable of PC and 4 ports, I can be X2 or X3 or X4, hence may be reported (e.g., via a 2 bit reporting).

For a UE capable of FC and 4 ports, I can be X1 or X2 or X3 or X4, hence may be reported (e.g., via a 2 bit reporting).

In one example, the index I does not depends on the coherence type reported by the UE.

For a UE capable of 4 ports, I can be X1 or X2 or X3 or X4, hence may be reported (e.g., via a 2 bit reporting).

In one example, for a SRS resource with 2 SRS ports, the index I indicates one of the following.

Y1: FC (for 1 panel with 2 ports, or selecting 2 SRS ports)

Y3: NC (for 2 panels each with 1 port or selecting 1 SRS port)

In one example, the index I depends on the coherence type reported by the UE.

For a UE capable of NC and 2 ports, I is fixed to Y3, hence may not be reported.

For a UE capable of FC and 2 ports, I can be Y1 or Y3, hence may be reported (e.g., via a 1 bit reporting).

In one example, the index I does not depend on the coherence type reported by the UE.

For a UE capable of 2 ports, I can be Y1 or Y3, hence may be reported (e.g., via a 1 bit reporting).

In one example, the NW configures the set of allowed values for the index I or the NW configures an association between the index I and coherence type or selection of SRS antenna ports. This configuration can be subject to UE capability reported by the UE, which for example can be a list of supported UE capability values (or value set/sets) including coherence types and/or selection of SRS antenna ports for the reporting of the index I. The UE determines the index I based on the NW configuration, and the bitwidth of index I reporting is 0, 1, 2, or 2 bits if the number of supported coherence types or selection of SRS antenna ports for the reporting of the index I is 1, 2, 3, or 4, respectively.

In one example, the index I indicates an information about the coherence type. The details are the same as in one or more examples above except that for 4 SRS ports, the index I is allowed to take a value indicating selection of 3 SRS ports.

For an SRS resource with 4 SRS ports, the index I indicates one of the following.

X1: FC (for 1 panel with 4 ports, or selecting 4 SRS ports)

X2: PC (for 2 panels each with 2 ports, or selecting 2 SRS ports)

X3: NC (for 4 panels each with 1 port or selecting 1 SRS port)

X4: PC_3 port (for 1 panel each with 3 ports, or selecting 3 SRS ports)

In one example, the index I depends on the coherence type reported by the UE.

For a UE capable of NC and 4 ports, I is fixed to X3, hence may not be reported.

For a UE capable of PC and 4 ports, I can be X2 or X3, hence may be reported (e.g., via a 1 bit reporting).

For a UE capable of FC and 4 ports, I can be X1 or X2 or X3 or X4, hence may be reported (e.g., via a 2 bit reporting).

For a UE capable of PC_3 port and 4 ports, I can be X2 or X3 or X4, hence may be reported (e.g., via a 2 bit reporting).

In one example, the index I does not depends on the coherence type reported by the UE.

For a UE capable of 4 ports, I can be X1 or X2 or X3 or X4, hence may be reported (e.g., via a 2 bit reporting).

In one example, the NW configures the set of allowed values for the index I or the NW configures an association between the index I and coherence type or selection of SRS antenna ports. This configuration can be subject to UE capability reported by the UE, which for example can be a list of supported UE capability values (or value set/sets) including coherence types and/or selection of SRS antenna ports for the reporting of the index I. The UE determines the index I based on the NW configuration, and the bitwidth of index I reporting is 0, 1, 2, or 2 bits if the number of supported coherence types or selection of SRS antenna ports for the reporting of the index I is 1, 2, 3, or 4, respectively.

In one example, the index I indicates an information about the coherence type. The details are the same as in one or more examples above except that for 4 SRS ports, the index I is allowed to take a value indicating selection of 3 SRS ports.

For an SRS resource with 4 SRS ports, the index I indicates one of the following.

X1: FC (for 1 panel with 4 ports, or selecting 4 SRS ports)

X2: PC (for 2 panels each with 2 ports, or selecting 2 SRS ports)

X3: NC (for 4 panels each with 1 port or selecting 1 SRS port)

X4: PC_3 port (for 1 panel each with 3 ports, or selecting 3 SRS ports)

X5: PC+NC (for 3 panels, 1 panel with 2 ports, or selecting 2 SRS ports and 2 panels each with 1 port or selection 1 SRS port)

X6: PC_3 port+NC (for 2 panels, 1 panel with 3 ports, or selecting 3 SRS ports and 1 panel with 1 port or selecting 1 SRS port)

In one example, the index I depends on the coherence type reported by the UE.

For a UE capable of NC and 4 ports, I is fixed to X3, hence may not be reported.

For a UE capable of PC and 4 ports, I can be X2 or X3 or X5, hence may be reported (e.g., via a 2 bit reporting).

For a UE capable of FC and 4 ports, I can be X1 or X2 or X3 or X4 or X5 or X6 hence may be reported (e.g., via a 3 bit reporting).

For a UE capable of PC_3 port and 4 ports, I can be X2 or X3 or X4, or X5 or X6 hence may be reported (e.g., via a 3 bit reporting).

In one example, the index I does not depends on the coherence type reported by the UE.

For a UE capable of 4 ports, I can be X1 or X2 or X3 or X4 or X5 or X6, hence may be reported (e.g., via a 3 bit reporting).

In one example, the NW configures the set of allowed values for the index I or the NW configures an association between the index I and coherence type or selection of SRS antenna ports. This configuration can be subject to UE capability reported by the UE, which for example can be a list of supported UE capability values (or value set/sets) including coherence types and/or selection of SRS antenna ports for the reporting of the index I. The UE determines the index I based on the NW configuration, and the bitwidth of index I reporting is 0, 1, 2, or 2 bits if the number of supported coherence types or selection of SRS antenna ports for the reporting of the index I is 1, 2, 3, or 4, respectively.

In one example, the index I indicates an information about the coherence type and SRS antenna port(s). For example, the index I indicates one of the following:

Full-coherent (FC) indicating all SRS ports. In one example, this corresponds to the case of 1 antenna panel comprising all SRS ports. In one example, this corresponds to the case of all SRS ports being selected (or turned ON).

Partial-coherent (PC) indicating a pair or subset of 2 SRS ports. In one example, this corresponds to the case of selecting 1 antenna panel (out of multiple panels each comprising a subset of SRS ports). In one example, this corresponds to the case of a subset of (e.g., or 2 SRS) ports being selected (or turned ON) out of >2 (e.g., 4) SRS antenna ports. For 4 SRS antenna ports, since there are two SRS antenna port pairs, the index also indicates one of the two such pairs PC_PortPair1 indicating a first SRS port pair (a,b)

PC_PortPair2 indicating a second SRS port pair (c,d)

Non-coherent (NC) indicating 1 SRS port. In one example, this corresponds to the case of selecting 1 antenna panel (out of multiple panels each comprising 1 SRS port). In one example, this corresponds to the case of 1 SRS port being selected (or turned ON) out of >1 (e.g., 2 or 4) SRS antenna ports. For 2 SRS antenna ports, the index also indicates one of the two ports NC_Port1 indicating a first SRS port a NC_Port2 indicating a second SRS port b Likewise, for 4 SRS antenna ports, the index also indicates one of the four ports NC_Port1 indicating a first SRS port a NC_Port2 indicating a first SRS port b NC_Port3 indicating a first SRS port c NC_Port4 indicating a first SRS port d In one example, for an SRS resource with 4 SRS ports, the index I indicates one of the following.

X1: FC (for 1 panel with 4 ports, or selecting 4 SRS ports)

X2: PC_PortPair1 (first of the 2 panels each with 2 ports, or selecting 2 SRS ports)

X3: PC_PortPair2 (second of the 2 panels each with 2 ports, or selecting 2 SRS ports)

X4: NC_Port1 (first of the 4 panels each with 1 port or selecting 1 SRS port)

X5: NC_Port2 (second of the 4 panels each with 1 port or selecting 1 SRS port)

X6: NC_Port3 (third of the 4 panels each with 1 port or selecting 1 SRS port)

X7: NC_Port4 (fourth of the 4 panels each with 1 port or selecting 1 SRS port)

In one example, the index I depends on the coherence type reported by the UE.

For a UE capable of NC and 4 ports, I can be one of X4, . . . , X7, hence may be reported (e.g., via a 2 bit reporting).

For a UE capable of PC and 4 ports,

I can be one of X2, . . . , X7, hence may be reported (e.g., via a 3 bit reporting).

Or, I can be one of X2 and X3, hence may be reported (e.g., via a 1 bit reporting).

For a UE capable of FC and 4 ports,

I can be one of X1, . . . , X7, hence may be reported (e.g., via a 3 bit reporting).

Or, I can be one of X1, . . . , X3, hence may be reported (e.g., via a 2 bit reporting).

In one example, the index I does not depend on the coherence type reported by the UE.

For a UE capable of 4 ports, I can be one of X1, . . . , X7, hence may be reported (e.g., via a 3 bit reporting).

In one example, for an SRS resource with 4 SRS ports, the index I indicates one of the following.

X1 through X7 as in one or more examples above

X8: PC+NC_PortPair1=PC_PortPair1 (first of the 3 panels, 1 panel with 2 ports, or selecting 2 SRS ports and 2 panels each with 1 port or selecting 1 SRS port)

X9: PC+NC_Port3=NC_Port3 (second of the 3 panels, 1 panel with 2 ports, or selecting 2 SRS ports and 2 panels each with 1 port or selecting 1 SRS port)

X10: PC+NC_Port4=NC_Port4 (third of the 3 panels, 1 panel with 2 ports, or selecting 2 SRS ports and 2 panels each with 1 port or selecting 1 SRS port)

In one example, the index I depends on the coherence type reported by the UE.

For a UE capable of NC and 4 ports, I can be one of X4, . . . , X7, hence may be reported (e.g., via a 2 bit reporting).

For a UE capable of PC and 4 ports,

I can be one of X2, . . . , X7, hence may be reported (e.g., via a 3 bit reporting).

Or, I can be one of X2 and X3, hence may be reported (e.g., via a 1 bit reporting)

Or, I can be one of X2, . . . , X10, hence may be reported (e.g., via a 4 bit reporting)

For a UE capable of FC and 4 ports,

I can be one of X1, . . . , X7, hence may be reported (e.g., via a 3 bit reporting).

Or, I can be one of X1, . . . , X3, hence may be reported (e.g., via a 2 bit reporting).

Or, I can be one of X1, . . . , X10, hence may be reported (e.g., via a 4 bit reporting).

In one example, the index I does not depends on the coherence type reported by the UE.

For a UE capable of 4 ports, I can be one of X1, . . . , X10, hence may be reported (e.g., via a 4 bit reporting).

In one example, for a SRS resource with 2 SRS ports, the index I indicates one of the following.

Y1: FC (for 1 panel with 2 ports, or selecting 2 SRS ports)

Y3: NC_Port1 (first of the 2 panels each with 1 port or selecting 1 SRS port)

Y4: NC_Port2 (second of the 2 panels each with 1 port or selecting 1 SRS port)

In one example, the index I depends on the coherence type reported by the UE.

For a UE capable of NC and 2 ports, I is one of Y3 and Y4, hence may be reported (e.g., via a 1 bit reporting).

For a UE capable of FC and 2 ports, I can be Y1 or Y3 or Y4, hence may be reported (e.g., via a 2 bit reporting).

In one example, the index I does not depend on the coherence type reported by the UE.

For a UE capable of 2 ports, I can be Y1 or Y3 or Y4, hence may be reported (e.g., via a 2 bit reporting).

In one example, the NW configures the set of allowed values for the index I or the NW configures an association between the index I and coherence type or selection of SRS antenna ports. This configuration can be subject to UE capability reported by the UE, which for example can be a list of supported UE capability values (or value set/sets) including coherence types and/or selection of SRS antenna ports for the reporting of the index I. The UE determines the index I based on the NW configuration, and the bitwidth of index I reporting is 0, 1, 2, or 3 bits if the number of supported coherence types or selection of SRS antenna ports for the reporting of the index I is 1, between 2-3, between 4-7, or >=8, respectively.

In one example, the index I indicates an information about the coherence type and SRS antenna port(s). The details are the same as in one or more examples above except that for 4 SRS ports, the index I is allowed to take a value indicating selection of 3 SRS ports.

For an SRS resource with 4 SRS ports, the index I indicates one of the following.

X1: Full-coherent (FC): as in one or more examples above

Partial-coherent (PC):

X2: PC_PortPair1, X3: PC_PortPair2 as in one or more examples above

Non-coherent (NC): for 2 SRS antenna ports, the index also indicates one of the two ports NC_Port1, NC_Port2 as in one or more examples above Likewise, for 4 SRS antenna ports, the index also indicates one of the four ports X4: NC_Port1, X5: NC_Port2, X6: NC_Port3, X7: NC_Port4 as in one or more examples above PC+NC (for 2 panels, one with 3 ports, or selecting 3 SRS ports, another with 1 port): for 4 SRS antenna ports, the index indicates one of the following two X8: PC_Port123 indicating three SRS ports (a,b,c)

X9: NC_Port4 indicating fourth SRS port d

In one example, the index I depends on the coherence type reported by the UE.

For a UE capable of NC and 4 ports, I can be one of X4, . . . , X7, hence may be reported (e.g., via a 2 bit reporting).

For a UE capable of PC and 4 ports,

I can be one of X2, . . . , X7, hence may be reported (e.g., via a 3 bit reporting).

Or, I can be one of X2 and X3, hence may be reported (e.g., via a 1 bit reporting).

For a UE capable of FC and 4 ports,

I can be one of X1, . . . , X7, hence may be reported (e.g., via a 3 bit reporting).

Or, I can be one of X1, . . . , X3, hence may be reported (e.g., via a 2 bit reporting).

Or, I can be one of X1, . . . , X9, hence may be reported (e.g., via a 3 bit reporting).

For a UE capable of PC+NC and 4 ports,

I can be X8 or X9, hence may be reported (e.g., via a 1 bit reporting).

Or, I can be one of X2, . . . , X9, hence may be reported (e.g., via a 3 bit reporting).

Or, I can be one of X2, X3, X8, and X9, hence may be reported (e.g., via a 2 bit reporting).

In one example, the index I does not depend on the coherence type reported by the UE.

For a UE capable of 4 ports, I can be one of X1, . . . , X9, hence may be reported (e.g., via a 4 bit reporting).

In one example, the index I indicates an information about the coherence type. The details are the same as in one or more examples above except that for 4 SRS ports, the index I is allowed to take a value indicating selection of 3 SRS ports.

For an SRS resource with 4 SRS ports, the index I indicates one of the following.

X1-X7 as in one or more examples above

X8-X10 as in one or more examples above

PC+NC (for 2 panels, one with 3 ports, or selecting 3 SRS ports, another with 1 port): for 4 SRS antenna ports, the index indicates one of the following two X11: PC_Port123 indicating three SRS ports (a,b,c)

X12: NC_Port4 indicating fourth SRS port d

In one example, the index I depends on the coherence type reported by the UE.

For a UE capable of NC and 4 ports, I can be one of X4, . . . , X7, hence may be reported (e.g., via a 2 bit reporting).

For a UE capable of PC and 4 ports,

I can be one of X2, . . . , X7, hence may be reported (e.g., via a 3 bit reporting).

Or, I can be one of X2 and X3, hence may be reported (e.g., via a 1 bit reporting).

Or, I can be one of X2, . . . , X12, hence may be reported (e.g., via a 4 bit reporting).

For a UE capable of FC and 4 ports,

I can be one of X1, . . . , X7, hence may be reported (e.g., via a 3 bit reporting).

Or, I can be one of X1, . . . , X3, hence may be reported (e.g., via a 2 bit reporting).

Or, I can be one of X1, . . . , X10, hence may be reported (e.g., via a 4 bit reporting).

Or, I can be one of X1, . . . , X12, hence may be reported (e.g., via a 4 bit reporting).

For a UE capable of PC+NC and 4 ports,

I can be one of X8 . . . X10, hence may be reported (e.g., via a 2 bit reporting).

Or, I can be X11 or X12, hence may be reported (e.g., via a 1 bit reporting).

Or, I can be one of X8 . . . X12, hence may be reported (e.g., via a 3 bit reporting).

Or, I can be one of X2, . . . , X10, hence may be reported (e.g., via a 4 bit reporting).

Or, I can be one of X2, X3, X8, . . . X12, hence may be reported (e.g., via a 3 bit reporting).

In one example, the index I does not depend on the coherence type reported by the UE.

For a UE capable of 4 ports, I can be one of X1, . . . , X12, hence may be reported (e.g., via a 4 bit reporting).

In one example, the index I indicates an information about one TPMI or multiple TPMIs (i.e., a TPMI group), where each TPMI indicates a precoding matrix W for UL transmission (e.g., PUSCH triggered by DCI or configured via RRC, for example, via higher layer PUSCH-Config). According to Section 6.3.1.5 of REFI, for non-codebook-based UL transmission, the precoding matrix W equals the identity matrix. For codebook-based UL transmission, the precoding matrix W is given by W=1 for single-layer transmission on a single antenna port, otherwise by Table 1 to Table 6, which are copied below. The subset of TPMI indices for the three coherence types are summarized in Table 7 and Table 8, where rank=r corresponds to (and is equivalent to) r layers.

The rank (or number of layers) and the corresponding precoding matrix W are indicated to the UE using TRI and TPMI, respectively. In one example, this indication is joint via a field 'Precoding information and number of layers' in DCI, e.g., using DCI format 0_1. In another example, this indication is via higher layer RRC signaling. In one example, the mapping between a field 'Precoding information and number of layers' and TRI/TPMI is according to Section 7.3.1.1.2 of [REF10].

TABLE 1

| TPMI index | W (ordered from left to right in increasing order of TPMI index) | | | | | | | |
|---|---|---|---|---|---|---|---|---|
| 0-5 | $\frac{1}{\sqrt{2}}\begin{bmatrix} 1 \\ 0 \end{bmatrix}$ | $\frac{1}{\sqrt{2}}\begin{bmatrix} 0 \\ 1 \end{bmatrix}$ | $\frac{1}{\sqrt{2}}\begin{bmatrix} 1 \\ 1 \end{bmatrix}$ | $\frac{1}{\sqrt{2}}\begin{bmatrix} 1 \\ -1 \end{bmatrix}$ | $\frac{1}{\sqrt{2}}\begin{bmatrix} 1 \\ j \end{bmatrix}$ | $\frac{1}{\sqrt{2}}\begin{bmatrix} 1 \\ -j \end{bmatrix}$ | — | — |

TABLE 2

Precoding matrix W for single-layer transmission using four antenna ports with transform precoding disabled

| TPMI index | W (ordered from left to right in increasing order of TPMI index) | | | | | | | |
|---|---|---|---|---|---|---|---|---|
| 0-7 | $\frac{1}{2}\begin{bmatrix} 1 \\ 0 \\ 0 \\ 0 \end{bmatrix}$ | $\frac{1}{2}\begin{bmatrix} 0 \\ 1 \\ 0 \\ 0 \end{bmatrix}$ | $\frac{1}{2}\begin{bmatrix} 0 \\ 0 \\ 1 \\ 0 \end{bmatrix}$ | $\frac{1}{2}\begin{bmatrix} 0 \\ 0 \\ 0 \\ 1 \end{bmatrix}$ | $\frac{1}{2}\begin{bmatrix} 1 \\ 0 \\ 1 \\ 0 \end{bmatrix}$ | $\frac{1}{2}\begin{bmatrix} 1 \\ 0 \\ -1 \\ 0 \end{bmatrix}$ | $\frac{1}{2}\begin{bmatrix} 1 \\ 0 \\ j \\ 0 \end{bmatrix}$ | $\frac{1}{2}\begin{bmatrix} 1 \\ 0 \\ -j \\ 0 \end{bmatrix}$ |
| 8-15 | $\frac{1}{2}\begin{bmatrix} 0 \\ 1 \\ 0 \\ 1 \end{bmatrix}$ | $\frac{1}{2}\begin{bmatrix} 0 \\ 1 \\ 0 \\ -1 \end{bmatrix}$ | $\frac{1}{2}\begin{bmatrix} 0 \\ 1 \\ 0 \\ j \end{bmatrix}$ | $\frac{1}{2}\begin{bmatrix} 0 \\ 1 \\ 0 \\ -j \end{bmatrix}$ | $\frac{1}{2}\begin{bmatrix} 0 \\ 1 \\ 0 \\ -j \end{bmatrix}$ | $\frac{1}{2}\begin{bmatrix} 1 \\ 1 \\ j \\ j \end{bmatrix}$ | $\frac{1}{2}\begin{bmatrix} 1 \\ 1 \\ 1 \\ 1 \end{bmatrix}$ | $\frac{1}{2}\begin{bmatrix} 1 \\ 1 \\ -j \\ -j \end{bmatrix}$ |
| 16-23 | $\frac{1}{2}\begin{bmatrix} 1 \\ j \\ 1 \\ j \end{bmatrix}$ | $\frac{1}{2}\begin{bmatrix} 1 \\ j \\ j \\ -1 \end{bmatrix}$ | $\frac{1}{2}\begin{bmatrix} 1 \\ j \\ -1 \\ -j \end{bmatrix}$ | $\frac{1}{2}\begin{bmatrix} 1 \\ j \\ -j \\ 1 \end{bmatrix}$ | $\frac{1}{2}\begin{bmatrix} 1 \\ -1 \\ 1 \\ -1 \end{bmatrix}$ | $\frac{1}{2}\begin{bmatrix} 1 \\ -1 \\ j \\ -j \end{bmatrix}$ | $\frac{1}{2}\begin{bmatrix} 1 \\ -1 \\ -1 \\ 1 \end{bmatrix}$ | $\frac{1}{2}\begin{bmatrix} 1 \\ -1 \\ -j \\ j \end{bmatrix}$ |
| 24-27 | $\frac{1}{2}\begin{bmatrix} 1 \\ -j \\ 1 \\ -j \end{bmatrix}$ | $\frac{1}{2}\begin{bmatrix} 1 \\ -j \\ j \\ 1 \end{bmatrix}$ | $\frac{1}{2}\begin{bmatrix} 1 \\ -j \\ -1 \\ j \end{bmatrix}$ | $\frac{1}{2}\begin{bmatrix} 1 \\ j \\ j \\ 1 \end{bmatrix}$ | — | — | — | — |

TABLE 3

Precoding matrix W for two-layer transmission using two antenna ports with transform precoding disabled

| TPMI index | W (ordered from left to right in increasing order of TPMI index) | | |
|---|---|---|---|
| 0-2 | $\frac{1}{\sqrt{2}}\begin{bmatrix} 1 & 0 \\ 0 & 1 \end{bmatrix}$ | $\frac{1}{2}\begin{bmatrix} 1 & 1 \\ 1 & -1 \end{bmatrix}$ | $\frac{1}{2}\begin{bmatrix} 1 & 1 \\ j & -j \end{bmatrix}$ |

TABLE 4

Precoding matrix W for two-layer transmission using four antenna ports with transform precoding disabled

| TPMI index | W (ordered from left to right in increasing order of TPMI index) | | | |
|---|---|---|---|---|
| 0-3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2\sqrt{2}}\begin{bmatrix}1&1\\1&1\\1&-1\\1&-1\end{bmatrix}$ | $\frac{1}{2\sqrt{2}}\begin{bmatrix}1&0\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ | $\frac{1}{2\sqrt{2}}\begin{bmatrix}1&1\\j&j\\j&-j\\-1&1\end{bmatrix}$ | $\frac{1}{2\sqrt{2}}\begin{bmatrix}1&1\\-1&-1\\1&-1\\-1&1\end{bmatrix}$ | $\frac{1}{2\sqrt{2}}\begin{bmatrix}1&1\\-1&-1\\j&-j\\-j&j\end{bmatrix}$ |
| 20-21 | $\frac{1}{2\sqrt{2}}\begin{bmatrix}1&1\\-j&-j\\1&-1\\-j&j\end{bmatrix}$ | $\frac{1}{2\sqrt{2}}\begin{bmatrix}1&1\\-j&-j\\j&-j\\1&-1\end{bmatrix}$ | — | — |

TABLE 5

Precoding matrix W for three-layer transmission using four antenna ports with transform precoding disabled

| TPMI index | W (ordered from left to right in increasing order of TPMI index) | | | |
|---|---|---|---|---|
| 0-3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ | $\frac{1}{2\sqrt{3}}\begin{bmatrix}1&1&1\\1&-1&1\\1&1&-1\\1&-1&-1\end{bmatrix}$ |
| 4-6 | $\frac{1}{2\sqrt{3}}\begin{bmatrix}1&1&1\\1&-1&1\\j&j&-j\\j&-j&-j\end{bmatrix}$ | $\frac{1}{2\sqrt{3}}\begin{bmatrix}1&1&1\\-1&1&-1\\1&1&-1\\-1&1&1\end{bmatrix}$ | $\frac{1}{2\sqrt{3}}\begin{bmatrix}1&1&1\\-1&1&-1\\j&j&-j\\-j&j&j\end{bmatrix}$ | — |

TABLE 6

Precoding matrix W for four-layer transmission using four antenna ports with transform precoding disabled

| TPMI index | W (ordered from left to right in increasing order of TPMI index) | | | |
|---|---|---|---|---|
| 0-3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&j&-j\end{bmatrix}$ | $\frac{1}{4}\begin{bmatrix}1&1&1&1\\1&-1&1&-1\\1&1&-1&-1\\1&-1&-1&1\end{bmatrix}$ |

TABLE 6-continued

| TPMI index | W (ordered from left to right in increasing order of TPMI index) | | |
|---|---|---|---|
| Precoding matrix W for four-layer transmission using four antenna ports with transform precoding disabled | | | |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

TABLE 7

TPMI indices for 2 antenna ports

| Rank | Non-coherent | fullAndPartialAndNonCoherent |
|---|---|---|
| 1 | 0-1 | 0-5 |
| 2 | 0 | 0-2 |

TABLE 8

TPMI indices for 4 antenna ports

| Rank | Non-coherent | partialAndNonCoherent | fullAndPartialAndNonCoherent |
|---|---|---|---|
| 1 | 0-3 | 0-11 | 0-27 |
| 2 | 0-5 | 0-13 | 0-21 |
| 3 | 0 | 0-2 | 0-6 |
| 4 | 0 | 0-2 | 0-4 |

For 2Tx or 2 SRS ports, the index I indicates a rank 1 TPMI for 2 antenna ports (cf. Table 1). Two examples are shown in Table 9:

In one example: I=0 indicates selecting 1 SRS port (comprising an antenna panel), and I=1 indicates selecting 2 SRS ports (comprising an antenna panel)

In one example: I=0 indicates selecting 1 SRS port (comprising an antenna panel with $1^{st}$ port), I=1 indicates selecting 1 SRS port (comprising an antenna panel with $2^{nd}$ port), and I=1 indicates selecting 2 SRS ports (comprising an antenna panel with both ports)

In one example, TPMI2 in one or more examples above is replaced with any one of TPMI2-TPMI5 (in Table 9). In one example, TPMI2 in one or more examples above is replaced with multiple TPMIs (or TPMI groups) from TPMI2-TPMI5 (in Table 9).

In one example, TPMI0 in one or more examples above is replaced with TPMI1 (in Table 9).

In one example, the index I depends on the coherence type reported by the UE. Hence, I can take a value, e.g., from Table 9, depending on the coherence type.

For a UE capable of NC and 2 ports, I can take I=0 for one or more examples above (hence need not be reported), and can take one of I=0 and I=1 for one or more examples above (hence can be reported via 1-bit reporting).

For a UE capable of FC and 2 ports, I can take any value, e.g., from Table 9, hence may be reported via 1-bit reporting for one or more examples above and 2-bit reporting for one or more examples above In one example, the index I does not depend on the coherence type reported by the UE.

For a UE capable of 2 ports, I can take any value, e.g., from Table 9, hence may be reported via 1-bit reporting for one or more examples above and 2-bit reporting for one or more examples above.

TABLE 9

Index I to TPMI mapping for 2 SRS ports

| | I = 0 | I = 1 | I = 2 |
|---|---|---|---|
| Example 1 | TPMI0: $\frac{1}{\sqrt{2}}\begin{bmatrix} 1 \\ 0 \end{bmatrix}$ | TPMI2: $\frac{1}{\sqrt{2}}\begin{bmatrix} 1 \\ 1 \end{bmatrix}$ | |
| Example 2 | TPMI0: $\frac{1}{\sqrt{2}}\begin{bmatrix} 1 \\ 0 \end{bmatrix}$ | TPMI1: $\frac{1}{\sqrt{2}}\begin{bmatrix} 0 \\ 1 \end{bmatrix}$ | TPMI2: $\frac{1}{\sqrt{2}}\begin{bmatrix} 1 \\ 1 \end{bmatrix}$ |

For 4Tx or 4 SRS ports, the index I indicates a rank 1 TPMI for 4 antenna ports (cf. Table 2). Two examples are shown in Table 10:

In one example: I=0 indicates selecting 1 SRS port (comprising an antenna panel), I=1 indicates selecting 2 SRS ports (comprising an antenna panel), and I=2 indicates selecting 4 SRS ports (comprising an antenna panel)

In one example: I=0 indicates selecting 1 SRS port (comprising an antenna panel with $1^{st}$ port), I=1 indicates selecting 1 SRS port (comprising an antenna panel with $2^{nd}$ port), I=2 indicates selecting 1 SRS port (comprising an antenna panel with $3^{rd}$ port), I=3 indicates selecting 1 SRS port (comprising an antenna panel with $4^{th}$ port), I=4 indicates selecting 2 SRS ports (comprising an antenna panel with $1^{st}$ and $2^{nd}$ ports), I=5 indicates selecting 2 SRS ports (comprising an antenna panel with $3^{rd}$ and $4^{th}$ ports), and I=6 indicates selecting 4 SRS ports (comprising an antenna panel with all ports).

In one example, TPMI12 in one or more examples above is replaced with any one of TPMI12-TPM27 (in Table 10). In one example, TPMI12 in one or more examples above is replaced with multiple TPMIs (or TPMI groups) from TPMI12-TPMI27 (in Table 10).

In one example, TPMI4 in one or more examples above is replaced with TPMI8 (in Table 10). In one example, TPMI4 in one or more examples above is replaced with any For a UE capable of FC and 4 ports, I can take any value, e.g., from Table 10, hence may be reported via 2-bit reporting for one or more examples above and 3-bit reporting for one or more examples above.

In one example, the index I does not depend on the coherence type reported by the UE.

For a UE capable of 4 ports, I can take any value, e.g., from Table 10, hence may be reported via 2-bit reporting for one or more examples above and 3-bit reporting for one or more examples above.

TABLE 10

| | Index I to TPMI mapping for 4 SRS ports | | | | | | |
|---|---|---|---|---|---|---|---|
| | I = 0 | I = 1 | I = 2 | I = 3 | I = 4 | I = 5 | I = 6 |
| Example 1 | TPMI0: $\frac{1}{2}\begin{bmatrix}1\\0\\0\\0\end{bmatrix}$ | TPMI4: $\frac{1}{2}\begin{bmatrix}1\\0\\1\\0\end{bmatrix}$ | TPMI12: $\frac{1}{2}\begin{bmatrix}1\\1\\1\\1\end{bmatrix}$ | | | | |
| Example 2 | TPMI0: $\frac{1}{2}\begin{bmatrix}1\\0\\0\\0\end{bmatrix}$ | TPMI1: $\frac{1}{2}\begin{bmatrix}0\\1\\0\\0\end{bmatrix}$ | TPMI2: $\frac{1}{2}\begin{bmatrix}0\\0\\1\\0\end{bmatrix}$ | TPMI3: $\frac{1}{2}\begin{bmatrix}0\\0\\0\\1\end{bmatrix}$ | TPMI4: $\frac{1}{2}\begin{bmatrix}1\\0\\1\\0\end{bmatrix}$ | TPMI8: $\frac{1}{2}\begin{bmatrix}0\\1\\0\\1\end{bmatrix}$ | TPMI12: $\frac{1}{2}\begin{bmatrix}1\\1\\1\\1\end{bmatrix}$ | one of TPMI4-7 (in Table 10). In one example, TPMI4 in one or more examples above is replaced with multiple TPMIs (or TPMI groups) from TPMI4-TPMI7 (in Table 10). In one example, TPMI4 in one or more examples above is replaced with any one of TPMI4-11 (in Table 10). In one example, TPMI4 in one or more examples above is replaced with multiple TPMIs (or TPMI groups) from TPMI4-TPMI11 (Table 10). In one example, TPMI4 in one or more examples above is replaced with any one of TPMI8-11 (in Table 10). In one example, TPMI4 in one or more examples above is replaced with multiple TPMIs (or TPMI groups) from TPMI8-TPMI11 (in Table 10).

In one example, TPMI4 in one or more examples above is replaced with any one of TPMI4-7 (in Table 10). In one example, TPMI4 in one or more examples above is replaced with multiple TPMIs (or TPMI groups) from TPMI4-TPMI7 (in Table 10). In one example, TPMI8 in one or more examples above is replaced with any one of TPMI8-11 (in Table 10). In one example, TPMI8 in one or more examples above is replaced with multiple TPMIs (or TPMI groups) from TPMI8-TPMI11 (in Table 10).

In one example, TPMI0 in one or more examples above is replaced with any one of TPMI1-3 (in Table 10).

In one example, the index I depends on the coherence type reported by the UE. Hence, I can take a value, e.g., from Table 10, depending on the coherence type.

For a UE capable of NC and 4 ports, I can take I=0 for one or more examples above (hence need not be reported), and can take one of I=0 . . . 3 for one or more examples above (hence can be reported via 2-bit reporting).

For a UE capable of PC and 4 ports, I can take I=0 or 1 for one or more examples above (hence can be reported via 1-bit reporting), and can take one of I=0 . . . 5 for one or more examples above (hence can be reported via 3-bit reporting).

In one example, the index I indicates an information about the TPMI or TPMI group, where the TPMI indicates a precoding matrix, whose number of columns indicates number of antenna panels at the UE, and each column indicates the antenna port index or indices comprising that antenna panel.

In one example, each column of the precoding matrix is a selection vector, comprising one '1' and remaining '0' entries, and the location (or row index) corresponding to the '1' indicates the antenna port comprising the panel. Three examples are shown in Table 11, Table 12, and Table 13.

TABLE 11

| Index I to TPMI mapping for 2 SRS ports | |
|---|---|
| I = 0 | I = 1 |
| Rank 1 TPMI0: $\frac{1}{\sqrt{2}}\begin{bmatrix}1\\0\end{bmatrix}$ | Rank 2 TPMI0: $\frac{1}{\sqrt{2}}\begin{bmatrix}1 & 0\\0 & 1\end{bmatrix}$ |

TABLE 12

| Index I to TPMI mapping for 4 SRS ports | | |
|---|---|---|
| I = 0 | I = 1 | I = 2 |
| Rank 1 TPMI0: $\frac{1}{2}\begin{bmatrix}1\\0\\0\\0\end{bmatrix}$ | Rank 2 TPMI0: $\frac{1}{2}\begin{bmatrix}1 & 0\\0 & 1\\0 & 0\\0 & 0\end{bmatrix}$ | Rank 4 TPMI0: $\frac{1}{2}\begin{bmatrix}1 & 0 & 0 & 0\\0 & 1 & 0 & 0\\0 & 0 & 1 & 0\\0 & 0 & 0 & 1\end{bmatrix}$ |

---

37

TABLE 13

Index I to TPMI mapping for 4 SRS ports

| I = 0 | I = 1 | I = 2 | I = 3 |
|-------|-------|-------|-------|
| Rank 1 TPMI0: | Rank 2 TPMI0: | Rank 3 TPMI0: | Rank 4 TPMI0: |
| $\frac{1}{2}\begin{bmatrix} 1 \\ 0 \\ 0 \\ 0 \end{bmatrix}$ | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

In one example, each column of the precoding matrix is either a selection vector selecting 1 port or more than 1 ports, comprises ones '1' and zeros '0' as entries, and the location (or row index or indices) corresponding to the '1' indicate(s) the antenna port(s) comprising the panel. Two examples are shown in Table 14 and Table 15 for 2 antenna ports.

TABLE 14

Index I to TPMI mapping for 2 SRS ports

| I = 0 | I = 1 | I = 2 |
|-------|-------|-------|
| Rank 1 TPMI0: | Rank 1 TPMI2: | Rank 2 TPMI0: |
| $\frac{1}{\sqrt{2}}\begin{bmatrix} 1 \\ 0 \end{bmatrix}$ | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |

38

TABLE 15

Index I to TPMI mapping for 2 SRS ports

| I = 0 | I = 1 | I = 2 | I = 3 |
|-------|-------|-------|-------|
| Rank 1 TPMI0: | Rank 1 TPMI1: | Rank 1 TPMI2: | Rank 2 TPMI0: |
| $\frac{1}{\sqrt{2}}\begin{bmatrix} 1 \\ 0 \end{bmatrix}$ | $\frac{1}{\sqrt{2}}\begin{bmatrix} 0 \\ 1 \end{bmatrix}$ | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |

Three examples are shown in Table 16 through Table 18 for 4 antenna ports. In one example, I=5 in Table 18 indicates Rank 3 TPMI0:

$$\frac{1}{2}\begin{bmatrix} 1 & 0 & 0 \\ 0 & 1 & 0 \\ 0 & 0 & 1 \\ 0 & 0 & 0 \end{bmatrix}$$

and Rank 1 TPMI0:

$$\frac{1}{2}\begin{bmatrix} 1 \\ 0 \\ 0 \\ 0 \end{bmatrix}.$$

TABLE 16

Index I to TPMI mapping for 4 SRS ports

| I = 0 | I = 1 | I = 2 | I = 3 | I = 4 | I = 5 |
|-------|-------|-------|-------|-------|-------|
| Rank 1 TPMI0: | Rank 1 TPMI4: | Rank 1 TPMI12: | Rank 2 TPMI0: | Rank 2 TPMI6: | Rank 4 TPMI0: |
| $\frac{1}{2}\begin{bmatrix} 1 \\ 0 \\ 0 \\ 0 \end{bmatrix}$ | $\frac{1}{2}\begin{bmatrix} 1 \\ 0 \\ 1 \\ 0 \end{bmatrix}$ | $\frac{1}{2}\begin{bmatrix} 1 \\ 1 \\ 1 \\ 1 \end{bmatrix}$ | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

TABLE 17

Index I to TPMI mapping for 4 SRS ports

| I = 0 | I = 1 | I = 2 | I = 3 | I = 4 | I = 5 | I = 6 |
|-------|-------|-------|-------|-------|-------|-------|
| Rank 1 TPMI0: | Rank 1 TPMI4: | Rank 1 TPMI12: | Rank 2 TPMI0: | Rank 2 TPMI6: | Rank 3 TPMI1: | Rank 4 TPMI0: |
| $\frac{1}{2}\begin{bmatrix} 1 \\ 0 \\ 0 \\ 0 \end{bmatrix}$ | $\frac{1}{2}\begin{bmatrix} 1 \\ 0 \\ 1 \\ 0 \end{bmatrix}$ | $\frac{1}{2}\begin{bmatrix} 1 \\ 1 \\ 1 \\ 1 \end{bmatrix}$ | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

TABLE 18

Index I to TPMI mapping for 4 SRS ports

| I = 0 | I = 1 | I = 2 | I = 3 | I = 4 | I = 5 | I = 6 | I = 7 |
|-------|-------|-------|-------|-------|-------|-------|-------|
| Rank 1 TPMI0: | Rank 1 TPMI4: | Rank 1 TPMI12: | Rank 2 TPMI0: | Rank 2 TPMI6: | Rank 3 TPMI0: | Rank 3 TPMI1: | Rank 4 TPMI0: |

TABLE 18-continued

| | | | Index I to TPMI mapping for 4 SRS ports | | | | |
|---|---|---|---|---|---|---|---|
| I = 0 | I = 1 | I = 2 | I = 3 | I = 4 | I = 5 | I = 6 | I = 7 |
| $\frac{1}{2}\begin{bmatrix}1\\0\\0\\0\end{bmatrix}$ | $\frac{1}{2}\begin{bmatrix}1\\0\\1\\0\end{bmatrix}$ | $\frac{1}{2}\begin{bmatrix}1\\1\\1\\0\end{bmatrix}$ | $\frac{1}{2}\begin{bmatrix}1&0\\0&1\\0&0\\0&0\end{bmatrix}$ | $\frac{1}{2}\begin{bmatrix}1&0\\0&1\\1&0\\0&-j\end{bmatrix}$ | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0&0\\0&1&0&0\\0&0&1&0\\0&0&0&1\end{bmatrix}$ |

Two additional examples are shown in Table 19 and Table 20 for 4 antenna ports. In one example, I=14 in Table 19 indicates Rank 3 TPMI0:

$$\frac{1}{2}\begin{bmatrix}1&0&0\\0&1&0\\0&0&1\\0&0&0\end{bmatrix}$$

and Rank 1 TPMI0:

$$\frac{1}{2}\begin{bmatrix}1\\0\\0\\0\end{bmatrix}.$$

TABLE 19

| | | | | Index I to TPMI mapping for 4 SRS ports | | | |
|---|---|---|---|---|---|---|---|
| | I = 0 | I = 1 | I = 2 | I = 3 | I = 4 | I = 5 | I = 6 |
| Rank 1 TPMI | TPMI0: | TPMI1: | TPMI2: | TPMI3: | TPMI4: | TPMI8: | TPMI12: |
| | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}0\\1\\0\\1\end{bmatrix}$ | $\frac{1}{2}\begin{bmatrix}1\\1\\1\\1\end{bmatrix}$ |
| | I = 7 | I = 8 | I = 9 | I = 10 | I = 11 | I = 12 | I = 13 |
| Rank 2 TPMI | TPMI0: | TPMI1: | TPMI2: | TPMI3: | TPMI4: | TPMI5: | TPMI6: |
| | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ |
| | I = 14 | I = 15 | | | | | |
| Rank 3 TPMI | TPMI0: | TPMI1: | | | | | |
| | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | | | | | |
| | I = 16 | | | | | | |
| Rank 4 TPMI | TPMI0: | | | | | | |
| | $\frac{1}{2}\begin{bmatrix}1&0&0&0\\0&1&0&0\\0&0&1&0\\0&0&0&1\end{bmatrix}$ | | | | | | |

TABLE 20

| Index I to TPMI mapping for 4 SRS ports | | | | | | | |
|---|---|---|---|---|---|---|---|
| | I = 0 | I = 1 | I = 2 | I = 3 | I = 4 | I = 5 | I = 6 |
| Rank 1 TPMI | TPMI0: | TPMI1: | TPMI2: | TPMI3: | TPMI4: | TPMI8: | TPMI12: |
| | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}0\\1\\0\\1\end{bmatrix}$ | $\frac{1}{2}\begin{bmatrix}1\\1\\1\\1\end{bmatrix}$ |
| | I = 7 | I = 8 | I = 9 | I = 10 | I = 11 | I = 12 | I = 13 |
| Rank 2 TPMI | TPMI0: | TPMI1: | TPMI2: | TPMI3: | TPMI4: | TPMI5: | TPMI6: |
| | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ |

| I = 14 |
|---|
| Rank 3 TPMI    TPMI1: |
| $\frac{1}{2}\begin{bmatrix}1&0&0\\0&1&0\\1&0&0\\0&0&1\end{bmatrix}$ |

| I = 15 |
|---|
| Rank 4 TPMI    TPMI0: |
| $\frac{1}{2}\begin{bmatrix}1&0&0&0\\0&1&0&0\\0&0&1&0\\0&0&0&1\end{bmatrix}$ |

In one embodiment, a UE reports via its capability reporting a list of UE capability values (or value set/sets), the UE capability value (or value set/sets) including an information about the supported rank value (or UL rank or number of UL transmission layers), and the UE, based on its reported capability, is configured with a reporting of a rank value or a maximum rank value (or UL rank or number of UL MIMO layers or number of PUSCH ports or number of SRS ports or max supported number of SRS ports) in the beam report. Note that a rank value is equivalent to a number of transmission layers for UL transmission (e.g., PUSCH).

As shown in FIG. 14, a UE is configured to measure (receive) $P_1$ DL measurement RS resources (such as CSI-RS or SSB), where $P_1 \geq 1$.

The UE is further configured to use the measurement (based on the received DL measurement RS resources) to determine a beam report and report it via an UL channel (e.g., PUCCH or PUSCH), as configured by the higher layer parameter CSI-ReportConfig.

The beam report includes $N \geq 1$ pairs of (R, I) where R is a resource indicator, and I is an index corresponding to the reported R. In one example, R is SSBRI indicating SSB index, or CRI indicating CSI-RS resource index. In one example, the beam report also include a beam metric corresponding to (or associated with) each reported resource indicator R. In one example, each beam metric is L1-RSRP (as in Rel. 15). In one example, each beam metric is L1-SINR (as in Rel. 16). In one example, each beam metric is L1-RSRP or L1-SINR based on configuration, which could be subject to UE capability reported by the UE. When $N > 1$, the beam metrics are reported in a differential manner (as in Rel.15/16) with 7 bits for the first (absolute) beam metric and 4 bits for each of the remaining N−1 (differential) beam metrics with respect to the first beam metric, the details of this differential reporting is as described in Rel. 15/16 NR specification.

In one example, the index I indicates a correspondence between a CSI-RS and/or SSB resource index (indicated via R) and a UE capability value from a list of UE capability values (or value set/sets) reported by the UE (via UE capability signaling). In one example, the index I is an index of a UE capability value from a list of UE capability values (or value set/sets). The details of the list of UE capability values (or value set/sets) are described later in this disclosure. The UE shall not update or is expected to maintain the correspondence between beam reporting instances.

In one example, the beam report is configured via reportQuantity in CSI-ReportConfig that is set to an existing (Rel. 15/16) value, i.e., to 'cri-RSRP' or 'ssb-Index-RSRP' or 'cri-SINR', or 'ssb-Index-SINR'.

In one example, the beam report is configured via reportQuantity in CSI-ReportConfig that is set to a new value, i.e., 'cri-RSRP-r17' or 'ssb-Index-RSRP-r17' or 'cri-SINR-r17', or 'ssb-Index-SINR-r17', where the term 'cri' or 'ssb-Index' corresponds to the resource indicator, the term 'RSRP' or 'SINR' corresponds to the beam metric, and the term 'r17' corresponds to the index I. In one example, In one example, the term "r17" is replaced with 'CapabilityIndex', i.e., the new value is 'cri-RSRP-CapabilityIndex', 'ssb-Index-RSRP-CapabilityIndex', 'cri-SINR-CapabilityIndex', or 'ssb-Index-SINR-CapabilityIndex'.

In one example, the term "r17" is replaced with 'Set-Index', i.e., the new value is 'cri-RSRP-SetIndex', 'ssb-Index-RSRP-SetIndex', 'cri-SINR-SetIndex', or 'ssb-Index-SINR-SetIndex'.

In one example, the term "r17" is replaced with 'ValueIndex', i.e., the new value is 'cri-RSRP-ValueIndex', 'ssb-Index-RSRP-ValueIndex', 'cri-SINR-ValueIndex', 'ssb-Index-SINR-ValueIndex'

In one example, the term "r17" is replaced with 'ValueSetIndex', i.e., the new value is 'cri-RSRP-ValueSetIndex', 'ssb-Index-RSRP-ValueSetIndex', 'cri-SINR-ValueSetIndex', 'ssb-Index-SINR-ValueSetIndex'

In one example, the term "r17" is replaced with 'CapabilityValueSetIndex', i.e., the new value is 'cri-RSRP-CapabilityValueSetIndex', 'ssb-Index-RSRP-CapabilityValueSetIndex', 'cri-SINR-CapabilityValueSetIndex', 'ssb-Index-SINR-CapabilityValueSetIndex'.

In one example, the term "r17" is replaced with 'CapabilityValueIndex', i.e., the new value is 'cri-RSRP-CapabilityValueIndex', 'ssb-Index-RSRP-CapabilityValueIndex', 'cri-SINR-CapabilityValueIndex', 'ssb-Index-SINR-CapabilityValueIndex'.

In one example, the term "r17" is replaced with 'CapabilitySetIndex', i.e., the new value is 'cri-RSRP-CapabilitySetIndex', 'ssb-Index-RSRP-CapabilitySetIndex', 'cri-SINR-CapabilitySetIndex', 'ssb-Index-SINR-CapabilitySetIndex'.

The index I (or the correspondence) is determined/configured according to at least one of the following examples.

In one example, the index I indicates a rank value or a maximum rank (or UL rank) value corresponding to a reported SSBRI/CRI in a beam reporting instance.

In one example, for an SRS resource with 4 SRS ports, the index I indicates one of the following.

X1: rank 4 or max rank=4 (for 1 panel with 4 ports, or selecting 4 SRS ports)

X2: rank 2 or max rank=2 (for 2 panels each with 2 ports, or selecting 2 SRS ports)

X3: rank 1 or max rank=1 (for 4 panels each with 1 port or selecting 1 SRS port)

In one example, the index I depends on the coherence type reported by the UE.

For a UE capable of NC and 4 ports, I is fixed to X3, hence may not be reported.

For a UE capable of PC and 4 ports, I can be X2 or X3, hence may be reported (e.g., via a 1 bit reporting).

For a UE capable of FC and 4 ports, I can be X1 or X2 or X3, hence may be reported (e.g., via a 2 bit reporting).

In one example, the index I does not depend on the coherence type reported by the UE.

For a UE capable of 4 ports, I can be X1 or X2 or X3, hence may be reported (e.g., via a 2 bit reporting).

In one example, for an SRS resource with 4 SRS ports, the index I indicates one of the following.

X1: rank 4 or max rank=4 (for 1 panel with 4 ports, or selecting 4 SRS ports)

X2: rank 2 or max rank=2 (for 2 panels each with 2 ports, or selecting 2 SRS ports)

X3: rank 1 or max rank=1 (for 4 panels each with 1 port or selecting 1 SRS port)

X4: rank 4 or max rank=4 (for 3 panels one panel with 2 ports, or selection 2 SRS ports and 2 panels each with 1 port, or selecting 1 SRS ports)

In one example, the index I depends on the coherence type reported by the UE.

For a UE capable of NC and 4 ports, I is fixed to X3, hence may not be reported.

For a UE capable of PC and 4 ports, I can be X2 or X3 or X4, hence may be reported (e.g., via a 2 bit reporting).

For a UE capable of FC and 4 ports, I can be X1 or X2 or X3, hence may be reported (e.g., via a 2 bit reporting).

In one example, the index I does not depend on the coherence type reported by the UE.

For a UE capable of 4 ports, I can be X1 or X2 or X3 or X4, hence may be reported (e.g., via a 2 bit reporting).

In one example, for a SRS resource with 2 SRS ports, the index I indicates one of the following.

Y1: rank 2 or max rank=2 (for 1 panel with 2 ports, or selecting 2 SRS ports)

Y3: rank 1 or max rank=1 (for 2 panels each with 1 port or selecting 1 SRS port)

In one example, the index I depends on the coherence type reported by the UE.

For a UE capable of NC and 2 ports, I is fixed to Y3, hence may not be reported.

For a UE capable of FC and 2 ports, I can be Y1 or Y3, hence may be reported (e.g., via a 1 bit reporting).

In one example, the index I does not depends on the coherence type reported by the UE.

For a UE capable of 2 ports, I can be Y1 or Y3, hence may be reported (e.g., via a 1 bit reporting).

In one example, the NW configures the set of allowed rank values for the index I or the NW configures an association between the index I and rank values (for selection of SRS antenna ports or for the selection of panel). This configuration can be subject to UE capability reported by the UE, which for example can be a list of supported UE capability values (or value set/sets) including rank values. The UE determines the index I based on the NW configuration, and the bitwidth of index I reporting is 0, 1, 2, or 2 bits if the number of supported rank values for the reporting of the index I is 1, 2, 3, or 4, respectively.

In one example, the index I indicates a rank value corresponding to a reported SSBRI/CRI in a beam reporting instance. The details are the same as one or more examples above except that for 4 SRS ports, the index I is allowed to take a value indicating rank 3 (or selection of 3 SRS ports or selection of a panel with 3 ports).

For a SRS resource with 4 SRS ports, the index I indicates one of the following.

X1: rank 4 or max rank=4 (for 1 panel with 4 ports, or selecting 4 SRS ports)

X2: rank 2 or max rank=2 (for 2 panels each with 2 ports, or selecting 2 SRS ports)

X3: rank 1 or max rank=1 (for 4 panels each with 1 port or selecting 1 SRS port)

X4: rank 3 or max rank=3 (for 1 panel each with 3 ports, or selecting 3 SRS ports)

In one example, the index I depends on the coherence type reported by the UE.

For a UE capable of NC and 4 ports, I is fixed to X3, hence may not be reported.

For a UE capable of PC and 4 ports, I can be X2 or X3, hence may be reported (e.g., via a 1 bit reporting).

For a UE capable of FC and 4 ports, I can be X1 or X2 or X3 or X4, hence may be reported (e.g., via a 2 bit reporting).

In one example, the index I does not depends on the coherence type reported by the UE.

For a UE capable of 4 ports, I can be X1 or X2 or X3 or X4, hence may be reported (e.g., via a 2 bit reporting).

In one example, the NW configures the set of allowed rank values for the index I or the NW configures an association between the index I and rank values (for selection of SRS antenna ports or for the selection of panel). This configuration can be subject to UE capability reported by the UE, which for example can be a list of supported UE capability values (or value set/sets) including rank values. The UE determines the index I based on the NW configuration, and the bitwidth of index I reporting is 0, 1, 2, or 2 bits if the number of supported rank values for the reporting of the index I is 1, 2, 3, or 4, respectively.

In one example, the index I indicates a rank value corresponding to a reported SSBRI/CRI in a beam reporting instance. The details are the same as one or more examples above except that for 4 SRS ports, the index I is allowed to take a value indicating rank 3 (or selection of 3 SRS ports or selection of a panel with 3 ports).

For an SRS resource with 4 SRS ports, the index I indicates one of the following.

X1: rank 4 or max rank=4 (for 1 panel with 4 ports, or selecting 4 SRS ports)

X2: rank 2 or max rank=2 (for 2 panels each with 2 ports, or selecting 2 SRS ports)

X3: rank 1 or max rank=1 (for 4 panels each with 1 port or selecting 1 SRS port)

X4: rank 3 or max rank=3 (for 1 panel each with 3 ports, or selecting 3 SRS ports)

X5: rank 2+1 or max rank=2+1 (for 3 panels, 1 panel with 2 ports, or selecting 2 SRS ports and 2 panels each with 1 port or selection 1 SRS port)

X6: rank 3+1 or max rank=3+1 (for 2 panels, 1 panel with 3 ports, or selecting 3 SRS ports and 1 panel with 1 port or selecting 1 SRS port)

In one example, the index I depends on the coherence type reported by the UE.

For a UE capable of NC and 4 ports, I is fixed to X3, hence may not be reported.

For a UE capable of PC and 4 ports, I can be X2 or X3, X5 hence may be reported (e.g., via a 2 bit reporting).

For a UE capable of FC and 4 ports, I can be X1 or X2 or X3 or X4 or X5 or X6 hence may be reported (e.g., via a 3 bit reporting).

In one example, the index I does not depends on the coherence type reported by the UE.

For a UE capable of 4 ports, I can be X1 or X2 or X3 or X4 or X5 or X6, hence may be reported (e.g., via a 3 bit reporting).

In one example, the NW configures the set of allowed rank values for the index I or the NW configures an association between the index I and rank values (for selection of SRS antenna ports or for the selection of panel). This configuration can be subject to UE capability reported by the UE, which for example can be a list of supported UE capability values (or value set/sets) including rank values. The UE determines the index I based on the NW configuration, and the bitwidth of index I reporting is 0, 1, 2, or 2 bits if the number of supported coherence types or selection of SRS antenna ports for the reporting of the index I is 1, 2, 3, or 4, respectively.

In one embodiment, a UE reports via its capability reporting a list of UE capability values (or value set/sets), the UE capability value (or value set/sets) including an information about the supported number of SRS antenna ports, and the UE, based on its reported capability, is configured with a reporting of a number of SRS antenna ports or a maximum number of SRS antenna ports in the beam report.

As shown in FIG. 14, a UE is configured to measure (receive) $P_1$ DL measurement RS resources (such as CSI-RS or SSB), where $P_1 \geq 1$.

The UE is further configured to use the measurement (based on the received DL measurement RS resources) to determine a beam report and report it via an UL channel (e.g., PUCCH or PUSCH), as configured by the higher layer parameter CSI-ReportConfig.

The beam report includes $N \geq 1$ pairs of (R, I) where R is a resource indicator, and I is an index corresponding to the reported R. In one example, R is SSBRI indicating SSB index, or CRI indicating CSI-RS resource index. In one example, the beam report also include a beam metric corresponding to (or associated with) each reported resource indicator R. In one example, each beam metric is L1-RSRP (as in Rel. 15). In one example, each beam metric is L1-SINR (as in Rel. 16). In one example, each beam metric is L1-RSRP or L1-SINR based on configuration, which could be subject to UE capability reported by the UE. When N>1, the beam metrics are reported in a differential manner (as in Rel.15/16) with 7 bits for the first (absolute) beam metric and 4 bits for each of the remaining N−1 (differential) beam metrics with respect to the first beam metric, the details of this differential reporting is as described in Rel. 15/16 NR specification.

In one example, the index I indicates a correspondence between a CSI-RS and/or SSB resource index (indicated via R) and a UE capability value from a list of UE capability values (or value set/sets) reported by the UE (via UE capability signaling). In one example, the index I is an index of a UE capability value from a list of UE capability values (or value set/sets). The details of the list of UE capability values (or value set/sets) are described later in this disclosure. The UE shall not update or is expected to maintain the correspondence between beam reporting instances.

In one example, the beam report is configured via reportQuantity in CSI-ReportConfig that is set to an existing (Rel. 15/16) value, i.e., to 'cri-RSRP' or 'ssb-Index-RSRP' or 'cri-SINR', or 'ssb-Index-SINR'.

In one example, the beam report is configured via reportQuantity in CSI-ReportConfig that is set to a new value, i.e., 'cri-RSRP-r17' or 'ssb-Index-RSRP-r17' or 'cri-SINR-r17', or 'ssb-Index-SINR-r17', where the term 'cri' or 'ssb-Index' corresponds to the resource indicator, the term 'RSRP' or 'SINR' corresponds to the beam metric, and the term 'r17' corresponds to the index I. In one example, In one example, the term "r17" is replaced with 'CapabilityIndex', i.e., the new value is 'cri-RSRP-CapabilityIndex', 'ssb-Index-RSRP-CapabilityIndex', 'cri-SINR-CapabilityIndex', or 'ssb-Index-SINR-CapabilityIndex'.

In one example, the term "r17" is replaced with 'SetIndex', i.e., the new value is 'cri-RSRP-SetIndex', 'ssb-Index-RSRP-SetIndex', 'cri-SINR-SetIndex', or 'ssb-Index-SINR-SetIndex'.

In one example, the term "r17" is replaced with 'ValueIndex', i.e., the new value is 'cri-RSRP-ValueIndex', 'ssb-Index-RSRP-ValueIndex', 'cri-SINR-ValueIndex', 'ssb-Index-SINR-ValueIndex'

In one example, the term "r17" is replaced with 'ValueSetIndex', i.e., the new value is 'cri-RSRP-ValueSetIndex', 'ssb-Index-RSRP-ValueSetIndex', 'cri-SINR-ValueSetIndex', 'ssb-Index-SINR-ValueSetIndex'

In one example, the term "r17" is replaced with 'CapabilityValueSetIndex', i.e., the new value is 'cri-RSRP- CapabilityValueSetIndex', 'ssb-Index-RSRP-Capability ValueSetIndex', 'cri-SINR-CapabilityValueSetIndex', 'ssb-Index-SINR-CapabilityValueSetIndex'.

In one example, the term "r17" is replaced with 'CapabilityValueIndex', i.e., the new value is 'cri-RSRP-CapabilityValueIndex', 'ssb-Index-RSRP-CapabilityValueIndex', 'cri-SINR-CapabilityValueIndex', 'ssb-Index-SINR-CapabilityValueIndex'.

In one example, the term "r17" is replaced with 'CapabilitySetIndex', i.e., the new value is 'cri-RSRP-CapabilitySetIndex', 'ssb-Index-RSRP-CapabilitySetIndex', 'cri-SINR-CapabilitySetIndex', 'ssb-Index-SINR-CapabilitySetIndex'.

The index I is determined/configured according to at least one of the following examples.

In one example, the index I indicates a number of SRS antenna ports or a maximum number of SRS antenna ports corresponding to a reported SSBRI/CRI in a beam reporting instance.

In one example, for a SRS resource with 4 SRS ports, the index I indicates one of the following.

X1: number of SRS antenna ports=4 or maximum number of SRS antenna ports=4 (for 1 panel with 4 ports, or selecting 4 SRS ports)

X2: number of SRS antenna ports=2 or max number of SRS antenna ports=2 (for 2 panels each with 2 ports, or selecting 2 SRS ports)

X3: number of SRS antenna ports=1 or max number of SRS antenna ports=1 (for 4 panels each with 1 port or selecting 1 SRS port)

In one example, the index I depends on the coherence type reported by the UE.

For a UE capable of NC and 4 ports, I is fixed to X3, hence may not be reported.

For a UE capable of PC and 4 ports, I can be X2 or X3, hence may be reported (e.g., via a 1 bit reporting).

For a UE capable of FC and 4 ports, I can be X1 or X2 or X3, hence may be reported (e.g., via a 2 bit reporting).

In one example, the index I does not depend on the coherence type reported by the UE.

For a UE capable of 4 ports, I can be X1 or X2 or X3, hence may be reported (e.g., via a 2 bit reporting).

In one example, for an SRS resource with 4 SRS ports, the index I indicates one of the following.

X1: number of SRS antenna ports=4 or maximum number of SRS antenna ports=4 (for 1 panel with 4 ports, or selecting 4 SRS ports)

X2: number of SRS antenna ports=2 or max number of SRS antenna ports=2 (for 2 panels each with 2 ports, or selecting 2 SRS ports)

X3: number of SRS antenna ports=1 or max number of SRS antenna ports=1 (for 4 panels each with 1 port or selecting 1 SRS port)

X4: number of SRS antenna ports=4 or maximum number of SRS antenna ports=4 (for 3 panels one panel with 2 ports, or selection 2 SRS ports and 2 panels each with 1 port, or selecting 1 SRS ports)

In one example, the index I depends on the coherence type reported by the UE.

For a UE capable of NC and 4 ports, I is fixed to X3, hence may not be reported.

For a UE capable of PC and 4 ports, I can be X2 or X3 or X4, hence may be reported (e.g., via a 2 bit reporting).

For a UE capable of FC and 4 ports, I can be X1 or X2 or X3, hence may be reported (e.g., via a 2 bit reporting).

In one example, the index I does not depend on the coherence type reported by the UE.

For a UE capable of 4 ports, I can be X1 or X2 or X3 or X4, hence may be reported (e.g., via a 2 bit reporting).

In one example, for an SRS resource with 2 SRS ports, the index I indicates one of the following.

Y1: number of SRS antenna ports=2 or max number of SRS antenna ports=2 (for 1 panel with 2 ports, or selecting 2 SRS ports)

Y3: number of SRS antenna ports=1 or max number of SRS antenna ports=1 (for 2 panels each with 1 port or selecting 1 SRS port)

In one example, the index I depends on the coherence type reported by the UE.

For a UE capable of NC and 2 ports, I is fixed to Y3, hence may not be reported.

For a UE capable of FC and 2 ports, I can be Y1 or Y3, hence may be reported (e.g., via a 1 bit reporting).

In one example, the index I does not depends on the coherence type reported by the UE.

For a UE capable of 2 ports, I can be Y1 or Y3, hence may be reported (e.g., via a 1 bit reporting).

In one example, the NW configures the set of allowed number of SRS antenna ports for the index I or the NW configures an association between the index I and number of SRS antenna ports. This configuration can be subject to UE capability reported by the UE, which for example can be a list of supported UE capability values (or value set/sets) including number of SRS antenna ports. The UE determines the index I based on the NW configuration, and the bitwidth of index I reporting is 0, 1, 2, or 2 bits if the number SRS antenna ports for the reporting of the index I is 1, 2, 3, or 4, respectively.

In one example, the index I indicates a number of SRS antenna ports or a maximum number of SRS antenna ports corresponding to a reported SSBRI/CRI in a beam reporting instance. The details are the same as one or more examples above except that for 4 SRS ports, the index I is allowed to take a value indicating number of SRS antenna ports 3 or max number of SRS antenna ports=3 (or selection of 3 SRS ports or selection of a panel with 3 ports).

For an SRS resource with 4 SRS ports, the index I indicates one of the following.

X1: number of SRS antenna ports=4 or max number of SRS antenna ports=4 (for 1 panel with 4 ports, or selecting 4 SRS ports)

X2: number of SRS antenna ports 2 or max number of SRS antenna ports=2 (for 2 panels each with 2 ports, or selecting 2 SRS ports)

X3: number of SRS antenna ports 1 or max number of SRS antenna ports=1 (for 4 panels each with 1 port or selecting 1 SRS port)

X4: number of SRS antenna ports 3 or max number of SRS antenna ports=3 (for 1 panel each with 3 ports, or selecting 3 SRS ports)

In one example, the index I depends on the coherence type reported by the UE.

For a UE capable of NC and 4 ports, I is fixed to X3, hence may not be reported.

For a UE capable of PC and 4 ports, I can be X2 or X3, hence may be reported (e.g., via a 1 bit reporting).

For a UE capable of FC and 4 ports, I can be X1 or X2 or X3 or X4, hence may be reported (e.g., via a 2 bit reporting).

In one example, the index I does not depends on the coherence type reported by the UE.

For a UE capable of 4 ports, I can be X1 or X2 or X3 or X4, hence may be reported (e.g., via a 2 bit reporting).

In one example, the NW configures the set of allowed number of SRS antenna ports for the index I or the NW configures an association between the index I and number of SRS antenna ports. This configuration can be subject to UE capability reported by the UE, which for example can be a list of supported UE capability values (or value set/sets) including number of SRS antenna ports. The UE determines the index I based on the NW configuration, and the bitwidth of index I reporting is 0, 1, 2, or 2 bits if the number SRS antenna ports for the reporting of the index I is 1, 2, 3, or 4, respectively.

In one example, the index I indicates a number of SRS antenna ports or a maximum number of SRS antenna ports corresponding to a reported SSBRI/CRI in a beam reporting instance. The details are the same as one or more examples above except that for 4 SRS ports, the index I is allowed to take a value indicating number of SRS antenna ports 3 or max number of SRS antenna ports=3 (or selection of 3 SRS ports or selection of a panel with 3 ports).

For an SRS resource with 4 SRS ports, the index I indicates one of the following.

X1: number of SRS antenna ports=4 or max number of SRS antenna ports=4 (for 1 panel with 4 ports, or selecting 4 SRS ports)

X2: number of SRS antenna ports 2 or max number of SRS antenna ports=2 (for 2 panels each with 2 ports, or selecting 2 SRS ports)

X3: number of SRS antenna ports 1 or max number of SRS antenna ports=1 (for 4 panels each with 1 port or selecting 1 SRS port)

X4: number of SRS antenna ports 3 or max number of SRS antenna ports=3 (for 1 panel each with 3 ports, or selecting 3 SRS ports)

X5: number of SRS antenna ports 2+1 or max number of SRS antenna ports=2+1 (for 3 panels, 1 panel with 2 ports, or selecting 2 SRS ports and 2 panels each with 1 port or selection 1 SRS port)

X6: number of SRS antenna ports 3+1 or max number of SRS antenna ports=3+1 (for 2 panels, 1 panel with 3 ports, or selecting 3 SRS ports and 1 panel with 1 port or selecting 1 SRS port)

In one example, the index I depends on the coherence type reported by the UE.

For a UE capable of NC and 4 ports, I is fixed to X3, hence may not be reported.

For a UE capable of PC and 4 ports, I can be X2 or X3, X5 hence may be reported (e.g., For a UE capable of FC and 4 ports, I can be X1 or X2 or X3 or X4 or X5 or X6 hence may be reported (e.g., via a 3 bit reporting).

In one example, the index I does not depends on the coherence type reported by the UE.

For a UE capable of 4 ports, I can be X1 or X2 or X3 or X4 or X5 or X6, hence may be reported (e.g., via a 3 bit reporting).

In one example, the NW configures the set of allowed number of SRS antenna ports for the index I or the NW configures an association between the index I and number of SRS antenna ports. This configuration can be subject to UE capability reported by the UE, which for example can be a list of supported UE capability values (or value set/sets) including number of SRS antenna ports. The UE determines the index I based on the NW configuration, and the bitwidth of index I reporting is 0, 1, 2, or 2 bits if the number SRS antenna ports for the reporting of the index I is 1, 2, 3, or 4, respectively.

In one embodiment, a UE reports via its capability reporting a list of UE capability values (or value set/sets), the UE capability value (or value set/sets) including an information about the supported number of SRS resources, and the UE, based on its reported capability, is configured with a reporting of a number of SRS resources or a maximum number of SRS resources in the beam report. In one example, each SRS resource is a 1-port resource. The rest of the embodiment is the same as described above except that number of SRS antenna ports is replaced with number of SRS resources.

In one embodiment, the indication of coherence type, the rank value, or number of SRS antenna ports can be extended from one to multiple reporting quantities where a reporting quantity is either coherence type, the rank value, or number of SRS antenna ports.

In one example, the beam report includes (R, I), where R is a resource indicator (SSBRI/CRI) and the index I is a joint index indicating N>1 reporting quantities.

In one example, the beam report includes (R, I), where R is a resource indicator (SSBRI/CRI) and the index I=[$I_1$, . . . $I_N$] comprises N indices, and i-th index $I_i$ corresponds to i-th reporting quantity.

In one example, the beam report includes (R, I), where R is a joint indicator indicating N>1 resource indicators (each either SSBRI or CRI) and the index I is a joint index indicating N>1 reporting quantities.

In one example, the beam report includes (R, I), where R is a joint indicator indicating N>1 resource indicators (each either SSBRI or CRI) and the index I=[$I_1$, . . . $I_N$] comprises N indices, and i-th index $I_i$ corresponds to i-th reporting quantity.

In one example, the beam report includes (R, I), where R=[$R_1$, . . . $R_N$] comprises N resource indicators, and i-th indicator $R_i$ is a resource indicator (SSBRI or CRI) and the index I is a joint index indicating N>1 reporting quantities.

In one example, the beam report includes (R, I), where R=[$R_1$, . . . $R_N$] comprises, and i-th indicator $R_i$ is a resource indicator (SSBRI or CRI) and the index I=[$I_1$, . . . $I_N$] comprises N indices, and i-th index $I_i$ corresponds to i-th reporting quantity.

At least one of the following is used/configured regarding N.

In one example, N is fixed (e.g., N=2).

In one example, N depends on the max number of SRS ports supported by the UE.

In one example, N is configured, e.g., from {1,2} or {1,2,4} or {1,2,3,4}.

In one example, N is configured from {1,2} or {1,2,4} or {1,2,3,4} if the UE supports a maximum of 4 SRS ports, and from {1,2} if the UE supports a maximum of 2 SRS ports, where the maximum number of supported SRS ports is reported by the UE as part of UE capability.

In one example, N is reported by the UE as part of the beam report, or as part of the UE capability reporting. When N is reported as part of the beam report, then a two-part UCI can be used, wherein UCI part 1 include beam report for a fixed number (e.g., 1) reporting quantities, and UCI part 2 includes the remaining (e.g., N−1) reporting quantities, and the information about the remaining reporting quantities can be included in UCI part 1.

In one embodiment, a UE can be configured with multiple SRS resource sets with different number of SRS antenna ports, where the SRS resources in a SRS resource set have the same number of SRS antenna ports. In one example, multiple SRS resource sets can be used to distinguish multiple antenna panels at the UE.

Or, a UE can be configured with multiple SRS resource sets with different number of SRS antenna ports, where the SRS resources in a SRS resource set have different number of SRS antenna ports. In one example, multiple SRS resource sets can be used to distinguish multiple antenna panels at the UE.

Or, a UE can be configured with multiple SRS resource sets with different number of SRS antenna ports, where the SRS resources in a SRS resource set have the same or different number of SRS antenna ports. In one example, multiple SRS resource sets can be used to distinguish multiple antenna panels at the UE.

Alternatively, a UE can be configured with multiple SRS resources with different number of SRS antenna ports, where the multiple SRS resources are within the same SRS resource set. In one example, multiple SRS resources can be used to distinguish multiple antenna panels at the UE.

In one example, this can be configured only when the UE is configured with a codebook-based UL transmission (e.g., via the higher layer parameter txConfig set to 'codebook').

In one example, this can be configured only when the UE is configured with a non-codebook-based UL transmission (e.g., via the higher layer parameter txConfig set to 'non-Codebook').

In one example, this can be configured for both cases when the UE is configured with a codebook-based UL transmission (e.g., via the higher layer parameter txConfig set to 'codebook') or when the UE is configured with a non-codebook-based UL transmission (e.g., via the higher layer parameter txConfig set to 'nonCodebook').

The number (M) of SRS resource sets or SRS resources can be equal to number of panel entities (M), where a panel entity is functionally equivalent to any of the following.

A transmit-receive (Tx-Rx) entity such as antenna panel, transmit-receive point (TRP), antenna port, antenna, antenna group, antenna port group, remote radio head (RRH).

A resource set comprising one or multiple resources (SRS resource set, CSI-resource set)

A resource or resources (SRS, CSI-RS, SSB).

A transmission process.

The value M is according to at least one of the following example.

In one example, it is fixed, e.g., 2, 3, or 4. The fixed value may depend on the number of antenna ports at the UE.

In one example, it is based on UE capability from {1,2}, {1,2,3}, {1,2,3,4}, {2,3}, {2,3,4}, or {2,4}.

In one example, it is based on UE capability which is in terms of number of different max number of SRS ports.

For 2 SRS ports, {1_2} or {1_2, 2_2}, where x_y indicates the UE can be configured with two SRS resources or resource sets with x and y SRS ports.

For 4 SRS ports, {1_2, 1_4, 2_4, 1_2_4} or {1_2, 1_3, 1_4, 2_3, 3_4, 2_4, 1_2_4, 1_2_3, 1_3_4, 2_3_4, 1_2_3_4}, x_y_z indicates the UE can be configured with three SRS resources or resource sets with x, y and z SRS ports In one example, the number or the maximum number (M) of SRS resource sets with different number of SRS antenna ports depends on the number of antenna ports (Tx-Rx or RF chains or power amplifiers) at the UE. For example, M=2 for a UE with 2 antenna ports, and M=2 or 3 for a UE with 4 antenna ports.

For 2 sets, the different number of SRS antenna ports can be (N1, N2)=(2,1), (4,1), or (4,2)

For 3 sets, the different number of SRS antenna ports can be (N1, N2, N3)=(4,2,1)

For a UE with 2 antenna ports, (N1, N2)=(2,1).

For a UE with 4 antenna ports, (N1, N2)=(2,1), (4,1), (4,2) and (N1, N2, N3)=(4,2,1).

The number ($N_{SRS}$) of SRS resources in each SRS resource set can be according to at least one of the following examples.

In one example, $N_{SRS}$ is fixed, e.g., 2.

In one example, $N_{SRS} \in \{1, \ldots, m\}$ where m is a maximum value which can be determined based on UE capability reporting. In one example, m is fixed to 2. In one example, m can be reported from {2,3}, {2,3}, {2,4}, {3,4} etc.

In one example, the maximum value m is the same for all resource sets. In one example, the maximum value m is separate for each set.

In one example, the total number of SRS resources across all SRS resource sets can be a maximum value n which can be fixed (e.g., 4) or can be determined based on UE capability reporting. The number of SRS resources in each resource set can be any value {1, 2, . . . } as long as the total number of SRS resources across all resource sets is less or equal to n.

In one embodiment, the UE is further indicated with a SRS resource indicator (SRI), e.g., via UL-related DCI, which is based on the SRS resources corresponding to one SRS resource set (S) among the multiple SRS resource sets (S1,S2, . . . ), where the SRS resource set (S) can be aligned with the UE reported information corresponding to the index I. In one example, the information about the SRS resource set (S) that is aligned with the UE reported information is provided according to at least one of the following examples.

In one example, a SRS resource set indicator is provided/indicated via UL-DCI (e.g., DCI format 0_1 or 0_2 in NR) that indicates the information (e.g., index) about the SRS resource set (S).

In one example, the information (e.g., index) about the SRS resource set (S) is provided/indicated jointly with the SRI. For example, SRI can indicate an index pair (a,b), where a=an index of the SRS resource set, and b=an index of a SRS resource within the SRS resource set with index a. An example is illustrated in Table 21. The payload of SRI indication is then $\lceil \log_2(\Sigma_{i=1}^{t} N_i) \rceil$ bits, where t is the number of SRS resource sets, and $N_i$ is the number of SRS resources in the i-th SRS resource set.

In one example, the information (e.g., index) about the SRS resource set (S) is provided/indicated via UL BWP switch. For instance, the UE can be configured with multiple UL BWPs, each with different number of SRS ports, and the information (e.g., index) about the SRS resource set (S) is provided/indicated by updating/indicating an index of one of the configured UL BWPs (e.g., whose number of SRS ports is aligned with the UE reported information). Such UL BWP switch/update can be indicated via UL-DCI (e.g., DCI format 0_1 or 0_2 in NR).

TABLE 21

| SRI | SRS resource set index (a) | SRS resource index (b) |
|---|---|---|
| 0 | 0 | 0 |
| 1 | 0 | 1 |
| . . . | . . . | . . . |
| $N_1 - 1$ | 0 | $N_1 - 1$ |
| $N_1$ | 1 | 0 |
| $N_1 + 1$ | 1 | 1 |
| . . . | . . . | . . . |
| $N_1 + N_2 - 1$ | 1 | $N_2 - 1$ |

In one example, when there are two SRS resource sets (S1,S2) with different (max supported) number of SRS ports (N1,N2), respectively, the alignment between the set (S) and the reported index I is according to at least one of the following examples.

In one example, when (N1,N2)=(2,1), the alignment is determined as follows.

(Case 1.a) If the index I indicates a coherence type and/or TPMI corresponding to FC (or indicates rank=2 or max rank=2 or number of SRS ports=2 or max number of SRS ports=2), the SRS resource set for SRI indication is S=S1 (i.e., SRS resources with 2 SRS ports). The codebookSubset (UL codebook) for PUSCH is given by the following.

In one example, the codebookSubset doesn't depend on the coherence capability reported by the UE, and codebookSubset='fullAndPartialAndNonCoherent', abbreviated as FC+PC+NC.

In one example, the codebookSubset depends on the coherence capability reported by the UE. In particular, codebookSubset=FC+PC+NC if the UE is capable of FC+PC+NC transmission codebookSubset=NC if the UE is capable of NC transmission if the UE is capable of 'partialAndNonCoherent' (abbreviated as PC+NC) transmission and is equipped with 4 antenna ports, one of the following is used regarding the codebookSubset.

codebookSubset=FC+PC+NC for 2 antenna ports or codebookSubset=NC for 2 antenna ports or codebookSubset=FC+PC+NC or NC for 2 antenna ports depending on separate UE capability and/or RRC configuration (Case 1.b) If the index I indicates a coherence type and/or TPMI corresponding to PC, the SRS resource set for SRI indication is according to at least one of the following.

S=S1 (i.e., SRS resources with 2 SRS ports). The codebookSubset is as described in Case 1.a.

S=S2 (i.e., SRS resources with 1 SRS port). There is no need for codebookSubset (due to 1-port SRS resources)

S=S1 or S2 based on UE capability and/or RRC configuration.

(Case 1.c) If the index I indicates a coherence type and/or TPMI corresponding to NC (or indicates rank=1 or max rank=1 or number of SRS ports=1 or max number of SRS ports=1), the SRS resource set for SRI indication is S=S2.

In one example, there is a restriction on the UE reporting when (N1,N2)=(2,1). For example, the UE reporting of index I is restricted to (FC, NC) or (FC, PC) or (PC, NC).

In one example, there is no restriction on the UE reporting when (N1,N2)=(2,1). For example, the UE reporting of index I can be from (FC, PC, NC).

In one example, when (N1,N2)=(4,1), the alignment is determined as follows.

(Case 2.a) If the index I indicates a coherence type and/or TPMI corresponding to FC (or indicates rank=4 or max rank=4 or number of SRS ports=4 or max number of SRS ports=4), the SRS resource set for SRI indication is S=S1 (i.e., SRS resources with 4 SRS ports). The codebookSubset (UL codebook) for PUSCH is given by the following.

In one example, the codebookSubset doesn't depend on the coherence capability reported by the UE, and codebookSubset='fullAndPartialAndNonCoherent', abbreviated as FC+PC+NC.

In one example, the codebookSubset depends on the coherence capability reported by the UE. In particular, codebookSubset=FC+PC+NC if the UE is capable of FC+PC+NC transmission codebookSubset=PC+NC if the UE is capable of PC+NC transmission codebookSubset=NC if the UE is capable of NC transmission (Case 2.b) If the index I indicates a coherence type and/or TPMI corresponding to PC (or indicates rank=2 or max rank=2 or number of SRS ports=2 or max number of SRS ports=2), the SRS resource set for SRI indication is according to at least one of the following.

S=S1 (i.e., SRS resources with 4 SRS ports). The codebookSubset is as described in Case 2.a.

S=S2 (i.e., SRS resources with 1 SRS port). There is no need for codebookSubset (due to 1-port SRS resources)

S=S1 or S2 based on UE capability and/or RRC configuration.

(Case 2.c) If the index I indicates a coherence type and/or TPMI corresponding to NC (or indicates rank=1 or max rank=1 or number of SRS ports=1 or max number of SRS ports=1), the SRS resource set for SRI indication is S=S2.

In one example, there is a restriction on the UE reporting when (N1,N2)=(4,1). For example, the UE reporting of index I is restricted to (FC, NC) or (FC, PC) or (PC, NC). In one example, there is no restriction on the UE reporting when (N1,N2)=(4,1). For example, the UE reporting of index I can be from (FC, PC, NC).

In one example, when (N1,N2)=(4,2), the alignment is determined as follows.

(Case 3.a) If the index I indicates a coherence type and/or TPMI corresponding to FC (or indicates rank=4 or max rank=4 or number of SRS ports=4 or max number of SRS ports=4), the SRS resource set for SRI indication is S=S1 (i.e., SRS resources with 4 SRS ports). The codebookSubset (UL codebook) for PUSCH is given by the following.

In one example, the codebookSubset doesn't depend on the coherence capability reported by the UE, and codebookSubset='fullAndPartialAndNonCoherent', abbreviated as FC+PC+NC.

In one example, the codebookSubset depends on the coherence capability reported by the UE. In particular, codebookSubset=FC+PC+NC if the UE is capable of FC+PC+NC transmission codebookSubset=PC+NC if the UE is capable of PC+NC transmission codebookSubset=NC if the UE is capable of NC transmission (Case 3.b) If the index I indicates a coherence type and/or TPMI corresponding to PC (or indicates rank=2 or max rank=2 or number of SRS ports=2 or max number of SRS ports=2), the SRS resource set for SRI indication is according to at least one of the following.

S=51 (i.e., SRS resources with 4 SRS ports). The code-bookSubset is as described in Case 3.a.

S=S2 (i.e., SRS resources with 2 SRS port). The code-bookSubset is as described in Case 1.a.

S=51 or S2 based on UE capability and/or RRC configuration.

(Case 3.c) If the index I indicates a coherence type and/or TPMI corresponding to NC (or indicates rank=1 or max rank=1 or number of SRS ports=1 or max number of SRS ports=1), the SRS resource set for SRI indication is S=S2. The codebookSubset is as described in Case 1.a.

In one example, there is a restriction on the UE reporting when (N1,N2)=(4,2). For example, the UE reporting of index I is restricted to (FC, NC) or (FC, PC) or (PC, NC).

In one example, there is no restriction on the UE reporting when (N1,N2)=(4,2). For example, the UE reporting of index I can be from (FC, PC, NC).

In one example, when there are three SRS resource sets (S1,S2,S3) with different (max supported) number of SRS ports (N1,N2,N3), respectively, the alignment between the set (S) and the reported index I is according to at least one of the following examples.

In one example, when (N1,N2,N3)=(4,2,1), the alignment is determined as follows. If the index I indicates a coherence type and/or TPMI corresponding to FC (or indicates rank=4 or max rank=4 or number of SRS ports=4 or max number of SRS ports=4), the SRS resource set for SRI indication is S=S1 (i.e., SRS resources with 4 SRS ports). The codebookSubset (UL codebook) for PUSCH is given by the following.

In one example, the codebookSubset doesn't depend on the coherence capability reported by the UE, and codebookSubset='fullAndPartialAndNonCoherent', abbreviated as FC+PC+NC.

In one example, the codebookSubset depends on the coherence capability reported by the UE. In particular, codebookSubset=FC+PC+NC if the UE is capable of FC+PC+NC transmission
codebookSubset=PC+NC if the UE is capable of PC+NC transmission
codebookSubset=NC if the UE is capable of NC transmission If the index I indicates a coherence type and/or TPMI corresponding to PC (or indicates rank=2 or max rank=2 or number of SRS ports=2 or max number of SRS ports=2), the SRS resource set for SRI indication is S=S2 (i.e., SRS resources with 2 SRS ports). The codebookSubset is as described in Case 1.a.

If the index I indicates a coherence type and/or TPMI corresponding to NC (or indicates rank=1 or max rank=1 or number of SRS ports=1 or max number of SRS ports=1), the SRS resource set for SRI indication is S=S3 (i.e., SRS resources with 1 SRS port).

In one embodiment, same as one or more embodiments described above except that a different number of SRS antenna ports is replaced with one of the following:
different maximum number of SRS antenna ports
different rank (or UL rank)
different maximum rank (or UL rank)
different number of UL MIMO layers
different maximum number of UL MIMO layers
different maximum number of antenna ports
different maximum number of RF chains
different maximum number of PUSCH ports
different maximum number of PUCCH ports In one embodiment, a panel entity corresponds to a reported CSI-RS and/or SSB resource index in a beam reporting instance. The correspondence between a panel entity and a reported CSI-RS and/or SSB resource index is informed to NW. Note that the correspondence between a CSI-RS and/or SSB resource index and a panel entity is determined by the UE (analogous to Rel-15/16). The UE reports a maximum number of SRS ports for each panel entity (e.g., as part of UE capability).

The UE can be configured with multiple SRS resources or resources sets with different Z, where Z is one of maximum number of UL MIMO layers or (max supported) number of SRS ports or number of resources (e.g., SRS, CSI-RS, SSB) or one of the quantities described in embodiments above.

The UE is further indicated with a SRS resource indicator (SRI), e.g., via UL-related DCI, which is based on the SRS resources corresponding to one SRS resource set among the multiple SRS resource sets, where the SRS resource set can be aligned with the UE capability for the panel entity.

The UE is further configured to perform measurement, and report a beam report as described in one or more embodiments above.

In one embodiment, the UE reports a list of K≥1 (one or multiple) UE capability value set(s). In one example, each UE capability value set corresponds to (or associated with) an antenna panel at the UE. In one example, each UE capability value set corresponds to (or associated with) a group of antenna ports at the UE. In one example, each UE capability value set corresponds to (or associated with) a Tx-Rx entity at the UE.

Each UE capability value set comprises at least one of the following components:

C1: (max supported) number of SRS ports. In one example, the candidate values of the (max supported) number of SRS ports include {2,4} or {1,2} or {1,4} or {1,2,4}. The rest of the details are according to one or more embodiments described above.

C2: number of UL transmission layers. In one example, the candidate values of the UL transmission layers include {1,2} for a UE with 2 antenna ports, and is {1,2,3,4} or {1,2,4} for a UE with 4 antenna ports. The rest of the details are similar to one or more embodiments described above.

C3: coherence type. In one example, the candidate values of the coherence type include {FC, NC} for a UE with 2 antenna ports, and is {FC, PC, NC} for a UE with 4 antenna ports. The rest of the details are similar to one or more embodiments described above.

C4: TPMI. In one example, the candidate values of the TPMI is as described in this disclosure. The rest of the details are similar to one or more embodiments described above.

C5: number of SRS resources within one SRS resource set. In one example, the candidate values of the number of SRS resources include {1,2} or {1,2,4}. The rest of the details are similar to one or more embodiments described above.

In one example, the UE reports K=1 UE capability value set.

In one example, the UE capability value set is S1 comprising one component, where the component is according to one of the following examples.
In one example, the component is C1.
In one example, the component is C2.
In one example, the component is C3.
In one example, the component is C4.
In one example, the component is C5.

In one example, the UE capability value set is S2 comprising two components, where the components are according to one of the following examples.

In one example, the components are {C1, C2}.
In one example, the components are {C1, C3}.
In one example, the components are {C1, C4}.
In one example, the components are {C1, C5}.
In one example, the components are {C2, C3}.
In one example, the components are {C2, C4}.
In one example, the components are {C2, C5}.
In one example, the components are {C3, C4}.
In one example, the components are {C3, C5}.
In one example, the components are {C4, C5}.
In one example, the UE capability value set is S3 comprising three components, where the components are according to one of the following examples.
In one example, the components are {C1, C2, C3}.
In one example, the components are {C1, C2, C4}.
In one example, the components are {C1, C2, C5}.
In one example, the components are {C1, C3, C4}.
In one example, the components are {C1, C3, C5}.
In one example, the components are {C1, C4, C5}.
In one example, the components are {C2, C3, C4}.
In one example, the components are {C2, C3, C5}.
In one example, the components are {C2, C4, C5}.
In one example, the components are {C3, C4, C5}.
In one example, the UE capability value set is S4 comprising four components, where the components are according to one of the following examples.
In one example, the components are {C1, C2, C3, C4}.
In one example, the components are {C1, C2, C3, C5}.
In one example, the components are {C1, C2, C4, C5}.
In one example, the components are {C1, C3, C4, C5}.
In one example, the components are {C2, C3, C4, C5}.
In one example, the UE capability value set is S5 comprising five components, where the components are {C1, C2, C3, C4, C5}.
In one example, the UE reports K=2 UE capability value sets, namely T1 and T2.
The two sets T1 and T2 have the same number of components, i.e., both has the same UE capability Sx, where x is one of 1, . . . , 5.
In one example, Sx is the same for the two sets.
In one example, Sx is different for two sets.
In one example, Sx can be the same or different for two sets.
The two sets T1 and T2 have different number of components, i.e., the UE capability for (T1,T2) is (Sx,Sy), where (x,y) is one of (1,2), (1,3), (1,4), (1,5), (2,3), (2,4), (2,5), (3,4), (3,5), and (4,5).
The two sets T1 and T2 can be the same or different, i.e., (T1,T2)=(Sx,Sy), where (x,y) is one of (1,1), (2,2), (3,3), (4,4), (5,5), (1,2), (1,3), (1,4), (1,5), (2,3), (2,4), (2,5), (3,4), (3,5), and (4,5).
In one example, the UE reports K>2 UE capability value sets, namely T1 . . . $T_K$.
The sets T1 . . . $T_K$ have the same number of components, i.e., both has the same UE capability Sx, where x is one of 1, . . . , 5.
In one example, Sx is the same for the K capability sets.
In one example, Sx is different for K capability sets.
In one example, Sx can be the same or different for K capability sets.
The sets T1 . . . $T_K$ have different number of components.
The sets T1 . . . $T_K$ can be the same or different.
In one example, the value of K is reported by the UE, e.g., as part of the UE capability reporting.
In one embodiment, when each UE capability set comprises a single capability value (component), the UE reports a list of K≥1 (one or multiple) UE capability values. In one example, each UE capability value corresponds to (or associated with) an antenna panel at the UE. In one example, each UE capability value corresponds to (or associated with) a group of antenna ports at the UE. In one example, each UE capability value corresponds to (or associated with) a Tx-Rx entity at the UE.

Each UE capability value comprises (corresponds to) at least one of the following components:

C1: (max supported) number of SRS ports. In one example, the candidate values of the (max supported) number of SRS ports include {2,4} or {1,2} or {1,4} or {1,2,4}. The rest of the details are similar to one or more embodiments described above.

C2: number of UL transmission layers. In one example, the candidate values of the UL transmission layers include {1,2} for a UE with 2 antenna ports, and is {1,2,3,4} or {1,2,4} for a UE with 4 antenna ports. The rest of the details are similar to one or more embodiments described above.

C3: coherence type. In one example, the candidate values of the coherence type include {FC, NC} for a UE with 2 antenna ports, and is {FC, PC, NC} for a UE with 4 antenna ports. The rest of the details are similar to one or more embodiments described above.

C4: TPMI. In one example, the candidate values of the TPMI is as described in this disclosure. The rest of the details are similar to one or more embodiments described above C5: number of SRS resources within one SRS resource set. In one example, the candidate values of the number of SRS resources include {1,2} or {1,2,4}. The rest of the details are similar to one or more embodiments described above.

In one example, the UE reports K=1 UE capability value.
In one example, the UE capability value is S1 comprising one component, where the component is according to one of the following examples.
In one example, the component is C1.
In one example, the component is C2.
In one example, the component is C3.
In one example, the component is C4.
In one example, the component is C5.
In one example, the UE capability value is S2 comprising two components, where the components are according to one of the following examples.
In one example, the components are {C1, C2}.
In one example, the components are {C1, C3}.
In one example, the components are {C1, C4}.
In one example, the components are {C1, C5}.
In one example, the components are {C2, C3}.
In one example, the components are {C2, C4}.
In one example, the components are {C2, C5}.
In one example, the components are {C3, C4}.
In one example, the components are {C3, C5}.
In one example, the components are {C4, C5}.
In one example, the UE capability value is S3 comprising three components, where the components are according to one of the following examples.
In one example, the components are {C1, C2, C3}.
In one example, the components are {C1, C2, C4}.
In one example, the components are {C1, C2, C5}.
In one example, the components are {C1, C3, C4}.
In one example, the components are {C1, C3, C5}.
In one example, the components are {C1, C4, C5}.
In one example, the components are {C2, C3, C4}.
In one example, the components are {C2, C3, C5}.
In one example, the components are {C2, C4, C5}.

In one example, the components are {C3, C4, C5}.

In one example, the UE capability value is S4 comprising four components, where the components are according to one of the following examples.

In one example, the components are {C1, C2, C3, C4}.

In one example, the components are {C1, C2, C3, C5}.

In one example, the components are {C1, C2, C4, C5}.

In one example, the components are {C1, C3, C4, C5}.

In one example, the components are {C2, C3, C4, C5}.

In one example, the UE capability value is S5 comprising five components, where the components are {C1, C2, C3, C4, C5}.

In one example, the UE reports K=2 UE capability values, namely T1 and T2.

The two capability values T1 and T2 have the same number of components, i.e., both has the same UE capability Sx, where x is one of 1, . . . , 5.

In one example, Sx is the same for the two capability values.

In one example, Sx is different for the two capability values.

In one example, Sx can be the same or different for the two capability values.

The two capability values T1 and T2 have different number of components, i.e., the UE capability for (T1,T2) is (Sx,Sy), where (x,y) is one of (1,2), (1,3), (1,4), (1,5), (2,3), (2,4), (2,5), (3,4), (3,5), and (4,5).

The two capability values T1 and T2 can be the same or different, i.e., (T1,T2)=(Sx,Sy), where (x,y) is one of (1,1), (2,2), (3,3), (4,4), (5,5), (1,2), (1,3), (1,4), (1,5), (2,3), (2,4), (2,5), (3,4), (3,5), and (4,5).

In one example, the UE reports K>2 UE capability values, namely T1 . . . $T_K$.

The capability values T1 . . . $T_K$ have the same number of components, i.e., both has the same UE capability Sx, where x is one of 1, . . . , 5.

In one example, Sx is the same for the K capability values.

In one example, Sx is different for the K capability values.

In one example, Sx can be the same or different for the K capability values.

The K capability values T1 . . . $T_K$ have different number of components.

The K capability values T1 . . . $T_K$ can be the same or different.

In one example, the value of K is reported by the UE, e.g., as part of the UE capability reporting.

In one embodiment, the UE reports a list of K≥1 (one or multiple) UE capability values (or set/sets), wherein the list includes capability values from Table 21.

TABLE 22

| UE capability values (or set/sets) | (max supported) number of SRS ports | number of UL transmission layers | coherence type | TPMI | number of SRS resources |
|---|---|---|---|---|---|
| C1 | 2Tx UE: {1, 2} 4Tx UE: {1, 2}, {1, 4}, {2, 4}, {1, 2, 4} | | | | |
| C2 | | 2Tx UE: {1, 2} 4Tx UE: {1, 2, 3, 4} | | | |
| C3 | | | 2Tx UE: {FC, NC} 4Tx UE: {FC, PC, NC} | | |
| C4 | | | | 2Tx UE: {rank 1 TPMIs 0, 2} 4Tx UE: {rank 1 TPMIs 0, 4, 12} | |
| C5 | | | | | {1, 2}, {2, 4}, {2}, {1} |
| {Cx, Cy}, (x, y) = (1, 2), (1, 3), (1, 4), (1, 5), (2, 3), (2, 4), (2, 5), (3, 4), (3, 5), or (4, 5) | Candidate values of Cx and Cy are as described in rows for C1-C5 above | | | | |
| {Cx, Cy, Cz}, where x ≠ y ≠ z and x, y, z belong to {1, 2, . . . , 5} | Candidate values of Cx, Cy, and Cz are as described in rows for C1-C5 above | | | | |

TABLE 22-continued

| UE capability values (or set/sets) | (max supported) number of SRS ports | number of UL transmission layers | coherence type | TPMI | number of SRS resources |
|---|---|---|---|---|---|
| {Cx, Cy, Cz, Cw}, where x ≠ y ≠ z ≠ w and x, y, z, w belong to {1, 2, . . . , 5} | Candidate values of Cx, Cy, Cz, and Cw are as described in rows for C1-C5 above | | | | |
| {C1, C2, C3, C4, C5} | Candidate values of C1, . . . , C5 are as described in rows for C1-C5 above | | | | |

In one embodiment, the UE configured to report the correspondence or the index I, as described in this disclosure, according to at least one of the following examples.

In one example, the correspondence or the index I is multiplexed/reported together with the resource indicator R (e.g., CRI or SSBRI) and/or the associated beam metric (e.g., L1-RSRP or L1-SINR) via uplink control information (UCI) transmitted via layer 1 channel such as PUCCH or PUSCH, for example, as configured by the higher layer parameter CSI-ReportConfig. In one example, the PUSCH carrying this information can be one of the following:

dynamic grant PUSCH
Type 1 configured grant PUSCH
Type 2 configured grant PUSCH
MsgA PUSCH associated with Type 2 random access procedure
Msg3 PUSCH associated with Type 1 random access procedure.

In one example, the correspondence or the index I is reported separately from the resource indicator R (e.g., CRI or SSBRI) and/or the associated beam metric (e.g., L1-RSRP or L1-SINR), where the resource indicator R (e.g., CRI or SSBRI) and/or the associated beam metric (e.g., L1-RSRP or L1-SINR) are reported via uplink control information (UCI) transmitted via a first layer 1 (L1) channel such as PUCCH or PUSCH, for example, as configured by the higher layer parameter CSI-ReportConfig; and the correspondence is reported via a second UCI (different from the first UCI) transmitted via second L1 channel. In one example, the PUSCH can be one of the examples in one or more examples above. In one example, the two separate UCIs correspond to the two-part UCI, as in Rel.15 NR specification.

In one example, the correspondence or the index I is reported separately from the resource indicator R (e.g., CRI or SSBRI) and/or the associated beam metric (e.g., L1-RSRP or L1-SINR), where the resource indicator R (e.g., CRI or SSBRI) and/or the associated beam metric (e.g., L1-RSRP or L1-SINR) are reported via uplink control information (UCI) transmitted via a layer 1 (L1) channel such as PUCCH or PUSCH, for example, as configured by the higher layer parameter CSI-ReportConfig; and the correspondence is reported via a layer 2 (L2) channel, e.g., UL channel carrying MAC CE (e.g., an UL MAC CE). In one example, if PUSCH is used as L1 channel, the PUSCH can be one of the examples in one or more examples above. In one example, if MAC CE is used as L2 channel, it can be according to at least one of the following examples.

In one example, the L2 channel is an existing L2 channel carrying MAC CE.
In one example, the existing MAC CE is Single entry PHR MAC CE (codepoint/Index 57 in Table 22, which is from Table 6.2.1-2 of TS 38.321), i.e., the single entry MAC CE includes information regarding the correspondence, either via an existing parameter or via a new parameter.

In one example, the existing MAC CE is Multiple entry PHR MAC CE (codepoint/Index 54 or 56 in Table 22, which is from Table 6.2.1-2 of TS 38.321), i.e., the multiple entry MAC CE includes information regarding the correspondence, either via an existing parameter or via a new parameter.

In one example, the existing MAC CE a MAC CE that includes an UL BWP ID, for example, one of the following:

SP CSI reporting on PUCCH Activation/Deactivation MAC CE
SP SRS Activation/Deactivation MAC CE
PUCCH spatial relation Activation/Deactivation MAC CE
Enhanced PUCCH Spatial Relation Activation/Deactivation MAC CE
Enhanced SP/AP SRS Spatial Relation Indication MAC CE
SRS Pathloss Reference RS Update MAC CE
PUSCH Pathloss Reference RS Update MAC CE
Serving Cell Set based SRS Spatial Relation indication MAC CE
SP Positioning SRS Activation/Deactivation MAC CE In one example, the existing MAC CE a MAC CE that includes an DL BWP ID, for example, one of the following:

SP CSI-RS/CSI-IM Resource Set Activation/Deactivation MAC CE
Aperiodic CSI Trigger State Subselection MAC CE
TCI States Activation/Deactivation for UE-specific PDSCH MAC CE
SP ZP CSI-RS Resource Set Activation/Deactivation MAC CE
Enhanced TCI States Activation/Deactivation for UE-specific PDSCH MAC CE In one example, the L2 channel is a new (dedicated) L2 channel, e.g., a new MAC CE (e.g., a new UL MAC CE or a new DL MAC CE) for the correspondence.

In one example, the entry corresponding to Codepoint/Index 47 of UL MAC CE (Table 22) is used for the new UL MAC CE.

In one example, the entry corresponding to Codepoint/Index 44 of UL MAC CE (Table 22) is used for the new UL MAC CE.

In one example, the entry corresponding to Codepoint/Index, one of 35-44, of UL MAC CE (Table 22) is used for the new UL MAC CE.

In one example, the entry corresponding to Codepoint/ Index 63 of UL MAC CE (Table 22) is used for the new UL MAC CE.

TABLE 23

| Values of LCID for UL-SCH | |
| --- | --- |
| Codepoint/Index | LCID values |
| 0 | CCCH of size 64 bits (referred to as "CCCH1" in TS 38.331 [5]) |
| 1-32 | Identity of the logical channel |
| 33 | Extended logical channel ID field (two-octet eLCID field) |
| 34 | Extended logical channel ID field (one-octet eLCID field) |
| 35-44 | Reserved |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet $C_i$) |
| 51 | Truncated BFR (one octet $C_i$) |
| 52 | CCCH of size 48 bits (referred to as "CCCH" in TS 38.331 [5]) |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

In one example, the correspondence or the index I is reported separately from the resource indicator R (e.g., CRI or SSBRI) and/or the associated beam metric (e.g., L1-RSRP or L1-SINR), where the resource indicator R (e.g., CRI or SSBRI) and/or the associated beam metric (e.g., L1-RSRP or L1-SINR) are reported via a first UL channel such as PUCCH or PUSCH, for example, as configured by the higher layer parameter CSI-ReportConfig; and the correspondence is reported via a second UL channel, e.g., UL channel carrying MAC CE (e.g., an UL MAC CE). The two UL channels can be PUCCH, PUSCH, UL MAC CE, or any other UL channels.

In one embodiment, the UE is configured with multiple SRS resources with the same number of SRS ports (e.g., 1-port SRS resources for non-codebook-based UL transmission) or different number of SRS ports (e.g., for codebook-based UL transmission) within an SRS resource set (cf. ul-FullPowerTransmission=fullPowerMode2 in Rel. 16 NR specification). In one example, such a configuration is configured when the UE is equipped with multiple antenna panels, or when the UE reports (e.g., via UE capability reporting) that it is capable of supporting panel selection/ activation or capable of supporting/reporting different values for the max supported number of SRS ports (as described in this disclosure). In one example, the SRS resource set is configured with higher layer parameter usage set to 'codebook' indicating codebook-based UL transmission (cf. section 6.1.1.1 of REF9). In one example, the SRS resource set is configured with higher layer parameter usage set to 'codebook' indicating codebook-based UL transmission (cf. section 6.1.1 of REF9) or 'nonCodebook' indicating non-codebook-based UL transmission (cf. section 6.1.1.2 of REF9).

For such as UE, an SRI field in UL-related DCI (e.g., DCI format 0_1 or 0_2 in NR specification) can be used to indicate one of the multiple SRS resources (e.g., for the case of codebook-based UL transmission). In particular, the SRI can indicate both (A) implicit acknowledgment (ACK) that NW successfully receives and follows the reported capability (correspondence index) and (B) a SRS resource from the multiple SRS resources that is aligned with (or corresponding to) a reported capability index, where the reported capability index indicates one of the capability types as described in this disclosure. For example, the one of the capability type can be max supported number of SRS ports reported by the UE together with the beam report. For the case of codebook-based UL transmission, the payload of the SRI field indication is $\lceil \log_2 N_{SRS} \rceil$ bits, where $N_{SRS}$ is the number of SRS resources in the configured SRS resource set.

For the case of non-codebook-based UL transmission, the SRI can indicate both (A) implicit acknowledgment (ACK) and (B) L SRS resource(s) from the multiple SRS resources that is (are) aligned with (or corresponding to) a reported capability index, where the reported capability index indicates one of the capability types as described in this disclosure. For example, the one of the capability type can be max supported number of SRS ports reported by the UE together with the beam report. Here, L is the number of layers (or rank value) for the non-codebook-based UL transmission). In one example, $1 \le L \le N_{SRS,x}$, where $N_{SRS,x}$ is the value of the max supported number of SRS ports reported by the UE. Also, for non-codebook-based UL transmission, each SRS resource can be a 1-port SRS resource.

At least one of the following examples is used/configured for the case of codebook-based UL transmission.

In one example, when the number of SRS resources is 2, one SRS resource with $n_1$ SRS ports and another SRS resource with $n_2$ SRS ports, the SRI field value can indicate one SRS resource and implicit ACK as described in Table 24. In one example, $(n_1, n_2)=(1,2)$ or $(2,1)$ for a UE with a maximum (or total) of 2 antenna ports (across all antenna panels). In one example, $(n_1, n_2)=(1,2)$ or $(2,1)$, $(1,4)$ or $(4,1)$, $(4,2)$ or $(2,4)$ for a UE with a maximum (or total) of 4 antenna ports (across all antenna panels).

TABLE 24

| SRI bit field mapped to index | SRS resource | Implicit ACK (UE interpretation/assumption) |
| --- | --- | --- |
| 0 | $n_1$-port SRS resource | SRI = 0 is indicated if UE reports max supported number of SRS ports = $n_1$ → UE assumes NW successfully receives and follows the capability correspondence report. Else, either NW doesn't follow or NW fails to receive (or both). |
| 1 | $n_2$-port SRS resource | SRI = 1 is indicated if UE reports max supported number of SRS ports = $n_2$ → UE assumes NW successfully receives and follows the capability correspondence report. Else, either NW doesn't follow or NW fails to receive (or both) |

In one example, the number of SRS resources is 3. In one example, the number of SRS resources can be 3 only when the UE supports a maximum of 4 antenna ports.

In example, when there are two SRS resources with $n_1$ SRS ports and one SRS resource with $n_2$ SRS ports, the SRI field value can indicate one SRS resource and implicit ACK as described in Table 25. In one example, $(n_1, n_2)=(1,2)$ or $(2,1)$ for a UE with a maximum (or total) of 2 antenna ports (across all antenna panels). In one example, $(n_1, n_2)=(1,2)$ or $(2,1)$, $(1,4)$ or $(4,1)$, $(4,2)$ or $(2,4)$ for a UE with a maximum (or total) of 4 antenna ports (across all antenna panels).

In example, when there are one SRS resource with $n_1$ SRS ports, one SRS resource with $n_2$ SRS ports, and one SRS resource with $n_3$ SRS ports, the SRI field value can indicate one SRS resource and implicit ACK as described in Table 26. In one example, $(n_1, n_2, n_3)=(1, 2,4)$, $(1,4,2)$, $(2,1,4)$, $(2,4,1)$, $(4,1,2)$, or $(4,2,1)$.

TABLE 25

| SRI bit field mapped to index | SRS resource | Implicit ACK (UE interpretation/assumption) |
|---|---|---|
| 0 | $n_1$-port SRS resource 1 | SRI = 0 or 1 is indicated if UE reports max supported number of SRS ports = $n_1$ → UE assumes NW successfully receives and follows the capability correspondence report. Else, either NW doesn't follow or NW fails to receive (or both) |
| 1 | $n_1$-port SRS resource 2 | |
| 2 | $n_2$-port SRS resource 1 | SRI = 2 is indicated if UE reports max supported number of SRS ports = $n_2$ → UE assumes NW successfully receives and follows the capability correspondence report. Else, either NW doesn't follow or NW fails to receive (or both) |

TABLE 26

| SRI bit field mapped to index | SRS resource | Implicit ACK (UE interpretation/assumption) |
|---|---|---|
| 0 | $n_1$-port SRS resource 1 | SRI = 0 is indicated if UE reports max supported number of SRS ports = $n_1$ → UE assumes NW successfully receives and follows the capability correspondence report. Else, either NW doesn't follow or NW fails to receive (or both) |
| 1 | $n_2$-port SRS resource 1 | SRI = 1 is indicated if UE reports max supported number of SRS ports = $n_2$ → UE assumes NW successfully receives and follows the capability correspondence report. Else, either NW doesn't follow or NW fails to receive (or both) |
| 2 | $n_3$-port SRS resource 1 | SRI = 2 is indicated if UE reports max supported number of SRS ports = $n_3$ → UE assumes NW successfully receives and follows the capability correspondence report. Else, either NW doesn't follow or NW fails to receive (or both) |

In one example, the number of SRS resources is 4. In one example, the number of SRS resources can be 4 only when the UE supports a maximum of 4 antenna ports.

In example, when there are two SRS resources with $n_1$ SRS ports and two SRS resources with $n_2$ SRS ports, the SRI field value can indicate one SRS resource and implicit ACK as described in Table 27. In one example, $(n_1, n_2)=(1,2)$ or $(2,1)$ for a UE with a maximum (or total) of 2 antenna ports (across all antenna panels). In one example, $(n_1, n_2)=(1,2)$ or $(2,1)$, $(1,4)$ or $(4,1)$, $(4,2)$ or $(2,4)$ for a UE with a maximum (or total) of 4 antenna ports (across all antenna panels).

In one example, when there are three SRS resources with $n_1$ SRS ports and one SRS resource with $n_2$ SRS ports, the SRI field value can indicate one SRS resource and implicit ACK as described in Table 28. In one example, $(n_1, n_2)=(1,2)$ or $(2,1)$ for a UE with a maximum (or total) of 2 antenna ports (across all antenna panels). In one example, $(n_1, n_2)=(1,2)$ or $(2,1)$, $(1,4)$ or $(4,1)$, $(4,2)$ or $(2,4)$ for a UE with a maximum (or total) of 4 antenna ports (across all antenna panels).

In one example, when there are two SRS resources with $n_1$ SRS ports, one SRS resource with $n_2$ SRS ports, and one SRS resource with $n_3$ SRS ports, the SRI field value can indicate one SRS resource and implicit ACK as described in Table 29. In one example, $(n_1, n_2, n_3)=(1, 2,4)$, $(1,4,2)$, $(2,1,4)$, $(2,4,1)$, $(4,1,2)$, or $(4,2,1)$.

TABLE 27

| SRI bit field mapped to index | SRS resource | Implicit ACK (UE interpretation/assumption) |
|---|---|---|
| 0 | $n_1$-port SRS resource 1 | SRI = 0 or 1 is indicated if UE reports max supported number of SRS ports = $n_1$ → UE assumes NW successfully receives and follows the capability correspondence report. Else, either NW doesn't follow or NW fails to receive (or both) |
| 1 | $n_1$-port SRS resource 2 | |
| 2 | $n_2$-port SRS resource 1 | SRI = 2 or 3 is indicated if UE reports max supported number of SRS ports = $n_2$ →UE assumes NW successfully receives and follows the capability correspondence report. Else, either NW doesn't follow or NW fails to receive (or both) |
| 3 | $n_2$-port SRS resource 2 | |

TABLE 28

| SRI bit field mapped to index | SRS resource | Implicit ACK (UE interpretation/assumption) |
|---|---|---|
| 0 | $n_1$-port SRS resource 1 | SRI = 0 or 1 or 2 is indicated if UE reports max supported number of SRS ports = $n_1$ → UE assumes NW successfully receives and follows the capability correspondence report. Else, either NW doesn't follow or NW fails to receive (or both) |
| 1 | $n_1$-port SRS resource 2 | |
| 2 | $n_1$-port SRS resource 3 | SRI = 3 is indicated if UE reports max supported number of SRS ports = $n_2$ → UE assumes NW successfully receives and follows the capability correspondence report. Else, either NW doesn't follow or NW fails to receive (or both) |
| 3 | $n_2$-port SRS resource 1 | |

TABLE 29

| SRI bit field mapped to index | SRS resource | Implicit ACK (UE interpretation/assumption) |
|---|---|---|
| 0 | $n_1$-port SRS resource 1 | SRI = 0 or 1 is indicated if UE reports max supported number of SRS ports = $n_1$ → UE assumes NW successfully receives and follows the capability correspondence report. Else, either NW doesn't follow or NW fails to receive (or both) |
| 1 | $n_1$-port SRS resource 2 | |
| 2 | $n_2$-port SRS resource 1 | SRI = 2 is indicated if UE reports max supported number of SRS ports = $n_2$ → UE assumes NW successfully receives and follows the capability correspondence report. Else, either NW doesn't follow or NW fails to receive (or both) |

TABLE 29-continued

| SRI bit field mapped to index | SRS resource | Implicit ACK (UE interpretation/assumption) |
|---|---|---|
| 3 | $n_3$-port SRS resource 1 | SRI = 3 is indicated if UE reports max supported number of SRS ports = $n_3$ → UE assumes NW successfully receives and follows the capability correspondence report. Else, either NW doesn't follow or NW fails to receive (or both) |

In one embodiment, which is a variation of an embodiment described above, the ACK mechanism is explicit via a dedicated signaling.

In one example, a higher layer (RRC) parameter (new or existing parameter) is used to indicate the ACK.

In one example, a MAC CE indication (new or existing MAC CE) is used to indicate the ACK.

In one example, a DCI-based indication is used to indicate the ACK. For example, a 1-bit DCI field (or a code point value) in DCI (e.g., UL-DCI format 0_1 and 0_2) or in a dedicated DCI (separate from the UL-DCI) is used for this indication.

In this case, the payload of SRI indication depends on the explicit ACK. In particular, For the case of codebook-based UL transmission, the SRI payload is $\lceil \log_2 N_{SRS,x} \rceil$ bits, where $N_{SRS,x}$ is the number of SRS resources with x SRS ports in the configured SRS resource set. The bit field (or index) of the SRI indication is mapped to the indices of SRS resources in the SRS resource set whose number of SRS ports equals x.

In one embodiment, a UE is configured with multiple SRS resource sets (e.g., two SRS resource sets) wherein each SRS resource set includes SRS resource(s) with the same number of SRS ports, but the number of SRS ports is different across SRS resources sets. For instance, the UE is configured with two SRS resource sets, S1 and S2, where S1 includes SRS resource(s) with $n_1$ SRS ports and S2 includes SRS resource(s) with $n_2$ SRS ports, and $n_1 \neq n_2$. In one example, $n_1$ and $n_2$ belong to $\{1,2\}$ for a UE with a total of 2 antenna ports, and belong to $\{1,2,4\}$ or $\{2,4\}$ for a UE with a total of 4 antenna ports. Note that the number of SRS ports is the same for all SRS resources within a SRS resource set, but it is different from one resource set to another (i.e., across sets). In one example, each SRS resource set includes only one SRS resource. In one example, each SRS resource set can include only one SRS resource or multiple SRS resources. In one example, the SRS resource sets correspond to (or associated with) the antenna panels at the UE. In one example, such a configuration of multiple SRS resource sets is configured when the UE is equipped with multiple antenna panels, or when the UE reports (e.g., via UE capability reporting) that it is capable of supporting panel selection/activation or capable of supporting/reporting different values for the max supported number of SRS ports (as described in this disclosure). In one example, the SRS resource sets are configured with higher layer parameter usage set to 'codebook' indicating codebook-based UL transmission (cf. section 6.1.1.1 of REFS).

For such as UE, an SRI field in UL-related DCI (e.g., DCI format 0_1 or 0_2 in NR specification) can be used to indicate one of the multiple SRS resources (e.g., for the case of codebook-based UL transmission). In particular, the SRI can indicate (A) implicit acknowledgment (ACK) that NW successfully receives and follows the reported capability (correspondence index), (B) one SRS resource set from the multiple SRS resource sets, and (C) a SRS resource from the SRS resource(s) within the indicated SRS resource set, where the indicated SRS resource set and SRS resource (B and C) are aligned with (or corresponding to) a reported capability index, where the reported capability index indicates one of the capability types as described in this disclosure. For example, the one of the capability type can be max supported number of SRS ports reported by the UE together with the beam report. For the case of codebook-based UL transmission, the payload of the SRI field indication is $\lceil \log_2 N_{SRS,tot} \rceil$ bits, where $N_{SRS,tot}$ is the total number of SRS resources across all configured SRS resource sets.

At least one of the following examples is used/configured for the case of codebook-based UL transmission.

In one example, when the number of SRS resource sets is 2, one SRS resource set with $n_1$-port SRS resource(s) and another SRS resource set with $n_2$-port SRS resource(s), the SRI field value can indicate one SRS resource set, one SRS resource, and implicit ACK as described in Table 30. In one example, $(n_1, n_2)=(1,2)$ or $(2,1)$ for a UE with a maximum (or total) of 2 antenna ports (across all antenna panels). In one example, $(n_1, n_2)=(1,2)$ or $(2,1)$, $(1,4)$ or $(4,1)$, $(4,2)$ or $(2,4)$ for a UE with a maximum (or total) of 4 antenna ports (across all antenna panels).

TABLE 30

| SRI bit field mapped to index | SRS resource set | SRS resource | Implicit ACK (UE interpretation/assumption) |
|---|---|---|---|
| 0 | 0 | $n_1$-port SRS resource | SRI = 0 is indicated if UE reports max supported number of SRS ports = $n_1$ → UE assumes NW successfully receives and follows the capability correspondence report. Else, either NW doesn't follow or NW fails to receive (or both). |
| 1 | 1 | $n_2$-port SRS resource | SRI = 1 is indicated if UE reports max supported number of SRS ports = $n_2$ → UE assumes NW successfully receives and follows the capability correspondence report. Else, either NW doesn't follow or NW fails to receive (or both) |

| SRI field value | Set | SRS resource | Implicit ACK (UE interpretation/assumption) |
|---|---|---|---|
| 0 | 0 | 1 port resource | SRI = 0 is indicated if UE reports max supported number of SRS ports = 1 → UE assumes NW successfully receives and follows the capability correspondence report Else, either NW doesn't follow or NW fails to receive (or both) |
| 1 | 1 | 2 ports resource | SRI = 1 is indicated if UE reports max supported number of SRS ports = 2 → UE assumes NW successfully receives and follows the capability correspondence report Else, either NW doesn't follow or NW fails to receive (or both) |

In one example, the number of SRS resource sets is 2 and the number of SRS resources in each set is 2. There are two SRS resources with $n_1$ SRS ports in the first set and two SRS resources with $n_2$ SRS ports in the second set. The SRI field value can indicate one SRS resource set, one SRS resource, and implicit ACK as described in Table 31. In one example, $(n_1, n_2)=(1,2)$ or $(2,1)$ for a UE with a maximum (or total) of 2 antenna ports (across all antenna panels). In one example, $(n_1, n_2)=(1,2)$ or $(2,1)$, $(1,4)$ or $(4,1)$, $(4,2)$ or $(2,4)$ for a UE with a maximum (or total) of 4 antenna ports (across all antenna panels).

TABLE 31

| SRI bit field mapped to index | SRS resource set | SRS resource | Implicit ACK (UE interpretation/assumption) |
|---|---|---|---|
| 0 | 0 | $n_1$-port SRS resource 1 | SRI = 0 or 1 is indicated if UE reports max supported number of SRS ports = $n_1 \to$ UE assumes NW successfully |
| 1 | | $n_1$-port SRS resource 2 | receives and follows the capability correspondence report. Else, either NW doesn't follow or NW fails to receive (or both) |
| 2 | 1 | $n_2$-port SRS resource 1 | SRI = 2 or 3 is indicated if UE reports max supported number of SRS ports = $n_2 \to$ UE assumes NW successfully |
| 3 | | $n_2$-port SRS resource 2 | receives and follows the capability correspondence report. Else, either NW doesn't follow or NW fails to receive (or both) |

In one embodiment, a UE is configured with multiple SRS resource sets (e.g., two SRS resource sets) wherein each SRS resource set includes multiple SRS resource with the same number of SRS ports (e.g., 1-port SRS resources), but the number of SRS resources is different across SRS resources sets. In one example, the SRS resource sets are configured with higher layer parameter usage set to 'non-Codebook' indicating non-codebook-based UL transmission (cf. section 6.1.1.2 of REFS).

For the case of non-codebook-based UL transmission, the SRI can indicate (A) implicit acknowledgment (ACK), (B) one SRS resource set from the multiple SRS resource sets, and (C) L SRS resource(s) from the SRS resource(s) within the indicated SRS resource set, where the indicated SRS resource set and L SRS resources(s) (B and C) are aligned is (are) aligned with (or corresponding to) a reported capability index, where the reported capability index indicates one of the capability types as described in this disclosure. For example, the one of the capability type can be max supported number of SRS ports reported by the UE together with the beam report. Here, L is the number of layers (or rank value) for the non-codebook-based UL transmission). In one example, $1 \leq L \leq N_{SRS,x}$, where $N_{SRS,x}$ is the value of the max supported number of SRS ports reported by the UE. Also, for non-codebook-based UL transmission, each SRS resource can be a 1-port SRS resource.

In one embodiment, which is a variation of one or more embodiments described above, the ACK mechanism is explicit via a dedicated signaling.

In one example, a higher layer (RRC) parameter (new or existing parameter) is used to indicate the ACK.

In one example, a MAC CE indication (new or existing MAC CE) is used to indicate the ACK.

In one example, a DCI-based indication is used to indicate the ACK. For example, a 1-bit DCI field (or a code point value) in DCI (e.g., UL-DCI format 0_1 and 0_2) or in a dedicated DCI (separate from the UL-DCI) is used for this indication.

In this case, the payload of SRI indication depends on the explicit ACK. In particular, For the case of codebook-based UL transmission, the SRI payload is $\lceil \log_2 N_{SRS,x} \rceil$ bits, where $N_{SRS,x}$ is the total number of SRS resources with x SRS ports across all of the configured SRS resource sets. The bit field (or index) of the SRI indication is mapped to the indices of SRS resources across all the SRS resource sets whose number of SRS ports equals x.

In one embodiment, a UE equipped with multiple antenna panel is configured (by the NW) with $N_{SRS}>1$ SRS resources with different number of SRS ports within an SRS resource set. This configuration can be via higher layer (RRC) signaling. In one example, such a SRS resource set can be configured when the UE is further configured with at least one of the following examples regarding the UL transmission (e.g., of PUSCH).

In one example, the UL transmission corresponds to a full power transmission mode (e.g., full power mode 2 from Rel. 16 NR specification). An existing RRC parameter can be used for this purpose. One example of the existing RRC parameter is FullPowerTransmission-r16 being set to 'fullpowerMode2' (as supported in Rel.16 NR specification). According to this example, for a multi-panel UE, the UL transmission is configured by setting FullPowerTransmission-r16 to 'fullpowerMode2'.

In one example, the UL transmission configured via a new RRC parameter. One example of the new RRC parameter is FullPowerTransmission-r17 or MPUETransmission-r17.

In one example, the UL transmission configured via a new RRC parameter, however, the Rel.16 RRC parameter FullPowerTransmission-r16 is expected to be set to 'fullpowerMode2' when this new parameter is configured.

In one example, the above configuration examples can be used for codebook-based UL transmission only. In one example, they can be used for both codebook-based and non-codebook-based UL transmissions.

The payload (number of bits) of SRI indication (indicating one of the $N_{SRS}>1$ SRS resources) can be according to at least one of the following examples.

In one example, the SRI payload remains the same, i.e., $\lceil \log_2 N_{SRS} \rceil$ bits, regardless of the reported capability, i.e., a value v=max supported number of SRS ports reported by the UE together with the beam report.

In one example, the SRI payload depends and is determined based on the reported capability i.e., a value v=max supported number of SRS ports reported by the UE together with the beam report.

When there is only one SRS resource (within the SRS resource set) that has the number of SRS ports equal to the reported value (v), then at least one of the following examples is used/configured.

In one example, the SRI payload=0, implying that the SRI field is absent (not indicated/configured). In this case, there is no signaling/indication/ACK (from NW to UE) regarding whether the NW received the beam report with the value v or whether it acknowledges the received value.

In one example, the SRI payload=0, implying that the SRI field is absent (not indicated/configured). The absence of the SRI field is indicated/ACKed (from NW to UE) via a medium/channel. The medium/channel can be RRC, or MAC CE, or a DCI (dedicated DCI different from UL-DCI, e.g., format 0_1 and 0_2). Alternatively, the medium/channel is a two-part DCI comprising DCI part 1 and DCI part 2, wherein the DCI part 1 includes an information (e.g., 1-bit field) to indicate whether the SRI field is absent (not indicated) or present (indicated) via the DCI part 2, and the DCI part 2 includes the SRI field when indicated so.

In one example, the SRI payload is 1-bit to indicate (or acknowledge) that the NW received the value v. In one example, the SRI value=0 is used for this ACK. In one example, the SRI value=1 is used for this ACK. In one example, the other SRI value (that is not used for ACK) is used for NACK (indicating that the NW either didn't receive the value v or doesn't follow the value v or both.

In one example, when the value v is less than the total number of antenna ports (across panels), the SRI payload is according to one or more examples above, and otherwise (when v=the total number of antenna ports (across panels), the SRI payload is according to one or more examples above.

When there are more than one SRS resources (within the SRS resource set) with the number of SRS ports equal to the reported value (v), then the SRI is indicated, and it's payload (number of) is determined based on the number of such SRS resources (with v SRS ports). Let $N_{SRS,v}$ be the number of such SRS resources. At least one of the following examples is used/configured.

In one example, the SRI payload is $\lceil \log_2 N_{SRS,v} \rceil$ bits, and it indicates one of the $N_{SRS,v}$ SRS resources with v SRS ports.

In one example, the SRI payload is $\lceil \log_2 N_{SRS,v} \rceil$+1 bits, which indicates both ACK (from NW to UE in response to the reported v value) and one of the $N_{SRS,v}$ SRS resources with v SRS ports. In one example, 1-bit is used for the indication of ACK, and $\lceil \log_2 N_{SRS,v} \rceil$ bit is used for the indication of one of the $N_{SRS,v}$ SRS resources with v SRS ports. In one example, the SRI indication comprises two separate parts (sub-fields), one for ACK and another for the SRS resource indication.

In one example, the SRI payload is $\lceil \log_2(N_{SRS,v}+1) \rceil$ bits, where the $N_{SRS,v}$ SRI values (e.g., $0,1, \ldots, N_{SRS,v}-1$) are used for the joint indication of the ACK and one of the SRS resources with v SRs ports, and one SRI value (e.g., SRI=$N_{SRS,v}$) is used for indicating NACK (indicating that the NW either didn't receive the value v or doesn't follow the value v or both.

In one example, whether the SRI payload remains the same ($\lceil \log_2 N_{SRS} \rceil$ bits) or changes ($\lceil \log_2 N_{SRS,v} \rceil$ bits as in one or more examples above or $\lceil \log_2 N_{SRS,v} \rceil$+1 bits as in one or more examples above or $\lceil \log_2 (N_{SRS,v}+1) \rceil$ bits as in one or more examples above according to the reported value v is indicated/configured (from NW to the UE) via a medium/channel. The medium/channel can be RRC, or MAC CE, or a DCI (dedicated DCI different from UL-DCI, e.g., format 0_1 and 0_2). Alternatively, the medium/channel is a two-part DCI comprising DCI part 1 and DCI part 2, wherein the DCI part 1 includes an information (e.g., 1-bit field) to indicate the SRI payload remains the same or changes, and the DCI part 2 includes the SRI field with the indicated payload.

In one example, the SRI indication and its payload is determined/configured according to an example which is a combination of one or more examples above (when $N_{SRS,v}$=1) and III.5.2.b (when $N_{SRS,v}$>1), where (a, b) is fixed or configured from {(1,4), (1,5), (1,6), (1,7), (2,4), (2,5), (2,6), (2,7), (3 or 3A, 4), (3 or 3A, 5), (3 or 3A, 6), (3 or 3A, 7)}.

In one example, the configuration as described above is subject to (condition on) a UE capability reporting.

In one example, the UE capability reporting include a feature group (FG) comprising a component indicating a multi-panel UE (MPUE) or a UE equipped with multiple antenna panels (Rel. 17). In one example such a UE must also support (hence report) the support for the full power mode 2 from Rel. 16 NR specification (ul-FullPwrMode2-MaxSRS-ResInSet-r16 and/or ul-FullPwrMode2-SRSConfig-diffNumSRSPorts-r16, TS 38.306).

In one example, the UE capability reporting include 2 FGs, one FG for the support of the MPUE and another FG for the support of the full power mode 2.

In one example, the UE capability reporting include 1 FG with 2 components, one component for the support of the MPUE and another component for the support of the full power mode 2.

May also include details from FG on SRS resource with different number of SRS ports In one example, the max value for the number of SRS resources $N_{SRS}$ (as in this embodiment) is fixed, e.g., $N_{SRS}$=2 or $N_{SRS}$=3 or $N_{SRS}$=4. In one example, the max value for the number of SRS resources $N_{SRS}$ can be up to x, where x can be configured or can be subject to a UE capability reporting (e.g., ul-FullPwrMode2-MaxSRS-ResInSet-r16). In one example, x=4. In one example, the UE report the value of x via UE capability reporting or via dynamic beam or CSI reporting.

In one example, the mapping between the SRI (bit field) or index and the indices of the SRS resources within the SRS resource set is one-to-one in increasing order, i.e., the lowest SRI (bit field) or index value (e.g., 0) is mapped to the SRS resource with the smallest resource ID and the smaller number of SRS ports. Three examples are shown in Table 32 and through Table 34, where $n_1 < n_2$ and $I_{i,1} < I_{i,2}$ for i=1,2.

TABLE 32

| $N_{SRS}$ = 2 | | |
| --- | --- | --- |
| Bit field mapped to index | SRI(s), $N_{SRS}$ = 2 | (number of SRS ports, SRS resource ID) |
| 0 | 0 | $(n_1, I_{1,1})$ |
| 1 | 1 | $(n_2, I_{2,1})$ |

TABLE 33

| $N_{SRS}$ = 3 | | |
| --- | --- | --- |
| Bit field mapped to index | SRI(s), $N_{SRS}$ = 3 | (number of SRS ports, SRS resource ID) |
| 0 | 0 | $(n_1, I_{1,1})$ |
| 1 | 1 | $(n_1, I_{1,2})$ |
| 2 | 2 | $(n_2, I_{2,1})$ |
| 3 | Reserved | |

TABLE 34

| $N_{SRS}$ = 4 | | |
| --- | --- | --- |
| Bit field mapped to index | SRI(s), $N_{SRS}$ = 4 | (number of SRS ports, SRS resource ID) |
| 0 | 0 | $(n_1, I_{1,1})$ |
| 1 | 1 | $(n_1, I_{1,2})$ |
| 2 | 2 | $(n_2, I_{2,1})$ |
| 3 | 3 | $(n_2, I_{2,2})$ |

In one embodiment, a UE equipped with multiple antenna panel is configured (by the NW) with $N_{SRS}>1$ SRS resources with different number of SRS ports within an SRS resource set.

The payload (number of bits) of TPMI/TRI indication can be according to at least one of the following examples.

In one example, the TPMI/TRI payload remains the same, regardless of the reported capability, i.e., a value v=max supported number of SRS ports reported by the UE together with the beam report.

In one example, the TPMI/TRI payload depends and is determined based on the reported capability i.e., a value v=max supported number of SRS ports reported by the UE together with the beam report.

In one embodiment, a UE equipped with multiple antenna panel is configured (by the NW) with $N_{SRS}>1$ SRS resources with different number of SRS ports within an SRS resource set.

The payload (number of bits) of both SRI and TPMI/TRI indication can be fixed or changing depending on the value of v, where the details are according to one or more examples as described in one or more embodiments above.

The present disclosure includes the following components for enabling beam measurement and reporting selection procedures, wherein the beam measurement and reporting may include an additional information about a state of each beam reporting, and the state can be related to MPE event, multiple UE panels, whether the beam report is for DL only, UL only or both DL and UL etc.

Figure 16:
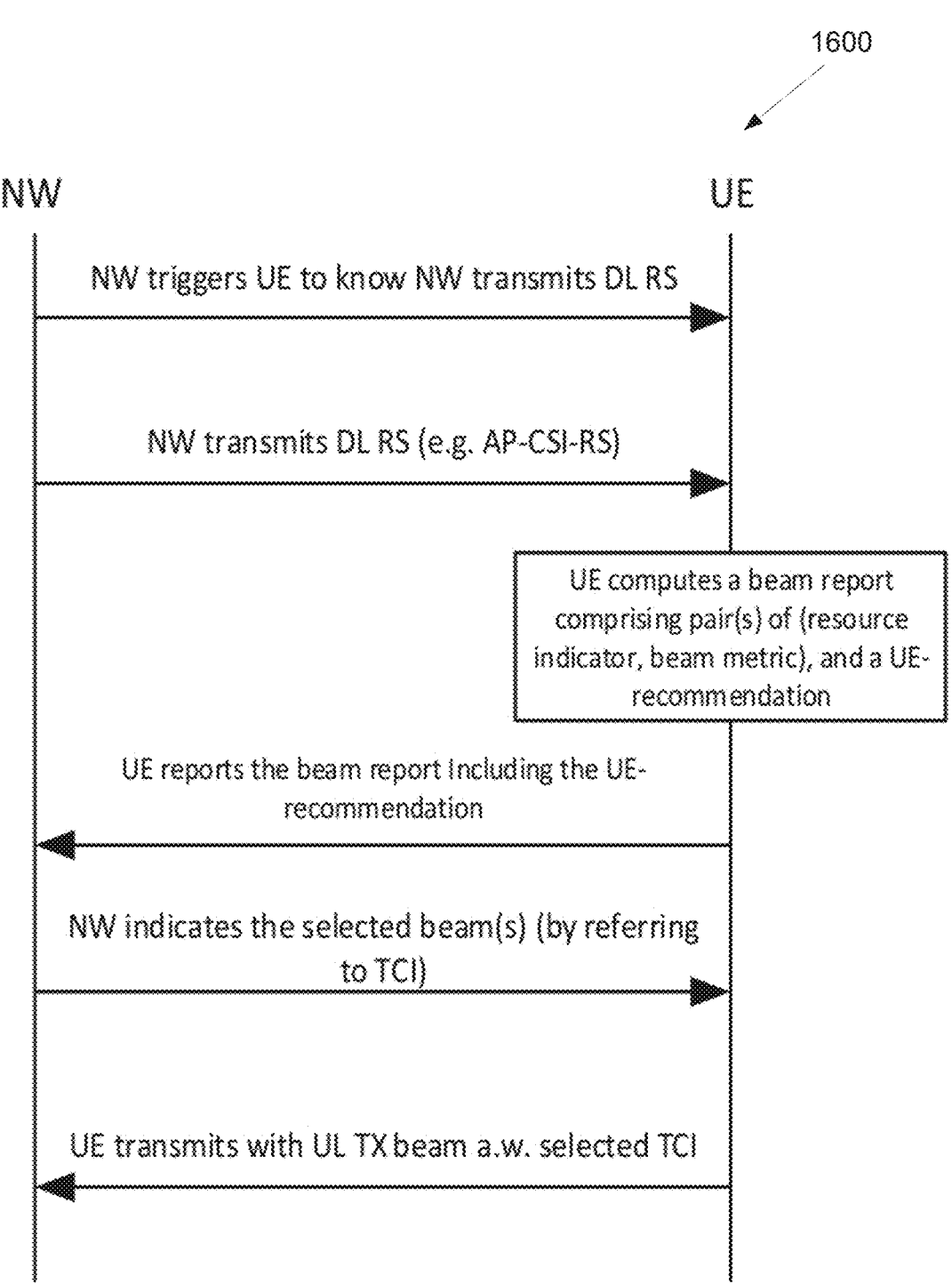
FIG. 16 illustrates a flow diagram of a UE configured to measure DL measurement RS resources and report a beam report according to embodiments of the present disclosure.

FIG. 16 illustrates a flow diagram 1600 of a UE configured to measure $P_1$ DL measurement RS resources according to embodiments of the present disclosure. The embodiment of the flow diagram 1600 of a UE configured to measure $P_1$ DL measurement RS resources illustrated in FIG. 16 is for illustration only. FIG. 16 does not limit the scope of this disclosure to any particular implementation of the flow diagram 1600 of a UE configured to measure $P_1$ DL measurement RS resources.

In one embodiment, as illustrated in FIG. 16, a UE is configured (by the NW/gNB) to measure (receive) $P_1$ DL measurement RS resources (such as CSI-RS or SSB), where $P_1 \geq 1$. This configuration can be performed via higher-layer (RRC) signaling. Optionally, the NW/gNB can signal/update the (sub)set of DL measurement RS resources dynamically via L1 or L2 DL control (PDCCH or MAC CE). These resources are used by the UE to perform beam measurement along different beams or spatial directions (represented by the beamforming/precoding operation performed at the NW/gNB transparent to the UE).

The UE is further configured (by the NW/gNB) to report a beam report, wherein the beam report includes $Q_1$ resource indicators (I) or $Q_1$ pairs of (I,J)=(resource indicator, beam metric), where $Q_1 \leq P_1$. In one example, $Q_1$=1. In one example, $Q_1$ is configured via RRC and/or MAC CE. The beam metric can represent link quality associated with the DL channel (or UL channel since beam correspondence holds). Examples of beam metric include L1-RSRP, L1-SINR, CQI, or hypothetical BLER, or virtual PHR, or UL RSRP, or any other beam metric. The resource indicator indicates a DL measurement RS resource index from the $P_1$ DL measurement RS resources. Examples of resource indicator include CRI (when DL measurement RS is CSI-RS) and SSB-RI (when DL measurement RS is SSB).

In one example, when the UE is equipped with X>1 antenna panels, $Q_1$=X, and one resource indicator (I) or pair of (I,J)=(resource indicator, beam metric) is reported for each antenna panel. In one example, when the UE is equipped with X>1 antenna panels, $Q_1 \geq X$, and at least one resource indicator (I) or pair of (I,J)=(resource indicator, beam metric) is reported for each antenna panel. The set of $P_1$ DL measurement RS resources can be partitioned into X subsets, one subset for each antenna panel. Or the $P_1$ DL measurement RS resources is a super-set encompassing X sets, one set for each antenna panel. In one example, the information about X panels is not provided to the NW/gNB. In one example, the information about X panels is provided to the NW/gNB. For instance, the information about the panel ID can be included/reported implicitly, e.g., from the resource indicators (I). Or the information about the panel ID can be included/reported explicitly, e.g., by including/reporting the panel ID(s) in the beam report.

In addition to $Q_1$ resource indicators (I) or $Q_1$ pairs of (I,J)=(resource indicator, beam metric), the beam report can also include a UE-recommendation for UL TX beam selection/indication (by the NW/gNB). The time-domain behavior of this beam measurement and/or beam reporting can be configured as aperiodic (AP), semi-persistent (SP), or periodic (P). The time-domain behavior of the beam measurement RS can be configured as aperiodic (AP), semi-persistent (SP), or periodic (P).

The UE-recommendation can be reported jointly with the other components included in the beam report using a joint parameter (or indicator). For example, the UE-recommendation can be reported jointly with at least one of the resource indicators. Or the UE-recommendation can be reported jointly with at least one of the beam metrics. Or the UE-recommendation can be reported jointly with at least one of the pairs (resource indicator, beam metric).

Or the UE-recommendation can be reported separately (independently) from the other components in the beam report using a separate parameter (or indicator). The reporting configuration can be joint (one configuration) or separate (two configurations), one for UE-recommendation and another for the other components in the beam report.

Or the reporting of the UE-recommendation and the other components in the beam report are decoupled, i.e., one reporting for the UE-recommendation and another reporting for the other components in the beam report. The reporting configuration can be joint (one configuration) or separate (two configurations), one for UE-recommendation and another for the other components in the beam report.

Note that the UE-recommendation may not be limited to any specific event (such as MPE), it is rather general and is hence applicable to any event of interests for the UE such as MPE mitigation, fast panel selection, fast beam switch, avoiding beam failure (as described above).

In one sub-embodiment, the content of the UE-recommendation is determined (or configured) according to at least one of the following examples.

In one example, the UE-recommendation comprises $Q_2$ additional (beam) resource indicator(s). In one example, $Q_2$ is fixed, for example, to $Q_2$=1. In one example, $Q_2$ is configured. In one example, $Q_2$ is reported by the UE, for example, as part of the beam report (i.e., UE-recommendation). In one example, a UE can report a $Q_2$ value of zero, and in another example, a UE can report a non-zero (positive) value of $Q_2$. In another example, the UE can be configured with a maximum value (v) for $Q_2$, and the UE can a report any $Q_2$ value such that $Q_2 \in \{1, 2, \ldots, v\}$ or $\{0,1,2, \ldots, v\}$.

In one example, the UE-recommendation comprises $Q_2$ additional pairs of (I,J)=(resource indicator, beam metric). In one example, $Q_2$ is fixed, for example, to $Q_2$=1. In one example, $Q_2$ is configured. In one example, $Q_2$ is reported by the UE, for example, as part of the beam report (i.e., UE-recommendation). In one example, a UE can report a $Q_2$ value of zero, and in another example, a UE can report a non-zero (positive) value of $Q_2$. In another example, the UE can be configured with a maximum value (v) for $Q_2$, and the UE can a report any $Q_2$ value such that $Q_2 \in \{1,2, \ldots, V\}$ or $\{0,1,2, \ldots, v\}$.

In one example, the UE-recommendation comprises an ID, where the ID can be associated with a subset of DL measurement RS resources. In one example, the set of $P_1$ DL measurement RS resources can be partitioned into X subsets, and the x-th subset includes $M_x$ DL measurement RS resources such that $P_1 = \Sigma_{x=1}^{X} M_x$. The ID (e.g., subset ID) indicates one of the X subsets. In one example, the $P_1$ DL measurement RS resources is a super-set encompassing X sets, and the x-th set includes $M_x$ DL measurement RS resources such that $P_1 = \Sigma_{x=1}^{X} M_x$. The ID (e.g., set ID) indicates one of the X sets. In one example, the ID can be associated with an antenna panel of the UE (e.g., panel ID) that is equipped with multiple antenna panels.

In one example, the UE-recommendation comprises an ID and $Q_2$ additional (beam) resource indicator(s), where the ID is according to the description in one or more examples above, and $Q_2$ additional (beam) resource indicator(s) is (are) according to the description in one or more examples above. In one example, the $Q_2$ additional (beam) resource indicator(s) can be associated with (dependent or derived from or based on) the ID. In one example, the $Q_2$ additional (beam) resource indicator(s) can be independent of the ID.

In one example, the UE-recommendation comprises an ID and $Q_2$ additional pairs of (I,J)=(resource indicator, beam metric), where the ID is according to the description in one or more examples above, and $Q_2$ additional pairs of (I,J)= (resource indicator, beam metric) according to the description in one or more examples above.

In one sub-embodiment, the reporting of the UE-recommendation can be determined (or configured) according at least one of the following examples.

In one example, the UE-recommendation can always be included the beam report (i.e., reported by the UE).

In one example, the UE-recommendation can always be included the beam report (i.e., reported by the UE) when a condition is met, wherein, for example, the condition being that the UE is equipped with multiple antenna panels, or that the UE reports this (the UE-recommendation) as part of its UE capability, or that an event of interest can be detected by the UE.

In one example, the reporting of the UE-recommendation can be configured (turned ON/OFF), for example, via RRC and/or MAC CE and/or DCI. When configured (turned ON), the UE-recommendation is always included in the beam report.

In one example, the UE decides (has the freedom to decide) whether the UE-recommendation is included in the beam report, i.e., the UE may or may not include the UE-recommendation in the beam report. For instance, such a decision can be made based on the event of interest. In one example, the beam report (with or without the UE-recommendation) is reported via a one-part UCI (similar to WB CSI reporting in Rel. 15 NR, the UE can append a fixed number of zeros in order to ensure that the payload remains the same regardless of whether the UE reports the UE-recommendation or not). In one example, the beam report (with or without the UE-recommendation) is reported via a two-part UCI, wherein part 1 UCI includes an information whether the UE reports the UE-recommendation or not. If the information indicates the UE-recommendation being reported, it is reported via part 2 UCI.

In one example, the capability of reporting of the UE-recommendation is reported by the UE (e.g., via UE capability reporting or as part of an UL transmission). Depending on the reported UE capability, the NW/gNB can configure (or trigger) the reporting of the UE-recommendation via RRC and/or MAC CE (and/or DCI). The UE reports the UE-recommendation according to the configuration/triggering from the NW/gNB.

Upon receiving the beam report, the NW/gNB configures/indicates the UL TX beam indication (which can be the same as DL TX beam indication since beam correspondence holds) to the UE for UL transmission, where the beam indication indicates (A) a message, or (B) $N \geq 1$ UL TX beam(s), or (C) both a message and $N \geq 1$ UL TX beam(s). The beam indication can be via DL-TCI or UL-TCI or J-TCI (joint TCI) or other functionally equivalent entity such as SpatialRelationInfo or SRI that is indicated via DCI and/or MAC CE and/or RRC. In one example N=1. In one example, N=2.

In one sub-embodiment, when the beam report does not include the UE-recommendation, the beam indication is determined (or configured) according to at least one of the following examples.

In one example, when $Q_1$=1 resource indicator is included in the beam report, the beam indication can only indicate (A) a message, where the message corresponds to an ACK message indicating that the N=1 UL TX beam corresponds to the $Q_1$ resource indicator included in the beam report. Some of the details of the ACK message can be according to the same described in embodiment.

In one example, when $Q_1$=1 resource indicator is included in the beam report, the beam indication can indicate (A) a message or (B) $N \geq 1$ UL TX beam(s), where for (A), the message corresponds to an ACK message indicating that the N=1 UL TX beam corresponds to the $Q_1$ resource indicator included in the beam report, and for (B), the $N \geq 1$ UL TX beam(s) is (are) based on the $P_1$ DL measurement RS resources measured by the UE. Some of the details of the ACK message can be according to the same described in embodiment.

In one example, the beam indication can only indicate (B) $N \geq 1$ UL TX beam(s), where the $N \geq 1$ UL TX beam(s) is (are) based on the $P_1$ DL measurement RS resources measured by the UE.

In one sub-embodiment, when the beam report includes the UE-recommendation, the NW/gNB can acknowledge to the UE whether it follows the UE-recommendation or not, and accordingly, the beam indication is determined (or configured) according to at least one of the following examples. Some of the details of the ACK message can be according to the same described in embodiment.

In one example, the NW/gNB follows the UE-recommendation and the beam indication comprises (A) an ACK message to the UE. The NW/gNB may not indicate (B) $N \geq 1$ UL TX beam(s) in this case. Or the NW/gNB may indicate (B) $N \geq 1$ UL TX beam(s). Or, whether the NW/gNB indicates (B) $N \geq 1$ UL TX beam(s) or not may depend on the UE-recommendation. For example, when the UE-recommendation includes $Q_2$=1 additional (beam) resource indicator, the NW/gNB doesn't indicate (B).

In one example, the NW/gNB does not follow the UE-recommendation, it either doesn't send the ACK message or sends a NACK/NULL message to the UE. The NW/gNB indicates the beam indication comprising (B) $N \geq 1$ UL TX beam(s). The beam indication can be based on the $Q_1$ resource indicators included in the beam report. Or the beam indication can be based on the $Q_1$ resource indicators included in the beam report, and if included in the UE-recommendation, also based on the $Q_2$ resource indicators.

In an example, the NW/gNB signals the ACK message included in the beam indication only when the UE-recommendation is provided (reported) by the UE.

In one sub-embodiment, the signaling the ACK (or NACK/NULL) message to the UE is determined (or configured) according to at least one of the following examples. Some of the details of the ACK message can be according to the same described in embodiment.

In one example, the signaling of the ACK message is via a dedicated (separate) parameter or field. The dedicated parameter or field can be indicated via a DCI, where the DCI can be a UL-DCI (scheduling UL grant), or DL-DCI (scheduling DL transmission), or a separate DCI for the beam (TCI state) indication (UL-TCI-DCI or DL-TCI-DCI or TCI-DCI). Alternatively, the dedicated parameter or field can be indicated via channel other than DCI (e.g., PDSCH or MAC CE). In one example, the dedicated field corresponds to a 1-bit indication, where a bit value 0 indicates the ACK message (and, optionally, 1 indicates the NACK/NULL message), or vice versa, i.e., 1 indicates the ACK message (and, optionally, 0 indicates the NACK/NULL message). In one example, the dedicated parameter can take one of a value v0 indicating the ACK message (and, optionally a value v1 indicating the NACK/NULL message).

In one example, the signaling of the ACK message is joint with a parameter or field, which can be indicated via a DCI or a channel other than DCI, as described above. In one example, the field corresponds to a B-bit indication, where when the B-bit indication equals a fixed bit sequence $b_0 b_1 \ldots b_{B-1}$, it indicates the ACK message. In one example, the fixed bit sequence is all-zero, i.e., $b_0 b_1 \ldots b_{B-1} = 00 \ldots 0$. In one example, the fixed bit sequence is all-one, i.e., $b_0 b_1 \ldots b_{B-1} = 11 \ldots 1$. For example, when B=3, i.e., a 3-bit indication is used for the beam indication, the code point 000 (or 111) can be used to indicate the ACK message. The remaining bit sequence values can be used indicate other DL or UL related parameter (such as $N \geq 1$ UL TX beam indication when the gNB/NW does not signal the ACK message).

In one example, the signaling of the ACK (or NACK/NULL) message is configured (turned ON/OFF) to the UE via RRC and/or MAC CE. When configured (turned ON), the signaling is performed according to at least one of the examples described above. Some of the details of the ACK message can be according to the same described in embodiment.

In one example, the field (code point) value or the parameter value for the ACK (or NULL/NACK) message is reserved and can't be used for other purpose regardless of whether the UE is configured to report the ACK (or NULL/NACK) message or not.

In one example, when configured (turned ON), the field (code point) value or the parameter value for the ACK (or NULL/NACK) message is used for indicating the ACK (or NULL/NACK) message, otherwise (turned OFF), it is used for indicating other DL or UL related parameter (such as $N \geq 1$ UL TX beam indication when the gNB/NW does not signal the ACK message).

In one sub-embodiment, a UE provides two sets of reports, either with a same report or separately in two different reports, wherein;

A first report (sub-report) is a beam report including resource indicator(s) and possibly beam metrics, without reflecting the UE's recommendation.

A second report (sub-report) is a beam report including resource indicator(s) and possibly beam metrics, reflecting the UE's recommendation.

In one example, this behavior is configurable/triggered to the UE via RRC and/or MAC CE and/or DCI. When configured, the UE provides two reports (sub-reports), else it provides one report (the first report). In one example, the configuration and/or triggering is UE-specific, in another example, the configuration and/or triggering is UE-group specific, and in another example, the configuration and/or triggering is cell-specific.

In one sub-embodiment, a UE is configured to report the UE-recommendation, as described above (and elsewhere in this disclosure), wherein its reporting is subject to a restriction. At least one of the following examples or a combination of multiple of the following examples is used (or configured) as the restriction.

In one example, the restriction is on the resource type. The resource type can be CSI-RS or SSB for the beam report (including Q1 resource indicators or Q1 pairs of resource indicator and beam metric). However, for the UE-recommendation, it can be according to at least one of the following examples.

In one example, the resource type can be CSI-RS or SSB for the UE-recommendation (including Q2 resource indicators or Q2 pairs of resource indicator and beam metric).

In one example, the resource type can be CSI-RS for the UE-recommendation (including Q2 resource indicators or Q2 pairs of resource indicator and beam metric).

In one example, the resource type can be SSB for the UE-recommendation (including Q2 resource indicators or Q2 pairs of resource indicator and beam metric).

In one example, the restriction is based on the value of $Q_1$. At least one of the following examples can be used.

In one example, the UE-recommendation can only be reported when $Q_1=1$, i.e., the reporting of one resource indicator (e.g., CRI or SSBRI) or one pair of resource indicator and beam metric (e.g., CRI/SSB-RI+RSRP/SINR) is configured. The UE-recommendation can include CRI/SSB-RI (or CRI/SSBRI+RSRP/SINR) associated (or QCL-ed) with UL TX beams that should be used even if they do not correspond to the beams with the largest RSRP/SINR.

In one example, the UE-recommendation can only be reported when $Q_1=2$, i.e., the reporting of two resource indicators (e.g., CRIs or SSBRIs) or two pairs of resource indicator and beam metric (e.g., CRI/SSB-RI+RSRP/SINR) is configured. The UE-recommendation can include CRI/SSB-RI (or CRI/SSBRI+RSRP/SINR) associated (or QCL-ed) with UL TX beams that should be used even if they do not correspond to the beams with the largest RSRP/SINR.

In one example, the UE-recommendation can only be reported when $Q_1=1$ or 2, i.e., the reporting of one or two resource indicators (e.g., CRI or SSBRI) or one or two pairs of resource indicator and beam metric (e.g., CRI/SSB-RI+RSRP/SINR) is configured. The UE-recommendation can include CRI/SSB-RI (or CRI/SSBRI+RSRP/SINR) associated (or QCL-ed) with UL TX beams that should be used even if they do not correspond to the beams with the largest RSRP/SINR.

In one example, the beam reporting including $Q_1$ beam reports remains the same regardless of whether the UE-recommendation is reported or not, since it can be used for DL and/or UL (e.g., for beam indication for DL reception and/or UL transmission). However, the UE-recommendation when reported is used only for UL (e.g., for beam indication for UL transmission).

Figure 17:
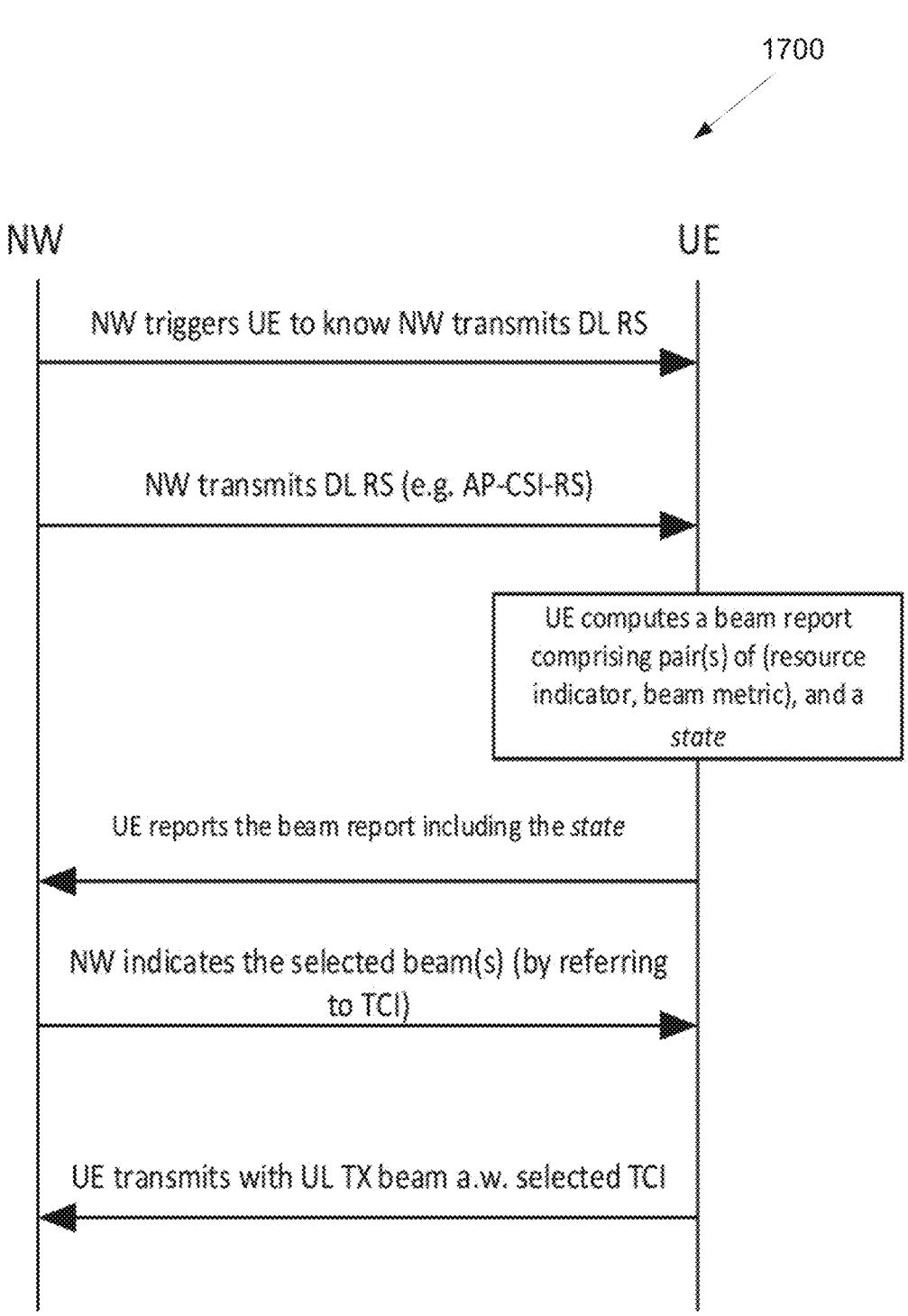
FIG. 17 illustrates a flow diagram of a UE configured to measure DL measurement RS resources and report a beam report according to embodiments of the present disclosure.

FIG. 17 illustrates a flow diagram 1700 of a UE configured to measure $P_1$ DL measurement RS resources according to embodiments of the present disclosure. The embodiment of the flow diagram 1700 of a UE configured to measure $P_1$ DL measurement RS resources illustrated in FIG. 17 is for illustration only. FIG. 17 does not limit the scope of this disclosure to any particular implementation of the flow diagram 1700 of a UE configured to measure $P_1$ DL measurement RS resources.

In one embodiment, as illustrated in FIG. 17, a UE is configured (by the NW/gNB) to measure (receive) $P_1$ DL measurement RS resources (such as CSI-RS or SSB), where $P_1 \geq 1$, and the details about this measurement are as described in embodiment.

The UE is further configured (by the NW/gNB) to report a beam report, wherein the beam report includes $Q_1$ resource indicators (I) or $Q_1$ pairs of (I,J)=(resource indicator, beam metric), where $Q_1 \leq P_1$, and resource indicator and beam metric are according to the examples described in embodiment. For example, the resource indicator can be SSBRI or CRI, and the beam metric can be L1-RSRP or L1-SINR, as defined in Rel. 15/16 NR specification.

In addition to $Q_1$ resource indicators (I) or $Q_1$ pairs of (I,J)=(resource indicator, beam metric), the beam report can also include an information about the 'state' of the beam reporting (e.g., state=MPE condition). The time-domain behavior of this beam measurement and/or beam reporting can be configured as aperiodic (AP), semi-persistent (SP), or periodic (P). The time-domain behavior of the beam measurement RS can be configured as aperiodic (AP), semi-persistent (SP), or periodic (P). The information about the 'state' can be reported via a bitmap or bit-field or bit sequence. Or the information about the 'state' can be reported via a parameter or information element (IE).

The 'state' can be reported jointly with the other components included in the beam report using a joint parameter (or indicator). For example, the 'state' can be reported jointly with at least one of the resource indicators. Or the 'state' can be reported jointly with at least one of the beam metrics. Or the 'state' can be reported jointly with at least one of the pairs (resource indicator, beam metric).

Or the 'state' can be reported separately (independently) from the other components in the beam report using a separate parameter (or indicator). The reporting configuration can be joint (one configuration) or separate (two configurations), one for 'state'(s) and another for the other components in the beam report.

Or the reporting of the 'state' and the other components in the beam report are decoupled, i.e., one reporting for the 'state' and another reporting for the other components in the beam report. The reporting configuration can be joint (one configuration) or separate (two configurations), one for 'state' (s) and another for the other components in the beam report.

In one example, when the UE is equipped with X>1 antenna panels, $Q_1$=X, and one resource indicator (I) or pair of (I,J)=(resource indicator, beam metric) is reported for each antenna panel. In one example, when the UE is equipped with X>1 antenna panels, $Q_1 \geq X$, and at least one resource indicator (I) or pair of (I,J)=(resource indicator, beam metric) is reported for each antenna panel. The set of $P_1$ DL measurement RS resources can be partitioned into X subsets, one subset for each antenna panel. Or the $P_1$ DL measurement RS resources is a super-set encompassing X sets, one set for each antenna panel. In one example, the information about X panels are not provided to the NW/gNB. In one example, the information about X panels is provided to the NW/gNB. For instance, the information about the panel ID can be included/reported implicitly, e.g., from the resource indicators (I). Or, the information about the panel ID can be included/reported explicitly, e.g., by including/reporting the panel ID(s) in the beam report.

For X>1 antenna panels at the UE, the 'state' can be reported independently for each panel. Or the 'state' can be reported for one of the X panels (e.g., the panel that has the worst MPE issue), and can also include a corresponding panel ID optionally. Or the 'state' can be reported for all panels that have MPE issue. If there is no MPE issue detected, the UE does not report the 'state', otherwise, the UE reports the 'state' for all panels having the MPE issue and can also report the corresponding panels ID(s) optionally.

For X>1 subsets (or sets) of DL measurement RS resources, the 'state' can be reported independently for each subset (or set). Or the 'state' can be reported for one of the X subsets (or sets), e.g., the subset or the set that has worst MPE issue and can also include a corresponding subset (or set) ID optionally. Or the 'state' can be reported for all subsets (or sets) that have MPE issue. If there is no MPE issue detected, the UE does not report the 'state', otherwise, the UE reports the 'state' for all subsets (or sets) having the MPE issue and can also report the corresponding subset (or set) ID(s) optionally.

The 'state' can be related to an event of interest (such as MPE), or panel status (or ID), or whether the beam report is for one of or both of DL reception and UL transmission. At least one of the following examples can be used for reporting the information about the state.

In one example, the state is regarding the MPE event or MPE mitigation. For example, a 1-bit indication B can be used to indicate one of the two states: (i) MPE detected (or MPE mitigation), and (ii) MPE not detected (not for MPE mitigation). For example, B=1 indicates (i) and B=0 indicates (ii), or vice versa. Alternatively, a parameter p is used to indicate one of the two states: (i) and (ii), via value p=v0 and p=v1, respectively.

In one example, the state is regarding a panel entity when the UE is equipped with multiple UE panels. For example, the state can correspond to an ID e.g., panel ID or set ID or resource ID associated with a panel.

In one example, the state is regarding a combination of the MPE event and panel entity. For example, the state can indicate a pair (x,y), where x is either (i) or (ii) in one or more examples above, and y is an ID as described in one or more examples above.

In one example, the state is regarding the recommended/preferred usage of the beam report for one of both of DL reception and UL transmission. At least one of the following examples is used/configured.

In one example, the state indicates one of the two possible values S={DL reception, none}.

In one example, the state indicates one of the two possible values S={none, UL transmission}.

In one example, the state indicates one of the two possible values S={none, both DL reception and UL transmission}.

In one example, the state indicates one of the two possible values S={DL reception, UL transmission}.

In one example, the state indicates one of the two possible values S={DL reception, both DL reception and UL transmission}.

In one example, the state indicates one of the two possible values S={UL transmission, both DL reception and UL transmission}.

In one example, the state indicates one of the three possible values S={DL reception, UL transmission, both DL reception and UL transmission}.

In one example, the state indicates one of the two possible values S={none, DL reception, UL transmission}.

In one example, the state indicates one of the two possible values S={none, DL reception, both DL reception and UL transmission}.

In one example, the state indicates one of the two possible values S={none, UL transmission, both DL reception and UL transmission}.

In one example, the state indicates one of the three possible values S={none, DL reception, UL transmission, both DL reception and UL transmission}.

In one example, the state is regarding a combination of the MPE event and the recommended usage of the beam report for one of both of DL reception and UL transmission. For example, the state can indicate a pair (x,y), where x is either (i) or (ii) in example A, and y takes a value from S, as described in example D.

In one example, the state is regarding a combination of the panel entity and the recommended usage of the beam report for one of both of DL reception and UL transmission. For example, the state can indicate a pair (x,y), where x is an ID as described in one or more examples above, and y takes a value from S, as described in one or more examples above.

In one example, the state is regarding a combination of the MPE event, the panel entity, and the recommended usage of the beam report for one of both of DL reception and UL transmission. For example, the state can indicate a triple (x,y,z), where x is either (i) or (ii) in one or more examples above, y is an ID as described in one or more examples above, and z takes a value from S, as described in one or more examples above.

Where 'none' implies no reporting of the recommended/ preferred usage from the UE. Or 'none' implies that additional information about the state is not reported in the beam report.

Regarding the beam metric for different values of the 'state', at least one of the following examples is used/ configured.

In one example, the beam metric can remain the same regardless of the reported value of the 'state'.

In one example, the beam metric can be modified depending on the reported value of the 'state'. For example, the modification corresponds to a scaling of the beam metric L1-RSRP or L1-SINR.

In one example, the beam metric can be m1 for when the reported value of the 'state' belongs to a set T1, and the beam metric can be m2 for when the reported value of the 'state' belongs to a set T2, where m1 and m2 are two different beam metrics, and T1 and T2 are two sets of possible values of the 'state'. The sets T1 and T2 can be disjoint (i.e., no common element). The (m1,m2) is according to at least one of the following examples:
(m1,m2)=(L1-RSRP, scaled L1-RSRP)
(m1,m2)=(L1-SINR, scaled SINR)
(m1,m2)=(L1-RSRP, L1-SINR)
(m1,m2)=(L1-RSRP, UL RSRP)

(m1,m2)=(L1-RSRP, virtual PHR)
(m1,m2)=(L1-SINR, UL RSRP)
(m1,m2)=(L1-SINR, virtual PHR)

In one example, the beam metric can be m1 for when the reported value of the 'state' belongs to a set T1, the beam metric can be m2 for when the reported value of the 'state' belongs to a set T2, and the beam metric can be m3 for when the reported value of the 'state' belongs to a set T3, where m1, m2, and m3 are three different beam metrics, and T1, T2, and T3 are three sets of possible values of the 'state'. The sets T1, T2, and T3 can be disjoint (i.e., no common element). The (m1, m2,m3) is according to at least one of the following examples:
(m1,m2,m3)=(L1-RSRP, scaled L1-RSRP, UL RSRP)
(m1,m2,m3)=(L1-RSRP, scaled L1-RSRP, virtual PHR)
(m1,m2,m3)=(L1-SINR, scaled L1-SINR, UL RSRP)
(m1,m2,m3)=(L1-SINR, scaled L1-SINR, virtual PHR)
(m1,m2,m3)=(L1-RSRP, UL RSRP, virtual PHR)
(m1,m2,m3)=(L1-SINR, UL RSRP, virtual PHR)
m1,m2,m3)=(L1-RSRP, L1-SINR, virtual PHR)
(m1,m2,m3)=(L1-RSRP, L1-SINR, UL RSRP)

In one example, the beam report can include a second metric (in addition to the beam metric) for some reported value(s) of the 'state'. That is, when the 'state' belongs to a set T1, the beam metric is reported (and the second metric is not reported), and when the 'state' belongs to a set T2, both the beam metric and the second metric are reported. Whether the second metric can be reported is determined based on at least one of the following examples.

In one example, it is based on a configuration (e.g., via RRC and/or MAC CE and/or DCI).

In one example, it is determined and reported by the UE. In this case, a two-part UCI (similar to Rel. 15 NR specification) can be used, wherein the UCI part 1 has an information about whether and/or the number of the second metric being reported in UCI part 2.

In one example, it is subject to a UE capability reporting.

In one example, $Q_1=1$, indicating only one beam (resource indicator and metrics) is reported in the beam report. In this case, the 'state' value can be fixed, or reported by the UE, the details as explained above.

In one example, when $Q_1>1$, there are multiple beams (resource indicators and metrics) reported in the beam report. At least one of the following examples is used/ configured regarding the 'state'.

In one example, all $Q_1$ beams correspond to the same value of the 'state'. For example, when the 'state' is related to the MPE, all $Q_1$ beams are for (i) for MPE mitigation (taking MPE into account) or (ii) without MPE, i.e., are normal beams without taking MPE into account. A common bit field, IE, or parameter (e.g., 1-bit field or a parameter taking two values) is used for $Q_1$ beams.

In one example, N1 out of $Q_1$ beams can correspond to one value of the 'state' (e.g., taking MPE into account) and remaining N2 beams can correspond to another value of the 'state' (e.g., normal beams without taking MPE into account).

In one example, both N1 and N2 are fixed.

In one example, N1 is fixed and N2 is configured (e.g., RRC and/or MAC CE and/or DCI).

In one example, N1 is fixed or configured (e.g., RRC and/or MAC CE and/or DCI), and N2 is reported by UE. A 2-part UCI can be used. For example, the value N2 can be from 0 to $Q_1$–N1. When N2=0, the UCI part 2 is absent not reported. When N2>1, one beam is reported via UCI part 2. Or UCI part 1 includes report for N1 beams, and a portion of report for N2 beams, and UCI part 2 includes remaining portion of report for N2 beams.

In one example, both N1 and N2 reported by UE. A 2-part UCI can be used. For example, reported for a fixed number of beams is reported via UCI part 1, and the remaining via UCI part 2. Or UCI part 1 includes report for a portion of report $Q_1$ beams, and UCI part 2 includes remaining portion of report for $Q_1$ beams.

In the rest of disclosure, the 'state' is assumed to indicate one of two values, whether MPE issue is detected by the UE or not. The embodiments and examples however are applicable other examples of the 'state' described above.

In one sub-embodiment, the content or information conveyed by the 'state' is determined (or configured) according to at least one of the following examples.

In one example, the 'state indicates one of two values, e.g., whether MPE issue is detected by the UE or not. For example, the information can be conveyed via a 1-bit field, where the field value=0 (or 1) indicates that the MPE issue is not detected, and the field value=1 (or 0) indicates that the MPE issue is detected.

When the field value=0 (or 1), e.g., indicating that the MPE issue is not detected, the beam report includes beam indicator(s) (e.g., CRI(s)/SSBRI(s) and beam metric(s) (e.g., L1-RSRP, L1-SINR etc.)

When the field value=1 (or 0), e.g., indicating that the MPE issue is detected, the beam report includes beam indicator(s) (e.g., CRI(s)/SSBRI(s) and beam metric(s) taking the event indicated by the field value into account, where a beam metric taking the event indicated by the field value can be at least one of the following:

In one example: the same as the beam metric when the field value=0, e.g., L1-RSRP, L1-SINR etc.

In one example: a modified beam metric, e.g., the modification corresponds to a scaling of the beam metric L1-RSRP or L1-SINR.

In one example: a new beam metric, e.g., UL RSRP, or virtual PHR. In one example, the UL RSRP is defined as UL RSRP=L1-RSRP–$P_{DL}$+$P_{UL}$, where L1-RSRP is the measured DL RSRP, $P_{DL}$ is the DL transmit power, and $P_{UL}$ is the available UL transmit power (or max UL transmit power). In one example, the virtual PHR is defined as a difference between the maximum available transmit power (e.g., $P_{c,max}$) and the required transmit power.

In one example, the information indicates whether MPE issue is detected by the UE or not. For example, the information can be conveyed via a parameter, where the parameter value=v0 indicates that the MPE issue is not detected, and the parameter value=v1 indicates that the MPE issue is detected.

In one example, the information includes a value of the MPE. For example, the information can be conveyed via a M-bit field. When M=1, the 1-bit field indicates one of the two values $\{m_0, m_1\}$, where either both values map to (maximum or minimum) MPE values, or one of them maps to the state "MPE issue not detected", and the other maps to the state "MPE detected and a corresponding (maximum or minimum) MPE value". When M=2, the 2-bit field indicates one of the four values $\{m_0, m_1, m_2, m_3\}$, where either all values map to (maximum or minimum) MPE values, or one of them maps to the state "MPE issue not detected", and the remaining map to the states "MPE detected and a corresponding (maximum or minimum) MPE value." In general, the M-bit field indicates one of the $2^M$ values $\{m_0, m_1, \ldots, m_{M-1}\}$, where either all values map to (maximum or minimum) MPE values, or one of them maps to the state "MPE issue not detected", and the remaining map to the states "MPE detected and a corresponding (maximum or minimum) MPE value." The set of values $\{m_0, m_1, \ldots, m_{M-1}\}$ can be fixed, or configured, e.g., via RRC and/or MAC CE and/or DCI. Or a maximum value for the MPE is configured, e.g., via RRC and/or MAC CE and/or DCI, and the set of values $\{m_0, m_1, \ldots, m_{M-1}\}$ is determined based on the configured maximum value. In one example, the set of MP values corresponds to the (maximum or minimum) power headroom (PHR) or Power Management Maximum Power Reduction (P-MPR) or UL duty-cycle values.

In one example, the information includes a value of the MPE. For example, the information can be conveyed via a parameter taking a value from a set comprising M values. When M=2, the parameter indicates one of the two values $\{m_0, m_1\}$, where either both values map to (maximum or minimum) MPE values, or one of them maps to the state "MPE issue not detected", and the other maps to the state "MPE detected and a corresponding (maximum or minimum) MPE value". When M=4, the parameter indicates one of the four values $\{m_0, m_1, m_2, m_3\}$, where either all values map to (maximum or minimum) MPE values, or one of them maps to the state "MPE issue not detected", and the remaining map to the states "MPE detected and a corresponding (maximum or minimum) MPE value." In general, the parameter indicates one of the M values $\{m_0, m_1, \ldots, m_{M-1}\}$, where either all values map to (maximum or minimum) MPE values, or one of them maps to the state "MPE issue not detected", and the remaining map to the states "MPE detected and a corresponding (maximum or minimum) MPE value." The set of values $\{m_0, m_1, \ldots, m_{M-1}\}$ can be fixed, or configured, e.g., via RRC and/or MAC CE and/or DCI. Or a maximum value for the MPE is configured, e.g., via RRC and/or MAC CE and/or DCI, and the set of values $\{m_0, m_1, \ldots, m_{M-1}\}$ is determined based on the configured maximum value. In one example, the set of MP values corresponds to the (maximum or minimum) power headroom (PHR) or Power Management Maximum Power Reduction (P-MPR) or UL duty-cycle values.

In one sub-embodiment, the reporting of the 'state' is determined (or configured) according to at least one of the following examples.

In one example, the 'state' can always be included the beam report (i.e., reported by the UE).

In one example, the 'state' can always be included the beam report (i.e., reported by the UE) when a condition is met, wherein, for example, the condition being that the UE is equipped with multiple antenna panels, or that the UE reports this (the UE-recommendation) as part of its UE capability, or that an event of interest can be detected by the UE.

In one example, the reporting of the 'state' is configured via RRC and/or MAC CE (and/or triggered via DCI). When configured (or triggered), the UE always reports the 'state', otherwise, the UE does not report it. The UE can also be configured with a maximum value for the MPE. In one example, the configuration and/or triggering is UE-specific, in another example, the configuration and/or triggering is UE-group specific, in another example, the configuration and/or triggering is cell-specific.

In one example, the reporting of the 'state' is reported by the UE without any configuration/triggering from the NW (i.e., the UE can initiate such reporting).

In one example, the capability of reporting of the 'state' is reported by the UE (e.g., via UE capability reporting or as part of an UL transmission). Depending on the reported UE capability, the NW/gNB can configure (or trigger) the reporting of the 'state' via RRC and/or MAC CE (and/or DCI). The UE reports the 'state' according to the configuration/triggering from the NW/gNB.

In one example, the UE decides (has the freedom to decide) whether the 'state' is included in the beam report, i.e., the UE may or may not include the 'state' in the beam report. For instance, such a decision can be made based on the event of interest. In one example, the beam report (with or without the 'state') is reported via a one-part UCI (similar to WB CSI reporting in Rel. 15 NR, the UE can append a fixed number of zeros in order to ensure that the payload remains the same regardless of whether the UE reports the 'state' or not). In one example, the beam report (with or without the 'state') is reported via a two-part UCI, wherein part 1 UCI includes an information whether the UE reports the 'state' or not. If the information indicates the 'state' being reported, it is reported via part 2 UCI.

In one sub-embodiment, in addition to $Q_1$ resource indicators (I) or $Q_1$ pairs of (I,J)=(resource indicator, beam metric) and 'state', the beam report can also include a UE-recommendation for UL TX beam selection/indication (by the NW/gNB), where the details about the UE-recommendation are as described in impediment I.1. Also, the 'state' and the UE-recommendation can either be reported jointly or separately.

Upon receiving the beam report, the NW/gNB configures/indicates the UL TX beam indication (which can be the same as DL TX beam indication since beam correspondence holds) to the UE for UL transmission, where the beam indication indicates $N \geq 1$ UL TX beam(s). The beam indication can be via DL-TCI or UL-TCI or J-TCI (joint TCI) or other functionally equivalent entity such as SpatialRelationInfo or SRI that is indicated via DCI and/or MAC CE and/or RRC. In one example N=1. In one example, N=2. Also, the beam indication can include a message (such as ACK or NACK/NULL), where the details about the message are as described in one or more embodiments above.

In one sub-embodiment, a UE provides two sets of reports, either with a same report or separately in two different reports, wherein;

A first report (sub-report) is a beam report including resource indicator(s) and possibly beam metrics, without reflecting the 'state'.

A second report (sub-report) is a beam report including resource indicator(s) and possibly beam metrics, reflecting the 'state'. For example, the reported resource indicator(s) take into account the MPE effect. The beam metrics include the MPE effect.

In one example, this behavior is configurable/triggered to the UE via RRC and/or MAC CE and/or DCI. When configured, the UE provides two reports (sub-reports), else it provides one report (the first report). In one example, the configuration and/or triggering is UE-specific, in another example, the configuration and/or triggering is UE-group specific, in another example, the configuration and/or triggering is cell-specific.

In one embodiment, which is a variation of one or more embodiments above, except that the 'state' or indicator (e.g., indicating whether the beam report is for MPE or not) is not included in the beam report, it or beam reporting configuration is rather conveyed (provided) to the UE. In one example, this is provided via an RRC parameter.

In one example, this RRC parameter is mpe-Reporting-r17 that allows the UE P-MPR-based MPE reporting (similar to Rel. 16 MPE reporting) included in the PHR report when a threshold is reached and is reported via (or triggered by) MAC-CE (entity), similar to the description in section 5.4.6 of TS 38/321.

In one example, this RRC parameter is via a CSI request field (similar to the beam/CSI reporting configuration in Rel. 15/16).

In one example, this RRC parameter is via a CSI request field (similar to the beam/CSI reporting configuration in Rel. 15/16), but it's triggering is subject to (conditioned on) the MPE reporting included on the PHR report via MAC CE (similar to Rel. 16). That is, the beam reporting is triggered only when the UE reports MPE issue via the PHR report on MAC CE.

In response to the configuration, the UE determines and reports a beam report based on the value of the 'state' or indicator it receives. The UL channel(s) or resource(s) configured for the beam report is according to at least one of the following:

The beam report can be reported on PUCCH. If the PUCCH transmission that includes the beam report overlaps a PUSCH transmission, the uplink control information (UCI) with the beam report is multiplexed in the PUSCH.

The beam report can be included in UCI transmitted on PUSCH, wherein, the PUSCH transmission can be one of: a PUSCH transmission scheduled by an UL grant, or a configured grant PUSCH transmission of Type 1 or of Type 2, or a Msg3 PUSCH transmission for random access procedure Type 1, or a MsgA PUSCH transmission for random access procedure Type 2.

The beam report can be included in the PHR report and, is reported via MAC-CE or triggered via a MAC entity (scheduled to be reported via PUSCH carrying UL MAC).

The beam report can be included in a combination of the PHR report and the UCI. That is a portion of the beam report is reported via MAC-CE (scheduled to be reported via PUSCH carrying UL MAC), and the remaining portion of the beam report is reported via the UCI (e.g., PUCCH, or PUSCH scheduled to carry UCI). In one example, $P_1$ (P-MPR, SSBRI/CRI or UL TCI) pairs are reported via the PHR report, and the remaining $Q_1 - P_1$ (P-MPR, SSBRI/CRI or UL TCI or an ID associated with antenna panel, e.g., CSI-RS/SRS resource set ID) pairs are reported via the UCI, when $Q_1 > P_1$. In one example, $P_1 = 1$. The maximum value of $Q_1$ can be fixed to 4. The maximum value of $Q_1$ can be reported by the UE via UE capability reporting. Alternatively, whether the UE supports the MPE reporting via the UCI is subject to (conditioned on) the UE capability. That is, only when the UE supports reporting on UCI, the UE can be configured with such reporting; otherwise (when the UE doesn't support), the UE can't be configured with MPE reporting on UCI, hence the MPE reporting can only be via MAC CE.

In one example, a two-part PHR reporting via MAC CE is used (similar to two-part UCI reporting). A first part of the PHR reporting includes a fixed $P_1$ (e.g., $P_1 = 1$) number of beam report, and the second part of the PHR reporting includes the remaining $Q_1$–$P_1$ number of beam report. When the value $Q_1$ is determined by the UE, then an information about the value $Q_1$–$P_1$ is included in the first part. Alternatively, whether the UE supports the two-part PHR reporting via the MAC CE is subject to (conditioned on) the UE capability. That is, only when the UE supports two-part PHR reporting, the UE can be configured with such reporting; otherwise (when the UE doesn't support), the UE can't be configured with two-part PHR reporting, hence the MPE reporting can only be via (one part) PHR reporting and/or UCI.

In a variation, to facilitate MPE mitigation, the Rel-16 event-triggered P-MPR-based reporting (included in the PHR report when a threshold is reached, reported via MAC-CE) is extended as follows.

In one example, $Q_1 \geq 1$ P-MPR values can be reported together with $M \geq 1$ SSBRI(s)/CRI(s), where the M SSBRI(s)/CRI(s) is selected by the UE from a candidate SSB/CSI-RS resource pool and/or from the pool of configured or activated TCI states (UL TCI or joint TCI).

In one example, $Q_1 \geq 1$ P-MPR values can be reported together with $M \geq 1$ panel-associated indicator, e.g., an ID associated with antenna panel (e.g., SRS/CSI-RS resource set ID).

In one example, $Q_1 \geq 1$ P-MPR values can be reported together with $M \geq 1$ SSBRI(s)/CRI(s) and $M \geq 1$ panel-associated indicator, e.g., an ID associated with antenna panel (e.g., SRS/CSI-RS resource set ID)

In one example, the $Q_1$ P-MPR value(s) include the existing P-MPR value in Rel. 16 PHR reporting on MAC CE. So, there are $Q_1$ P-MPR value(s) and M SSBRI(s)/CRI(s) included in the report. In another example, the $Q_1$ P-MPR value(s) is in addition to the existing P-MPR value in Rel. 16 PHR reporting on MAC CE. So, there are $Q_1+1$ P-MPR value(s) (one from existing Rel.16 and the rest additional) and M SSBRI(s)/CRI(s) included in the report.

In one example, $Q_1$=M. In one example, $M > Q_1$. In one example, $Q_1$=1 and $M \geq 1$.

In one example, $Q_1$ represents the number of selected beams (via CRIs/SSBRIs) and/or the number of panels (via IDs associated with antenna panels).

The supported values of $Q_1$ can be fixed (e.g., 4). Or it can be configured from {1,2,3,4}. Or the max value of $Q_1$ is reported by the UE (e.g., via UE capability reporting), and the configured value is less or equal to the reported value.

As explained above, this reporting can also be via a combination of PHR reporting and the UCI reporting, or via a two-part PHR reporting. The additional reporting quantities can also be included, which can comprise UL RSRP, virtual PHR, DL RSRP etc., details of which are according to at least one example in this disclosure.

Figure 18:
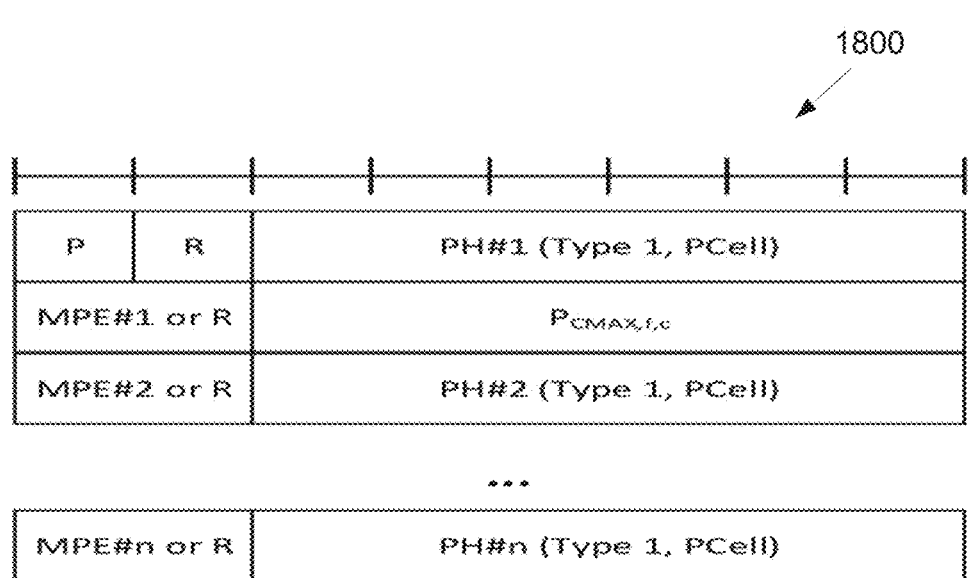
FIG. 18 illustrates an example of single-entry MAC CE for multiple MPE reports according to embodiments of the present disclosure.

FIG. 18 illustrates an example of single-entry MAC CE for multiple MPE reports 1500 according to embodiments of the present disclosure. The embodiment of the single-entry MAC CE for multiple MPE reports 1800 illustrated in FIG. 18 is for illustration only. FIG. 18 does not limit the scope of this disclosure to any particular implementation of the single-entry MAC CE for multiple MPE reports 1800.

FIG. 19 illustrates an example of single-entry MAC CE for multiple MPE reports 1900 according to embodiments of the present disclosure. The embodiment of the single-entry MAC CE for multiple MPE reports 1900 illustrated in FIG. 19 is for illustration only. FIG. 19 does not limit the scope of this disclosure to any particular implementation of the single-entry MAC CE for multiple MPE reports 1900.

For beam reporting included in the PHR reporting via MAC CE, two examples of the single-entry MAC CE for multiple MPE reports are shown in FIG. 18 and FIG. 19.

In one example, the content of the beam report is according to one of the examples in this disclosure. A few similar or other examples of the content of the beam report are as follows.

In one example, the beam report includes $Q_1$ pairs (I,J), where I=indicator=SSBRI or CRI or TCI (UL TCI or joint-TCI) or an ID associated with antenna panel (e.g., SRS/CSI-RS resource set ID), and J=metric=m=a MPE metric when there is an MPE issue (MPE issue detected). In one example, the metric is P-MPR. In one example, the metric is UL RSRP. In one example, the metric is modified virtual PHR. In one example, the metric is a combination of DL-RSRP and P-MPR. In one example, the metric is a combination of DL-RSRP and virtual PHR. The details of these metrics are according to an example in this disclosure.

In one example, the beam report includes $Q_1$ pairs (I,J), where I=indicator=SSBRI or CRI or TCI (UL TCI or joint-TCI) or an ID associated with antenna panel (e.g., SRS/CSI-RS resource set ID), and J=metric=m is one of m1 and m2 m=m1, when 'state' or indicator=0 or v0, which for example indicates a normal metric when there is no MPE issue (MPE issue not detected), m=m2, when 'state' or indicator=1 or v1, which for example indicates a MPE metric when there is an MPE issue (MPE issue detected).

At least one of the following examples is used/configured for (m1, m2).

In one example, (m1, m2)=(DL RSRP, UL RSRP), where DL RSRP=L1-RSRP as in Rel.15 or a modified L1-RSRP, where the modification corresponds to one of the following.

a scaling of the beam metric by $\zeta$, i.e., DL RSRP×$\zeta$; where $\zeta$ can depend on path loss subtracting (reducing) a factor $\gamma$, i.e., DL RSRP–$\gamma$; where $\gamma$ can depend on path loss UL RSRP=DL RSRP–P-MPR or UL RSRP=L1-RSRP–$P_{DL}$+$P_{UL}$ as defined in one or more examples above.

In one example, (m1, m2)=(DL SINR, UL RSRP), where DL RSRP=L1-SINR as in Rel.16 or a modified L1-SINR, where the modification corresponds to one of the following.

a scaling of the beam metric by $\zeta$, i.e., DL SINR×$\zeta$; where $\zeta$ can depend on path loss subtracting (reducing) a factor $\gamma$, i.e., DL SINR–$\gamma$; where $\gamma$ can depend on path loss UL RSRP=DL RSRP–P-MPR or UL RSRP=L1-RSRP–$P_{DL}$+$P_{UL}$ as defined in one or more examples above.

In one example, (m1, m2)=(DL RSRP, vPHR), where DL RSRP is as explained in above examples, and vPHR is the virtual PHR as defined in this disclosure [REFS].

$$vPHR_{b,f,c}(i,j,q_d,l) = P_{CMAX,f,c}(i,q_d) - \{P_{O_{PUSCH,b,f,c}}(i) + 10 \log_{10}(2^{\mu \cdot ref} M_{RB,b,f,c}^{ref,PUSCH}(i) + \alpha_{b,f,c}(j)PL_{b,f,c}(q_d) + \Delta_{TF,ref,b,f,c} + f_{b,f,c}(i,l)\} \text{ [dB]}$$

In one example, (m1, m2)=(DL SINR, vPHR), where DL SINR and vPHR are as explained in above examples.

In one example, (m1, m2)=(DL RSRP, UL RSRP or vPHR), where m2=UL RSRP or vPHR based on configuration (e.g., RRC via CSI-AperiodicTriggerState or new parameter), or codepoint (CSI request field in DCI or a separate field in DCI) or based on UE capability. The UE may support only one of the two metrics, or UE may support both, and the NW will configure/trigger one of the two metrics based on the UE capability reporting. The details of the three metrics are as explained in above examples.

In one example, (m1, m2)=(DL SINR, UL RSRP or vPHR), where m2=UL RSRP or vPHR based on configuration (e.g., RRC via CSI-AperiodicTriggerState or new parameter), or codepoint (CSI request field in DCI or a separate field in DCI) or based on UE capability. The UE may support only one of the two metrics, or UE may support both, and the NW will configure/trigger one of the two metrics based on the UE capability reporting. The details of the three metrics are as explained in above examples.

In one example, (m1, m2)=one of the examples in one or more embodiments above.

In one example, the beam report includes $Q_1$ pairs (I,J), where I=indicator=SSBRI or CRI or TCI (UL TCI or joint-TCI) or an ID associated with antenna panel (e.g., SRS/CSI-RS resource set ID), and J=metric=m is one of m1 and a pair (m2, m3)

m=m1, when 'state' or indicator=0 or v0, which for example indicates a normal metric when there is no MPE issue (MPE issue not detected), m=a pair (m2, m3), when 'state' or indicator=1 or v1, which for example indicates a MPE metric when there is an MPE issue (MPE issue detected).

At least one of the following examples is used/configured for (m1, m2, m3).

In one example, m1=DL RSRP, and (m2, m3)=(DL RSRP, P-MPR), where

DL RSRP is as explained in above examples,

P-MPR (Power Management-Maximum Power Reduction) is the reduction in maximum UL power due to the maximum permissible exposure (MPE) regulations.

In one example, m1=DL RSRP, and (m2, m3)=(UL RSRP, P-MPR), where DL RSRP, UL RSRP, and P-MPR are as explained in above examples.

In one example, m1=DL RSRP, and (m2, m3)=(DL RSRP, vPHR), where DL RSRP and vPHR are as explained in above examples.

In one example, m1=DL RSRP, and (m2, m3)=(UL RSRP, vPHR), where DL RSRP, UL RSRP, and vPHR are as explained in above examples.

In one example, m1=DL RSRP, and (m2, m3)=(DL RSRP, UL RSRP), where DL RSRP and UL RSRP are as explained in above examples.

In one example, m1=DL RSRP, and (m2, m3)=(P-MPR, vPHR), where P-MPR and vPHR are as explained in above examples.

In one example, m1=DL SINR, and (m2, m3) is according to one of the above examples.

Table 35, Table 36, and Table 37 define three examples of the P-MPR report mapping.

TABLE 35

Mapping of P-MPR

| Reported value | Measured quantity value | Unit |
|---|---|---|
| P-MPR_00 | 3 ≤ PMP-R < 6 | dB |
| P-MPR_01 | 6 ≤ PMP-R < 9 | dB |

TABLE 35-continued

Mapping of P-MPR

| Reported value | Measured quantity value | Unit |
|---|---|---|
| P-MPR_02 | 9 ≤ PMP-R < 12 | dB |
| P-MPR_03 | PMP-R ≥ 12 | dB |

TABLE 36

Mapping of P-MPR

| Reported value | Measured quantity value | Unit |
|---|---|---|
| P-MPR_00 | 1.5 ≤ PMP-R < 3 | dB |
| P-MPR_01 | 3 ≤ PMP-R < 4.5 | dB |
| P-MPR_02 | 4.5 ≤ PMP-R < 6 | dB |
| P-MPR_03 | 6 ≤ PMP-R < 7.5 | dB |
| P-MPR_04 | 7.5 ≤ PMP-R < 9 | dB |
| P-MPR_05 | 9 ≤ PMP-R < 10.5 | dB |
| P-MPR_06 | 10.5 ≤ PMP-R < 12 | dB |
| P-MPR_07 | PMP-R ≥ 12 | dB |

TABLE 37

Mapping of P-MPR

| Reported value | Measured quantity value | Unit |
|---|---|---|
| P-MPR_00 | 2 ≤ PMP-R < 4 | dB |
| P-MPR_01 | 4 ≤ PMP-R < 6 | dB |
| P-MPR_02 | 6 ≤ PMP-R < 8 | dB |
| P-MPR_03 | 8 ≤ PMP-R < 10 | dB |
| P-MPR_04 | 10 ≤ PMP-R < 12 | dB |
| P-MPR_05 | 12 ≤ PMP-R < 14 | dB |
| P-MPR_06 | 14 ≤ PMP-R < 16 | dB |
| P-MPR_07 | PMP-R ≥ 16 | dB |

When $Q_1>1$, the first P-MPR can be reported according to one of Table 35 through Table 37, and the remaining $Q_1-1$ P-MPR can be reported according to at least one of the following.

In one example, the P-MPR values are reported without any ordering. Hence, the same payload (number of bits) is used for reporting each P-MPR value.

In one example, the P-MPR values are ordered (sorted) in decreasing order and reported in a differential manner. That is, the first P-MPR ($v_0$) is reported using $x_0$ bits (e.g., $x_0=2$ or 3) and acts a reference for the second P-MPR. The differential second P-MPR ($d_1$) is reported using $x_1$ bits (e.g., $x_1=1$ or 2 bits), the actual second P-MPR is given by $v_1=d_1+v_0$, and the second P-MPR acts a reference for the third P-MPR, and so on. Alternatively, the first P-MPR ($v_0$) acts a reference for all of the remaining P-MPR values (second, third, and so on).

In one example, the P-MPR values are reported in a differential manner. That is, the first P-MPR ($v_0$) is reported using $x_0$ bits (e.g., $x_0=2$ or 3) and acts a reference for the second P-MPR. The differential second P-MPR ($d_1$) is reported using $x_1$ bits (e.g., $x_1=1$ or 2 bits), the actual second P-MPR is given by $v_1=d_1+v_0$, and the second P-MPR acts a reference for the third P-MPR, and so on. Alternatively, the first P-MPR ($v_0$) acts a reference for all of the remaining P-MPR values (second, third, and so on).

In one example, the beam report includes $Q_1$ pairs (I,J), where I=indicator=SSBRI or CRI or TCI (UL TCI or joint-TCI) or an ID associated with antenna panel (e.g., SRS/CSI-RS resource set ID), and J=metric=m is one of m1 and m2 m=m1, when 'state' or indicator=0 or v0, which for example indicates a first MPE metric when there is MPE issue (MPE issue detected), m=m2, when 'state' or indicator=1 or v1, which for example indicates a second MPE metric when there is MPE issue (MPE issue detected).

At least one of the following examples is used/configured for (m1, m2).

In one example, (m1, m2)=(vPHR, UL RSRP), where UL RSRP and vPHR are as described above.

In one example, (m1, m2)=one of the examples in one or more embodiments above.

In one example, the beam report includes $Q_1$ pairs (I,J), where I=indicator=SSBRI or CRI or TCI (UL TCI or joint-TCI) or an ID associated with antenna panel (e.g., SRS/CSI-RS resource set ID), and J=metric=m is one of m1, m2, and m3 m=m1, when 'state' or indicator=0 or v0, which for example indicates a normal metric when there is no MPE issue (MPE issue not detected), m=m2, when 'state' or indicator=1 or v1, which for example indicates a first MPE metric when there is MPE issue (MPE issue detected), m=m3, when 'state' or indicator=2 or v2, which for example indicates a second MPE metric when there is MPE issue (MPE issue detected).

At least one of the following examples is used/configured for (m1, m2, m3).

In one example, (m1, m2, m3)=(DL RSRP, UL RSRP, vPHR), where DL RSRP, UL RSRP, and vPHR are as described above.

In one example, (m1, m2, m3)=(DL SINR, UL RSRP, vPHR), where DL RSRP, UL RSRP, and vPHR are as described above.

In one example, (m1, m2)=one of the examples in one or more embodiments above.

In one example, the beam report includes $Q_1$ pairs (I,J), where I=indicator=SSBRI or CRI or TCI (UL TCI or joint-TCI) or an ID associated with antenna panel (e.g., SRS/CSI-RS resource set ID), and J=metric=m is one of m1, m2, and a pair (m3, m4)

m=m1, when 'state' or indicator=0 or v0, which for example indicates a normal metric when there is no MPE issue (MPE issue not detected), m=m2, when 'state' or indicator=1 or v1, which for example indicates a MPE metric when there is MPE issue (MPE issue detected), m=a pair (m3, m4), when 'state' or indicator=2 or v2, which for example indicates a MPE metric pair when there is MPE issue (MPE issue detected).

At least one of the following examples is used/configured for (m1, m2, m3, m4).

In one example, m1=DL RSRP, m2=UL RSRP, and (m3, m4) is one of the examples for (m2, m3) in one or more examples above.

In one example, m1=DL RSRP, m2=vPHR, and (m3, m4) is one of the examples for (m2, m3) in one or more examples above.

In one example, m1=DL RSRP, m2=P-MPR, and (m3, m4) is one of the examples for (m2, m3) in one or more examples above.

In one example, m1=DL SINR, m2=UL RSRP, and (m3, m4) is one of the examples for (m2, m3) in one or more examples above.

In one example, m1=DL SINR, m2=vPHR, and (m3, m4) is one of the examples for (m2, m3) in one or more examples above.

In one example, m1=DL SINR, m2=P-MPR, and (m3, m4) is one of the examples for (m2, m3) in one or more examples above.

In one example, the UE reports via its capability reporting whether it supports one of or both of the MPE metrics, m=m2 and m=(m3, m4).

In one example, the state or indicator (e.g., 1-bit or 2-bit indicator) is conveyed to the UE explicitly, and the UE determines/reports the beam report according to the received state or indicator.

In one example, the state or indicator is conveyed via a DCI. For example, a CSI request field or a separate field in the DCI can be used for this purpose.

In one example, the state or indicator is conveyed via MAC CE. For example, an activation command that activates CSI-RS subset selection or a separate activation command can be used for this purpose.

In one example, the state or indicator is conveyed via higher layer (RRC). For example, a trigger state definition (CSI-AperiodicTriggerState) for CSI reporting or a separate RRC parameter can be used for this purpose.

FIG. 20 illustrates an example of single-entry MAC CE for multiple MPE reports 2000 according to embodiments of the present disclosure. The embodiment of the single-entry MAC CE for multiple MPE reports 2000 illustrated in FIG. 20 is for illustration only. FIG. 20 does not limit the scope of this disclosure to any particular implementation of the single-entry MAC CE for multiple MPE reports 2000.

In one example, the beam reporting is "triggering" implicitly (without CSI configuration/triggering). For example, a UE-initiated or event-triggered mechanism can be used as the trigger. For instance, the implicit trigger is based on the MPE reporting via single or multiple entry PHR reporting on a MAC entity (cf. Section 5.4.6, 6.1.3.8/9, TS 38.321) when the MPE reporting includes P=1 and the corresponding MPE (P-PMR) value (FIG. 16) for single entry PHR MAC CE). That is, when a UE reports the MPE value and P=1, the UE will report the beam report, either in the same time slot (as for the PHR reporting, jointly or separately from the PHR reporting) or possibly after at least a time delay of N time slots (OFDM symbols) from the time slot (or OFDM symbols) which contains the MPE reporting, where N can be determined according to at least one of the following examples.

In one example, N is fixed (pre-determined), and not configured, e.g., N=0 or 4.

In one example, N is the earliest time slot scheduled for UL transmission (via configured grant type 1 or 2, or via DCI).

In one example, N is configured via higher layer (RRC, TriggerState or separate parameter), or MAC CE (MAC CE that performs subset selection of aperiodic CSI-RS resources or a separate MAC CE), or DCI (CSI request field or a separate field).

In one example, N or the minimum value of N or the maximum value of N is reported by the UE as part of the UE capability.

In one example, when the subcarrier spacings (SCSs) of the DL and UL channels and/or BWPs are different, the value of N can depend on the SCS of the active UL BWP and/or UL channel used for beam reporting (e.g., PUSCH/PUCCH/PRACH) and/or active DL BWP. For example, the time slot (or OFDM symbols) for UL transmission can be determined based on a scaling factor x or $\lfloor x \rfloor$ or $\lceil x \rceil$, where $$x = \frac{2^{\mu_1}}{2^{\mu_2}} = 2^{\mu_1 - \mu_2},$$

and $\mu_1$ and $\mu_2$ respectively indicate SCSs of DL and UL channels and/or BWPs taking a value from {0, 1, 2, 3, 4} indicating {15, 30, 60, 120, 240} kHz SCSs, respectively.

The UL transmission including the beam report is via a configured grant PUSCH resource and starts at the earliest configured grant PUSCH opportunity after N time slots from the time slot (or OFDM symbols) which contains the MPE reporting. Or the UL transmission including the beam report is via a configured PUCCH resource (configured grant Type 1 or Type 2) and starts at the earliest configured PUCCH opportunity after N time slots from the time slot (or OFDM symbols) which contains the MPE reporting. Or the UL transmission including the beam report is via a PRACH (type 1 or type), wherein the preamble starts at the earliest PRACH opportunity after N time slots from the time slot (or OFDM symbols) which contains the MPE reporting.

In one example, the beam reporting can be "triggered" explicitly only when (after) the UE reports the MPE reporting, for example, when the UE reports the MPE reporting via the PHR reporting on a MAC entity. That is, the CSI request field in DCI can trigger the beam reporting only when the NW receives the MPE reporting via the PHR reporting on a MAC entity from the UE.

In one embodiment, the RS(s) for SSBRI/CRI reporting is (are) according to at least one of the following examples:

In one example, the RS(s) for SSBRI/CRI reporting is (are) higher layer configured measurement RS resources as in Rel.15/16 beam measurement/reporting. For aperiodic CSI-RS(s), a MAC CE based subset In one example, the RS(s) for SSBRI/CRI reporting is (are) the QCL source RS(s) for the higher layer (RRC) configured TCI state(s)

In one example, the RS(s) for SSBRI/CRI reporting is (are) the RS(s) configured as PL-RS(s).

In one example, the RS(s) for SSBRI/CRI reporting is (are) a combination of two sets of RSs, where x≠y and x and y belong to {1,2,3,4}.

In one embodiment, the UE is configured with a candidate SSB/CSI-RS resource pool for SSBRI(s)/CSI(s) included in the beam reporting for MPE mitigation, as described in this disclosure, wherein the candidate SSB/CSI-RS resource pool is configured according to at least one of the following examples.

In one example, the candidate SSB/CSI-RS resource pool is configured according to one of the examples in one or more embodiments above.

In one example, the candidate SSB/CSI-RS resource pool is a CSI-RS resource set, which is configured via CSI reporting framework (cf. 5.2.1.2 of TS 38.214).

In one example, the CSI-RS resource set is configured via a higher layer parameter csi-RS-ResourceSetList included in CSI Resource Setting CSI-ResourceConfig having an ID CSI-ResourceConfigId. The details can be according to TS. 38.331, copied in Table 38. The parameter csi-RS-Resource-SetList can configure a list of S≥1 CSI Resource Sets, comprising references (IDs) to either or both of NZP CSI-RS resource set(s) and SS/PBCH block set(s), the details of which are copied from TS 38.331 in Table 39 and Table 40. In one example, the number of CSI-RS Resource Sets configured is limited to S=1. In one example, the number of NZP-CSI-RS-ResourceSet configured within the configured CSI Resource Set is limited to 1. In one example, the number of SS/PBCH block set configured within the configured CSI Resource Set is limited to 1.

TABLE 38

```
CSI-ResourceConfig
The IE CSI-ResourceConfig defines a group of one or more NZP-CSI-RS-ResourceSet, CSI-
IM-ResourceSet and/or CSI-SSB-ResourceSet.
                           CSI-ResourceConfig information element
-- ASN1START
-- TAG-CSI-RESOURCECONFIG-START
CSI-ResourceConfig ::=   SEQUENCE {
    csi-ResourceConfigId    CSI-ResourceConfigId,
    csi-RS-ResourceSetList   CHOICE {
        nzp-CSI-RS-SSB       SEQUENCE {
            nzp-CSI-RS-ResourceSetList SEQUENCE (SIZE (1..maxNrofNZP-CSI-RS-ResourceSetsPerConfig))
OF NZP-CSI-RS-ResourceSetId
                                                    OPTIONAL, -- Need R
            csi-SSB-ResourceSetList   SEQUENCE (SIZE (1..maxNrofCSI-SSB-ResourceSetsPerConfig)) OF CSI-
SSB-ResourceSetId OPTIONAL -- Need R
        },
        csi-IM-ResourceSetList   SEQUENCE (SIZE (1..maxNrofCSI-IM-ResourceSetsPerConfig)) OF CSI-IM-
ResourceSetId
    },
    bwp-Id        BWP-Id,
    resourceType        ENUMERATED { aperiodic, semiPersistent, periodic },
    ...
}
-- TAG-CSI-RESOURCECONFIG-STOP
-- ASN1STOP
``` selection can be used when the number of higher layer configured aperiodic CSI-RS resources are large than a threshold (determined based on the bit width of the DCI codepoint/field, CSI request, that triggers aperiodic CSI-RS measurement and reporting.

In one example, the RS(s) for SSBRI/CRI reporting is (are) the QCL source RS(s) included in the active TCI state(s) that are activated via MAC CE In one example, the CSI-RS resource set comprising CSI-RS resources is configured via higher layer parameter NZP-CSI-RS-ResourceSet having an ID NZP-CSI-RS-ResourceSetId. The details can be according to TS. 38.331, copied in Table 39. In one example, the number of NZP-CSI-RS-ResourceSet configured is limited to 1. In one example, the number of NZP-CSI-RS-ResourceSet configured can be more than 1, but the max value is fixed/determined based on UE capability reporting.

TABLE 39

```
NZP-CSI-RS-ResourceSet
The IE NZP-CSI-RS-ResourceSet is a set of Non-Zero-Power (NZP) CSI-RS resources (their
IDs) and set-specific parameters.
                        NZP-CSI-RS-ResourceSet information element
-- ASN1START
-- TAG-NZP-CSI-RS-RESOURCESET-START
NZP-CSI-RS-ResourceSet ::=  SEQUENCE {
    nzp-CSI-RS-ResourceSetId     NZP-CSI-RS-ResourceSetId,
    nzp-CSI-RS-Resources         SEQUENCE (SIZE (1..maxNrofNZP-CSI-RS-ResourcesPerSet)) OF NZP-CSI-RS-
ResourceId,
    repetition          ENUMERATED{ on, off }                       OPTIONAL, -- Need S
    aperiodicTriggeringOffset      INTEGER(0..6)                     OPTIONAL, -- Need S
    trs-Info          ENUMERATED {true}                 OPTIONAL, -- Need R
    ...,
    [[
    aperiodicTriggeringOffset-r16   INTEGER(0..31)                      OPTIONAL    Need S
    ]]
}
-- TAG-NZP-CSI-RS-RESOURCESET-STOP
-- ASN1STOP
NZP-CSI-RS-Resource
The IE NZP-CSI-RS-Resource is used to configure Non-Zero-Power (NZP) CSI-RS
transmitted in the cell where the IE is included, which the UE may be configured to measure
on (see TS 38.214 [19], clause 5.2.2.3.1). A change of configuration between periodic, semi-
persistent or aperiodic for an NZP-CSI-RS-Resource is not supported without a release and
add.
                        NZP-CSI-RS-Resource information element
-- ASN1START
--TAG-NZP-CSI-RS-RESOURCE-START
NZP-CSI-RS-Resource ::=      SEQUENCE {
    nzp-CSI-RS-ResourceId      NZP-CSI-RS-ResourceId,
    resourceMapping          CSI-RS-ResourceMapping,
    powerControlOffset        INTEGER (–8..15),
    powerControlOffsetSS       ENUMERATED{db-3, db0, db3, db6}        OPTIONAL, -- Need R
    scramblingID            ScramblingId,
    periodicityAndOffset      CSI-ResourcePeriodicityAndOffset      OPTIONAL, -- Cond
PeriodicOrSemiPersistent
    qcl-InfoPeriodicCSI-RS      TCI-StateId            OPTIONAL, -- Cond Periodic
    ...
}
```

In one example, the CSI-RS resource set comprising SSB blocks is configured via higher layer parameter CSI-SSB-ResourceSet having an ID CSI-SSB-ResourceSetId. The details can be according to TS. 38.331, copied in Table 40. In one example, the number of SSB-ResourceSet configured is limited to 1. In one example, the number of SSB-ResourceSet configured can be more than 1, but the max value is fixed/determined based on UE capability reporting.

In one example, the CSI-RS resource set comprising both CSI-RS resources (set S1) and SSB blocks (Set 2) is configured via higher layer parameter NZP-CSI-RS-ResourceSet having an ID NZP-CSI-RS-ResourceSetId for S1, and via higher layer parameter CSI-SSB-ResourceSet having an ID CSI-SSB-ResourceSetId for S2. The details can be according to TS. 38.331, copied in Table 39 and Table 40. In one example, the number of NZP-CSI-RS-ResourceSet con-

TABLE 40

```
CSI-SSB-ResourceSet
The IE CSI-SSB-ResourceSet is used to configure one SS/PBCH block resource set which
refers to SS/PBCH as indicated in ServingCellConfigCommon.
                        CSI-SSB-ResourceSet information element
-- ASN1START
-- TAG-CSI-SSB-RESOURCESET-START
CSI-SSB-ResourceSet ::=      SEQUENCE {
    csi-SSB-ResourceSetId      CSI-SSB-ResourceSetId,
    csi-SSB-ResourceList      SEQUENCE (SIZE(1..maxNrofCSI-SSB-ResourcePerSet)) OF SSB-Index,
    ...
}
-- TAG-CSI-SSB-RESOURCESET-STOP
-- ASN1STOP
SSB-Index
The IE SSB-Index identifies an SS-Block within an SS-Burst. See TS 38.213 [13], clause 4.1.
                        SSB-Index information element
-- ASN1START
-- TAG-SSB-INDEX-START
SSB-Index ::=      INTEGER (0..maxNrofSSBs-1)
-- TAG-SSB-INDEX-STOP
-- ASN1STOP
``` figured is limited to 1. In one example, the number of SSB-ResourceSet configured is limited to 1. In one example, the number of NZP-CSI-RS-ResourceSet configured can be more than 1, but the max value is fixed/determined based on UE capability reporting. In one example, the number of SSB-ResourceSet configured can be more than 1, but the max value is fixed/determined based on UE capability reporting. In one example, the total number of NZP-CSI-RS-ResourceSet and/or SSB-ResourceSet configured can be more than 1, but the max value is fixed/determined based on UE capability reporting.

In one example, the candidate SSB/CSI-RS resource pool is a CSI-RS resource set, which is configured via CSI reporting framework (cf. 5.2.1.2 of TS 38.214). In particular, the CSI-RS resource set is configured via CSI-ResourceConfig linked to (or associated with) a CSI reporting setting (higher layer parameter CSI-ReportConfig). The details can be according to TS. 38.331, copied in Table 41. The details of the CSI-RS resource set is according to one of the examples II.1.1 through II.1.4. The time reporting behavior of the CSI-ReportConfig is indicated by the higher layer parameter reportConfigType and can be set to 'mpeReporting' or 'mpeReportingOnPHR_MACCE' for beam reporting for MPE mitigation via PHR on MAC CE (cf. TS 38.321), as described in this disclosure.

Also, the higher layer parameter reportQuantity can be set to 'cri-PMPR' or 'ssb-Index-PMPR' for CRI+P-MPR or SSBRI+P-MPR reporting, respectively.

A CSI Reporting Setting is said to have a wideband frequency-granularity if reportQuantity is set to 'cri-PMPR' or 'ssb-Index-PMPR'.

A UE is not expected to be configured with more than 64 NZP CSI-RS resources and/or SS/PBCH block resources in resource setting for channel measurement for a CSI-ReportConfig with the higher layer parameter reportQuantity set to 'cri-PMPR' or 'ssb-Index-PMPR'. Therefore, each CRI/SSBRI reporting requires at most 6 bits.

In one example, the number of resource setting (via CSI-ResourceConfig) linked to the CSI-ReportConfig is limited to 1 when the higher layer parameter reportQuantity set to 'cri-PMPR' or 'ssb-Index-PMPR'.

If the UE is configured with a CSI-ReportConfig with the higher layer parameter reportQuantity set to 'cri-PMPR' or 'ssb-Index-PMPR', if the UE is configured with the higher layer parameter groupBasedBeamReporting set to 'disabled', the UE is not required to update measurements for more than 64 CSI-RS and/or SSB resources, and the UE shall report in a single report nrofReportedPMPR (higher layer

TABLE 41

CSI-ReportConfig
The IE CSI-ReportConfig is used to configure a periodic or semi-persistent report sent on
PUCCH on the cell in which the CSI-ReportConfig is included, or to configure a semi-
persistent or aperiodic report sent on PUSCH triggered by DCI received on the cell in which
the CSI-ReportConfig is included (in this case, the cell on which the report is sent is
determined by the received DCI). See TS 38.214 [19], clause 5.2.1.
                              CSI-ReportConfig information element
-- ASN1START
-- TAG-CSI-REPORTCONFIG-START
CSI-ReportConfig ::=          SEQUENCE {
    reportConfigId          CSI-ReportConfigId,
    carrier                 ServCellIndex        OPTIONAL, -- Need S
    resourcesForChannelMeasurement        CSI-ResourceConfigId,
    csi-IM-ResourcesForInterference       CSI-ResourceConfigId      OPTIONAL, -- Need R
    nzp-CSI-RS-ResourcesForInterference   CSI-ResourceConfigId      OPTIONAL, -- Need R
    reportConfigType        CHOICE {
        periodic            SEQUENCE {
            reportSlotConfig          CSI-ReportPeriodicityAndOffset,
            pucch-CSI-ResourceList          SEQUENCE (SIZE (1..maxNrofBWPs)) OF PUCCH-CSI-Resource
        },
        semiPersistentOnPUCCH           SEQUENCE {
            reportSlotConfig        CSI-ReportPeriodicityAndOffset,
            pucch-CSI-ResourceList          SEQUENCE (SIZE (1..maxNrofBWPs)) OF PUCCH-CSI-Resource
        },
        semiPersistentOnPUSCH           SEQUENCE {
            reportSlotConfig           ENUMERATED {s15, s110, s120, s140, s180, s1160, s1320},
            reportSlotOffsetList        SEQUENCE (SIZE (1.. maxNrofUL-Allocations)) OF INTEGER(0..32),
            p0alpha            P0-PUSCH-AlphaSetId
        },
        aperiodic           SEQUENCE {
            reportSlotOffsetList        SEQUENCE (SIZE (1..maxNrofUL-Allocations)) OF INTEGER(0..32)
        }
    },
    reportQuantity              CHOICE {
        none            NULL,
        cri-RI-PMI-CQI                NULL,
        cri-RI-i1           NULL,
        cri-RI-i1-CQI               SEQUENCE {
            pdsch-BundleSizeForCSI        ENUMERATED {n2, n4}                OPTIONAL -- Need S
        },
        cri-RI-CQI              NULL,
        cri-RSRP                NULL,
        ssb-Index-RSRP              NULL,
        cri-RI-LI-PMI-CQI               NULL
    }, configured) different CRI or SSBRI for each report setting. In one example, nrofReportedPMPR configures a value of $Q_1$ for CRI/SSBRI and P-MPR reporting. The configuration of nrofReportedPMPR can be via PHR-Config or PHR-Config-r17 (e.g., a new parameter in MPE-Config-FR2-r17) or via nrofReportedRS or nrofReportedRS-r17 included in CSI-ReportConfig.

For P-MPR computation the UE may be configured with CSI-RS resources, SS/PBCH Block resources or both CSI-RS and SS/PBCH block resources, when resource-wise quasi co-located with 'type C' and 'typeD' when applicable.

the UE may be configured with CSI-RS resource setting up to 16 CSI-RS resource sets having up to 64 resources within each set. The total number of different CSI-RS resources over all resource sets is no more than 128.

For P-MPR reporting, if the higher layer parameter nrof-ReportedPMPR in PHR-Config or PHR-Config-r17 or CSI-ReportConfig is configured to be one, the reported P-MPR value is defined by a x-bit value. In one example, x=2 and the P-MPR reporting is based on Table 10.1.26.1-1 in TS 38.133. If the higher layer parameter nrofReportedPMPR is configured to be larger than one, or if the higher layer parameter groupBasedBeamReporting is configured as 'enabled', one of the following is used.

The UE shall use x-bit value for all P-MPR values. In one example, x=2 and the P-MPR reporting is based on Table 10.1.26.1-1 in TS 38.133.

The UE shall use differential P-MPR based reporting, where the one of P-MPR values (e.g., the first P-MPR value) is quantized to a x-bit value, and the differential P-MPR is quantized to a y-bit value for the remaining values. The differential P-MPR value is computed with a reference to the one of P-MPR values (e.g., the first P-MPR value) which is part of the same P-MPR reporting instance. The mapping between the reported differential value and the measured quantity can be according to Table 42.

TABLE 42

| Mapping of differential P-MPR | | |
|---|---|---|
| Reported value | Measured quantity value | Unit |
| Diff_P-MPR_00 | $1.5 \le PMP\text{-}R < 3$ | dB |
| Diff_P-MPR_01 | $3 \le PMP\text{-}R < 4.5$ | dB |
| Diff_P-MPR_02 | $4.5 \le PMP\text{-}R < 6$ | dB |
| Diff_P-MPR_03 | $PMP\text{-}R \ge 6$ | dB |

If the higher layer parameter timeRestrictionForChannelMeasurements in CSI-ReportConfig is set to "notConfigured", the UE shall derive the channel measurements for computing P-MPR value reported in uplink slot n based on only the SS/PBCH or NZP CSI-RS, no later than the CSI reference resource, (defined in TS 38.211) associated with the CSI resource setting.

If the higher layer parameter timeRestrictionForChannelMeasurements in CSI-ReportConfig is set to "Configured", the UE shall derive the channel measurements for computing P-MPR reported in uplink slot n based on only the most recent, no later than the CSI reference resource, occasion of SS/PBCH or NZP CSI-RS (defined in TS 38.211) associated with the CSI resource setting.

If the UE is configured with a CSI-ReportConfig with reportQuantity set to 'cri-PMPR' or 'ssb-Index-PMPR' and if the CSI-ResourceConfig for channel measurement (higher layer parameter resourcesForChannelMeasurement) contains a NZP-CSI-RS-ResourceSet that is configured with the higher layer parameter repetition and without the higher layer parameter trs-Info, the UE can only be configured with the same number (1 or 2) of ports with the higher layer parameter nrofPorts for all CSI-RS resources within the set. If the UE is configured with the CSI-RS resource in the same OFDM symbol(s) as an SS/PBCH block, the UE may assume that the CSI-RS and the SS/PBCH block are quasi co-located with 'typeD' if 'typeD' is applicable. Furthermore, the UE shall not expect to be configured with the CSI-RS in PRBs that overlap with those of the SS/PBCH block, and the UE shall expect that the same subcarrier spacing is used for both the CSI-RS and the SS/PBCH block.

In one example, the candidate SSB/CSI-RS resource pool is a CSI-RS resource set or a SSB resource set, configured via PHR-Config (existing PHR configuration, e.g., up to Rel.16 NR) or PHR-Config-r17 (new PHR configuration, e.g., Rel. 17).

In one example, a parameter is included in PHR-Config or PHR-Config-r17 to configure the CSI-RS or SSB resource set. At least one of the following examples is used regarding the parameter.

In one example, the parameter corresponds to an ID CSI-ResourceConfigId indicating a CSI-ResourceConfig, the details of which are according to one or more examples above.

In one example, the parameter corresponds to an ID NZP-CSI-RS-ResourceSetId indicating a NZP CSI-RS resource set, the details of which are according to one or more examples above.

In one example, the parameter corresponds to an ID CSI-SSB-ResourceSetId indicating a SSB resource set, the details of which are according to one or more examples above.

In one example, the parameter corresponds to a pair of IDs (ID1, ID2), where ID1=NZP-CSI-RS-ResourceSetId indicating a NZP CSI-RS resource set and ID2=CSI-SSB-ResourceSetId indicating a SSB resource set. The rest of the details about the two IDs according to one or more examples above.

In one example, the parameter corresponds to an ID CSI-ResourceConfigId indicating a CSI-ResourceConfig that is linked to (or associated with) a CSI reporting setting (higher layer parameter CSI-ReportConfig), details according to one or more examples above.

In one example, a parameter is included in MPE-Config-FR2 (existing from Rel. 16) or MPE-Config-FR2-r17 (new, e.g., in Rel. 17), which in turn is included in information element (IE) PHR-Config or PHR-Config-r17.

In one example, the parameter is an ID indicating a resource set, where the ID is according to one or more of the examples above. This is illustrated in Table 43, where resourceSet is the parameter, and numberOfN-r17 is the number of SSBRI/CRI reported in the MPE reporting. Alternatively, the parameter indicates a resource set/pool itself (without it's ID), where the resource set/pool is according to at least one of the following examples. This is illustrated in Table 44 through Table 50, where maxMPE-Resources is the maximum number of SSB and/or CSI-RS resources for MPE reporting. In one example, maxMPE-Resources=64.

In one example, the resource set/pool is a NZP CSI-RS resource set/pool composing NZP CSI-RS resource(s).

In one example, the resource set/pool is a SSB resource set/pool comprising SSB resource(s).

In one example, the resource set/pool can be a mixture of NZP CSI-RS resource(s) and/or SSB resource(s) in the resource set/pool.

In one example, the resource set/pool includes at least two separate resource sets/pools (or subsets), at least one set/pool (subset) comprising NZP CSI-RS resource(s) and at least one set/pool (subset) comprising SSB resource(s). Note that in this example, CSI-RS and SSB resources are kept in separate pools/sets/subsets.

In one example, the parameter is configured jointly with one of mpe-ProhibitTimer-r17 and mpe-Threshold-r17, details of which is according to TS 38.331 and TS 38.321. For example, mpe-ProhibitTimer-r17 indicates both the ID and a value for the mpe-ProhibitTimer.

TABLE 43

```
-- ASN1START
-- TAG-PHR-CONFIG-START
PHR-Config          ::= SEQUENCE {
    ...,
    [[
    mpe-Reporting-FR2-r17     SetupRelease { MPE-Config-FR2-r17 }      OPTIONAL   -- Need M
    ]]
}
MPE-Config-FR2-r17 ::=      SEQUENCE {
    mpe-ProhibitTimer-r17        ENUMERATED {sf0, sf10, sf20, sf50, sf100, sf200, sf500, sf1000},
    mpe-Threshold-r17            ENUMERATED {dB3, dB6, dB9, dB12}
    numberOfN-r17            INTEGER{1..4},
    resourceSet         parameter (ID)
}
```

TABLE 44

```
MPE-Config-FR2-r17 ::=      SEQUENCE {
    mpe-ProhibitTimer-r17        ENUMERATED {sf0, sf10, sf20, sf50, sf100, sf200, sf500, sf1000},
    mpe-Threshold-r17            ENUMERATED {dB3, dB6, dB9, dB12}
    numberOfN-r17            INTEGER{1..4},
    resourceSet         SEQUENCE (SIZE(1..maxMPE-Resources-r17)) OF MPE-Resource-r17
}
MPE-Resource-r17 ::=       SEQUENCE {
    mpe-ResourceId-r17       INTEGER (1..maxMPE-Resources-r17),
    mpe-ReferenceSignal-r17   CHOICE {
        csi-RS-Resource-r17       NZP-CSI-RS-ResourceId,
        ssb-Resource-r17       SSB-Index
    }
}
```

TABLE 45

```
MPE-Config-FR2-r17 ::=      SEQUENCE {
    mpe-ProhibitTimer-r17        ENUMERATED {sf0, sf10, sf20, sf50, sf100, sf200, sf500, sf1000},
    mpe-Threshold-r17            ENUMERATED {dB3, dB6, dB9, dB12}
    numberOfN-r17            INTEGER{1..4},
    resourceSet         SEQUENCE (SIZE(1..maxMPE-Resources-r17)) OF MPE-CSI-RS-Resource-r17 or MPE-SSB-
Resource-r17
}
MPE-CSI-RS-Resource-r17 ::=      SEQUENCE {
    mpe-ResourceId-r17       INTEGER (1..maxMPE-Resources-r17),
    csi-RS-Resource-r17       NZP-CSI-RS-ResourceId
}
MPE-SSB-Resource-r17 ::=       SEQUENCE {
    mpe-ResourceId-r17       INTEGER (1..maxMPE-Resources-r17),
    ssb-Resource-r17       SSB-Index
}
```

TABLE 46

```
MPE-Config-FR2-r17 ::=      SEQUENCE {
    mpe-ProhibitTimer-r17        ENUMERATED {sf0, sf10, sf20, sf50, sf100, sf200, sf500, sf1000},
    mpe-Threshold-r17            ENUMERATED {dB3, dB6, dB9, dB12}
    numberOfN-r17            INTEGER{1..4},
    CSI-RS-resourceSet        SEQUENCE (SIZE(1..maxMPE-Resources-r17)) OF MPE-CSI-RS-Resource-r17
```

TABLE 46-continued

```
SSB-resourceSet      SEQUENCE (SIZE(1..maxMPE-Resources-r17)) OF MPE-SSB-Resource-r17
}
MPE-CSI-RS-Resource-r17 ::=      SEQUENCE {
    mpe-ResourceId-r17      INTEGER (1..maxMPE-Resources-r17),
    csi-RS-Resource-r17      NZP-CSI-RS-ResourceId
}
MPE-SSB-Resource-r17 ::=      SEQUENCE {
    mpe-ResourceId-r17      INTEGER (1..maxMPE-Resources-r17),
    ssb-Resource-r17      SSB-Index
}
```

TABLE 47

```
MPE-Config-FR2-r17 ::=      SEQUENCE {
    mpe-ProhibitTimer-r17      ENUMERATED {sf0, sf10, sf20, sf50, sf100, sf200, sf500, sf1000},
    mpe-Threshold-r17      ENUMERATED {dB3, dB6, dB9, dB12}
    numberOfN-r17      INTEGER{1..4},
    resourceSet      CHOICE {NZP-CSI-RS-ResourceSetId or CSI-SSB-ResourceSetId or (NZP-CSI-RS-
ResourceSetId, CSI-SSB-ResourceSetId)}
}
```

TABLE 48

```
MPE-Config-FR2-r17 ::=      SEQUENCE {
    mpe-ProhibitTimer-r17      ENUMERATED {sf0, sf10, sf20, sf50, sf100, sf200, sf500, sf1000},
    mpe-Threshold-r17      ENUMERATED {dB3, dB6, dB9, dB12}
    numberOfN-r17      INTEGER{1..4},
    CSI-RS-resourceSet      NZP-CSI-RS-ResourceSetId
    SSB-resourceSet      CSI-SSB-ResourceSetId
}
```

TABLE 49

```
MPE-Config-FR2-r17 ::=      SEQUENCE {
    mpe-ProhibitTimer-r17      ENUMERATED {sf0, sf10, sf20, sf50, sf100, sf200, sf500, sf1000},
    mpe-Threshold-r17      ENUMERATED {dB3, dB6, dB9, dB12}
    numberOfN-r17      INTEGER{1..4},
    resourceSet      MPE-Resource-r17
}
MPE-Resource-r17 ::=      CHOICE {
    CSI-RS-ResourceSet      NZP-CSI-RS-ResourceSetId
    SSB-ResourceSet      CSI-SSB-ResourceSetId
}
```

TABLE 50

```
MPE-Config-FR2-r17 ::=      SEQUENCE {
    mpe-ProhibitTimer-r17      ENUMERATED {sf0, sf10, sf20, sf50, sf100, sf200, sf500, sf1000},
    mpe-Threshold-r17      ENUMERATED {dB3, dB6, dB9, dB12}
    numberOfN-r17      INTEGER{1..4},
    resourceSet      CHOICE {
        CSI-RS-ResourceSet      NZP-CSI-RS-ResourceSetId
        SSB-ResourceSet      CSI-SSB-ResourceSetId
    }
}
```

In one example, the candidate SSB/CSI-RS resource pool is a CSI-RS resource set, configured via IE MAC-Cell-GroupConfig. For example, a parameter is included in IE MAC-CellGroupConfig, where the parameter is an ID indicating a resource set, where the ID is according to one or more of the examples above. This is illustrated in Table 51.

TABLE 51

```
MAC-CellGroupConfig
The IE MAC-CellGroupConfig is used to configure MAC parameters for a cell group,
including DRX.
                        MAC-CellGroupConfig information element
--ASN1START
--TAG-MAC-CELLGROUPCONFIG-START
MAC-CellGroupConfig ::=      SEQUENCE {
   drx-Config          SetupRelease { DRX-Config }          OPTIONAL, -- Need M
   schedulingRequestConfig      SchedulingRequestConfig          OPTIONAL, -- Need M
   bsr-Config          BSR-Config          OPTIONAL, --NeedM
   tag-Config          TAG-Config          OPTIONAL, --NeedM
   phr-Config          SetupRelease { PHR-Config }          OPTIONAL, -- Need M
   resourceSet         parameter (ID)
OPTIONAL, --Need M
   skipUplinkTxDynamic        BOOLEAN, ...,
   [[
   csi-Mask          BOOLEAN          OPTIONAL, -- Need M
   dataInactivityTimer      SetupRelease { DataInactivityTimer }          OPTIONAL -- Cond MCG-Only
   ]],
   [[
   usePreBSR-r16              ENUMERATED {true}          OPTIONAL, -- Need R
   schedulingRequestID-LBT-SCell-r16 SchedulingRequestId          OPTIONAL, -- Need R
   lch-BasedPrioritization-r16      ENUMERATED {enabled}          OPTIONAL, -- Need R
   schedulingRequestID-BFR-SCell-r16 SchedulingRequestId          OPTIONAL, -- Need R
   drx-ConfigSecondaryGroup-r16      SetupRelease { DRX-ConfigSecondaryGroup }          OPTIONAL -- Need
M
   ]],
   [[
   enhancedSkipUplinkTxDynamic-r16   ENUMERATED {true}          OPTIONAL, -- Need R
   enhancedSkipUplinkTxConfigured-r16 ENUMERATED {true}          OPTIONAL -- Need R
   ]]
}
DataInactivityTimer ::=      ENUMERATED {s1, s2, s3, s5, s7, s10, s15, s20, s40, s50, s60, s80, s100, s120, s150, s180}
--TAG-MAC-CELLGROUPCONFIG-STOP
--ASN1START
```

In one embodiment, the beam reporting for MPE mitigation is subject to (conditioned on) a triggering via a DCI. The triggering triggers (indicates) the beam reporting for MPE via PHR on MAC CE, as described in this disclosure. Only when the UE receives the trigger via the DCI, the UE can report the beam reporting for MPE mitigation. In one example, when the MPE reporting is configured via higher layer, but triggering is not provided via the DCI, the UE can report the MPE reporting according to Rel.16 mechanism, i.e., 1 P-MPR value together with other parameters for PHR reporting on MAC CE. And when the MPE reporting is configured via higher layer, and triggering is also provided via the DCI, the UE can report the MPE reporting according to the new MPE reporting mechanism as described in this disclosure, i.e., in addition to the 1 P-MPR value, the UE can report $Q_1$ CRI/SSBRI(s)+additional P-MPR values, together with other parameters for PHR reporting on MAC CE.

In one example, the triggering DCI is a DCI that schedules PHR reporting on MAC CE. The DCI includes a parameter or code point for this triggering. In one example, such a field in the DCI can only be present/provided to the UE when the UE is configured with MPE reporting via higher layer.

In one example, the triggering DCI is a DCI that a triggers an aperiodic CSI. In one example, a trigger state (e.g., state 0) corresponding to the MPE reporting can be included in the CSI-AperiodicTriggerStateList, as shown in Table 52. For example, the trigger state can indicate a CSI-ReportConfig corresponding to the MPE reporting.

TABLE 52

```
CSI-AperiodicTriggerStateList
The CSI-AperiodicTriggerStateList IE is used to configure the UE with a list of aperiodic
trigger states. Each codepoint of the DCI field "CSI request" is associated with one trigger
state (see TS 38.321 [3], clause 6.1.3.13). Upon reception of the value associated with a trigger
state, the UE will perform measurement of CSI-RS, CSI-IM and/or SSB (reference signals)
and aperiodic reporting on L1 according to all entries in the associatedReportConfigInfoList
for that trigger state.
                        CSI-AperiodicTriggerStateList information element
-- ASN1START
-- TAG-CSI-APERIODICTRIGGERSTATELIST-START
CSI-AperiodicTriggerStateList ::= SEQUENCE (SIZE (1..maxNrOfCSI-AperiodicTriggers)) OF CSI-AperiodicTriggerState
CSI-AperiodicTriggerState ::=   SEQUENCE {
   associatedReportConfigInfoList   SEQUENCE (SIZE(1..maxNrofReportConfigPerAperiodicTrigger)) OF CSI-
AssociatedReportConfigInfo, ...
}
CSI-AssociatedReportConfigInfo ::= SEQUENCE {
   reportConfigId      CSI-ReportConfigId,
   resourcesForChannel      CHOICE {
```

TABLE 52-continued

```
    nzp-CSI-RS          SEQUENCE {
      resourceSet            INTEGER (1..maxNrofNZP-CSI-RS-ResourceSetsPerConfig),
      qcl-info             SEQUENCE (SIZE(1..maxNrofAP-CSI-RS-ResourcesPerSet)) OF TCI-StateId
                                             OPTIONAL -- Cond Aperiodic
    },
    csi-SSB-ResourceSet      INTEGER (1..maxNrofCSI-SSB-ResourceSetsPerConfig)
    },
    csi-IM-ResourcesForInterference   INTEGER(1..maxNrofCSI-IM-ResourceSetsPerConfig)      OPTIONAL, -- Cond
CSI-IM-ForInterference
    nzp-CSI-RS-ResourcesForInterference INTEGER (1..maxNrofNZP-CSI-RS-ResourceSetsPerConfig)      OPTIONAL, --
Cond NZP-CSI-RS-ForInterference
    ...
}
-- TAG-CSI-APERIODICTRIGGERSTATELIST-STOP
-- ASN1START
```

Any of the above variation embodiments can be utilized independently or in combination with at least one other variation embodiment.

FIG. 21 illustrates a flow chart of a method 2100 for operating a user equipment (UE), as may be performed by a UE such as UE 116, according to embodiments of the present disclosure. The embodiment of the method 2100 illustrated in FIG. 21 is for illustration only. FIG. 21 does not limit the scope of this disclosure to any particular implementation.

As illustrated in FIG. 21, the method 2100 begins at step 2102. In step 2102, the UE (e.g., 111-116 as illustrated in FIG. 1) receives information about a report, the report including at least one capability value about an uplink (UL) transmission.

In step 2104, the UE determines the at least one capability value.

In step 2106, the UE determines the report including an indicator indicating the at least one capability value.

In step 2108, the UE transmits the report.

In one embodiment, the capability value corresponds to a maximum number of sounding reference signal (SRS) antenna ports associated with the UL transmission.

In one embodiment, the capability value corresponds to at least one of a maximum number of SRS antenna ports or a maximum number of layers or a coherence type or a transmit precoding matrix indicator (TPMI) that is associated with the UL transmission.

In one embodiment, the report includes $(R_i, M_i, I_i)$, where $i=0, 1, \ldots, N-1$, $R_i$ is a resource indicator, $M_i$ is a metric, and $I_i$ is the indicator indicating a capability value, and a value of N is provided via the information In one embodiment, the resource indicator is a channel state information reference signal resource indicator (CRI) or a synchronization signal block (SSB) resource indicator (SSBRI), and the metric is layer-1 reference signal received power (L1-RSRP) or layer-1 signal to interference and noise ratio (L1-SINR).

In one embodiment, the UE transmits a UE capability information including a set (S) of supported capability values, and the information about the report is subject to the UE capability information.

In one embodiment, when the capability value corresponds to a maximum number of SRS ports, the set (S) includes {1,2,4}.

FIG. 22 illustrates a flow chart of another method 2200, as may be performed by a base station (BS) such as BS 102, according to embodiments of the present disclosure. The embodiment of the method 2200 illustrated in FIG. 22 is for illustration only. FIG. 22 does not limit the scope of this disclosure to any particular implementation.

As illustrated in FIG. 22, the method 2200 begins at step 2202. In step 2202, the BS (e.g., 101-103 as illustrated in FIG. 1), generates information about a report, the report including at least one capability value about an uplink (UL) transmission.

In step 2204, the BS transmits the report.

In step 2206, the BS receives the report, wherein the report includes an indicator indicating the at least one capability value.

In one embodiment, the capability value corresponds to a maximum number of sounding reference signal (SRS) antenna ports associated with the UL transmission.

In one embodiment, the capability value corresponds to at least one of a maximum number of SRS antenna ports or a maximum number of layers or a coherence type or a transmit precoding matrix indicator (TPMI) that is associated with the UL transmission.

In one embodiment, the report includes $(R_i, M_i, I_i)$, where $i=0, 1, \ldots, N-1$, $R_i$ is a resource indicator, $M_i$ is a metric, and $I_i$ is the indicator indicating a capability value, and a value of N is provided via the information.

In one embodiment, the resource indicator is a channel state information reference signal resource indicator (CRI) or a synchronization signal block (SSB) resource indicator (SSBRI), and the metric is layer-1 reference signal received power (L1-RSRP) or layer-1 signal to interference and noise ratio (L1-SINR).

In one embodiment, the BS receives a UE capability information including a set (S) of supported capability values, and the information about the report is subject to the UE capability information.

In one embodiment, when the capability value corresponds to a maximum number of SRS ports, the set (S) includes {1,2,4}.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
transmit, to a base station, capability information including a list of capability values, wherein the list of capability values indicates a maximum number of sounding reference signal (SRS) antenna ports of the UE, and receive, from the base station, configuration information on a channel state information (CSI) report; and
a processor operably coupled to the transceiver, the processor configured to identify a capability value from the list of capability values,
wherein the transceiver is further configured to transmit, to the base station, the CSI report including a resource indicator and an index of the identified capability value, and
wherein the index is associated with the resource indicator.

2. The UE of claim 1, wherein
the resource indicator is a channel state information reference signal resource indicator (CRI) or a synchronization signal block (SSB) resource indicator (SSBRI).

3. The UE of claim 1, wherein:
the list of supported capability values includes values of {1,2,4}, and
a bit width for the index is 2 bits.

4. The UE of claim 1, wherein the CSI report further includes a value of a layer-1 signal to interference and noise ratio (L1-SINR) or a value of a layer-1 reference signal received power (L1-RSRP) for the resource indicator.

5. A base station (BS) comprising:
a processor; and
a transceiver operably coupled to the processor, the transceiver configured to:
receive, from a user equipment (UE), capability information including a list of capability values, wherein the list of capability values indicates a maximum number of sounding reference signal (SRS) antenna ports of the UE,
transmit, to the UE, configuration information on a channel state information (CSI) report, and

receive, from the UE, the CSI report including a resource indicator and an index of an identified capability value of the capability values, the index being associated with the resource indicator.

6. The BS of claim 5, wherein
the resource indicator is a channel state information reference signal resource indicator (CRI) or a synchronization signal block (SSB) resource indicator (SSBRI).

7. The BS of claim 5, wherein:
the list of supported capability values includes values of {1,2,4}, and
a bit width for the index is 2 bits.

8. The BS of claim 5, wherein the CSI report further includes a value of a layer-1 signal to interference and noise ratio (L1-SINR) or a value of a layer-1 reference signal received power (L1-RSRP) for the resource indicator.

9. A method performed by a user equipment (UE), the method comprising:
transmitting, to a base station, capability information including a list of capability values, wherein the list of capability values indicates a maximum number of sounding reference signal (SRS) antenna ports of the UE;
receiving, from the base station, configuration information on a channel state information (CSI) report;
identifying a capability value from the list of capability values; and
transmitting the CSI report including a resource indicator and an index of the identified capability value, the index being associated with the resource indicator.

10. The method of claim 9, wherein
the resource indicator is a channel state information reference signal resource indicator (CRI) or a synchronization signal block (SSB) resource indicator (SSBRI).

11. The method of claim 9, wherein:
the list of supported capability values includes values of {1,2,4}, and
a bit width for the index is 2 bits.

12. The method of claim 9, wherein the CSI report further includes a value of a layer-1 signal to interference and noise ratio (L1-SINR) or a value of a layer-1 reference signal received power (L1-RSRP) for the resource indicator.

* * * * *